United States Patent
Smith et al.

(10) Patent No.: US 9,988,112 B2
(45) Date of Patent: *Jun. 5, 2018

(54) MOUNTING STRUCTURE WITH STORABLE TRANSPORT SYSTEM

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/828,073

(22) Filed: Nov. 30, 2017

(65) Prior Publication Data

US 2018/0086399 A1 Mar. 29, 2018

Related U.S. Application Data

(63) Continuation of application No. 15/285,366, filed on Oct. 4, 2016, now Pat. No. 9,862,437, which is a
(Continued)

(51) Int. Cl.
*B62D 51/06* (2006.01)
*B62D 57/032* (2006.01)
(Continued)

(52) U.S. Cl.
CPC ........... *B62D 57/032* (2013.01); *B62D 57/02* (2013.01); *E21B 15/003* (2013.01); *E21B 15/006* (2013.01)

(58) Field of Classification Search
CPC .... B62D 57/00; B62D 57/032; B62D 57/022; B62D 57/028; B62D 57/02
(Continued)

(56) References Cited

U.S. PATENT DOCUMENTS

| | | |
|---|---|---|
| 1,001,299 A | 8/1911 | Page |
| 1,242,635 A | 10/1917 | Anderson |

(Continued)

FOREIGN PATENT DOCUMENTS

| | | |
|---|---|---|
| CH | 359422 | 1/1962 |
| CN | 1515477 | 7/2003 |

(Continued)

OTHER PUBLICATIONS

Schwabe Williamson & Wyatt, PC "Listing of Related Cases", Portland, OR; Dec. 4, 2017; 2 Pages.
(Continued)

*Primary Examiner* — Joseph M Rocca
*Assistant Examiner* — Conan D Duda
(74) *Attorney, Agent, or Firm* — Schwabe Williamson & Wyatt

(57) ABSTRACT

A mounting structure for a rig may include a base configured to support the mounting structure on an operating surface and a plurality of transport systems operatively connected to the base and configured to lift the mounting structure off of the operating surface. An elevated rig platform may be connected to the base by a plurality of support struts, wherein at least some of the support struts comprise a mounting connection that is configured to pivot to lower the elevated rig platform toward the base and place the mounting structure in a partially collapsed state. Additionally, a connecting member may be attached to one or more of the plurality of transport systems, wherein in response to the elevated rig platform being lowered to the partially collapsed state, the connecting member may be configured to displace at least a portion of the one or more transport systems.

20 Claims, 43 Drawing Sheets

Related U.S. Application Data continuation of application No. 14/529,566, filed on Oct. 31, 2014, now Pat. No. 9,533,723, which is a continuation-in-part of application No. 13/909,969, filed on Jun. 4, 2013, now Pat. No. 9,096,282, which is a continuation-in-part of application No. 13/711,193, filed on Dec. 11, 2012, now Pat. No. 8,573,334, which is a continuation-in-part of application No. 13/711,269, filed on Dec. 11, 2012, now Pat. No. 8,561,733, which is a continuation-in-part of application No. 13/711,315, filed on Dec. 11, 2012, now Pat. No. 8,490,724.

(60) Provisional application No. 61/757,517, filed on Jan. 28, 2013, provisional application No. 61/576,657, filed on Dec. 16, 2011.

(51) Int. Cl.
*E21B 15/00* (2006.01)
*B62D 57/02* (2006.01)

(58) Field of Classification Search
USPC .................................... 180/8.1, 8.5, 8.6
See application file for complete search history.

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A * | 7/1971 | Reimann ................ B62D 57/00 173/122 |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A * | 2/1975 | Dowd ................ A01G 25/092 180/187 |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 * | 4/2008 | Andrews ................ E21B 7/02 414/332 |
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |

(56) References Cited

U.S. PATENT DOCUMENTS

| | | | |
|---|---|---|---|
| 8,468,753 B2 | 6/2013 | Donnally | |
| 8,490,724 B2* | 7/2013 | Smith | B62D 57/02 |
| | | | 180/8.6 |
| 8,490,727 B2 | 7/2013 | Smith et al. | |
| 8,556,003 B2* | 10/2013 | Souchek | E21B 7/02 |
| | | | 175/162 |
| 8,561,733 B2 | 10/2013 | Smith et al. | |
| 8,573,334 B2 | 11/2013 | Smith | |
| 8,646,549 B2 | 2/2014 | Ledbetter | |
| 8,646,976 B2* | 2/2014 | Stoik | E21B 15/003 |
| | | | 384/36 |
| 8,839,892 B2 | 9/2014 | Smith et al. | |
| 8,887,800 B2 | 11/2014 | Havinga | |
| 9,004,203 B2 | 4/2015 | Smith | |
| 9,045,178 B2 | 6/2015 | Smith | |
| 9,463,833 B2 | 10/2016 | Smith et al. | |
| 9,751,578 B2* | 9/2017 | Smith | B62D 57/032 |
| 2002/0185319 A1* | 12/2002 | Smith | B62D 55/00 |
| | | | 180/9 |
| 2004/0211598 A1 | 10/2004 | Palidis | |
| 2004/0240973 A1 | 12/2004 | Andrews | |
| 2006/0027373 A1 | 2/2006 | Carriere | |
| 2006/0213653 A1 | 9/2006 | Cunningham | |
| 2009/0000218 A1 | 1/2009 | Lee | |
| 2009/0188677 A1 | 7/2009 | Ditta | |
| 2009/0200856 A1 | 8/2009 | Chehade | |
| 2009/0283324 A1 | 11/2009 | Konduc | |
| 2010/0252395 A1 | 10/2010 | Lehtonen | |
| 2011/0072737 A1 | 3/2011 | Wasterval | |
| 2011/0114386 A1 | 5/2011 | Souchek | |
| 2012/0219242 A1 | 8/2012 | Stoik | |
| 2013/0153309 A1 | 6/2013 | Smith et al. | |
| 2013/0156538 A1 | 6/2013 | Smith et al. | |
| 2013/0156539 A1 | 6/2013 | Smith et al. | |
| 2013/0277124 A1 | 10/2013 | Smith et al. | |
| 2014/0014417 A1 | 1/2014 | Smith et al. | |
| 2014/0054097 A1 | 2/2014 | Bryant | |
| 2014/0158342 A1 | 6/2014 | Smith | |
| 2014/0161581 A1 | 6/2014 | Smith et al. | |
| 2015/0166134 A1* | 6/2015 | Trevithick | B62D 57/02 |
| | | | 180/8.1 |
| 2016/0176255 A1* | 6/2016 | Guiboche | B62B 13/06 |
| | | | 280/8 |
| 2016/0221620 A1* | 8/2016 | Smith | E21B 15/003 |
| 2016/0297488 A1* | 10/2016 | Smith | B62D 57/032 |
| 2017/0021880 A1 | 1/2017 | Smith | |
| 2017/0101144 A1* | 4/2017 | Higginbotham, III | |
| | | | B62D 57/022 |
| 2017/0327166 A1* | 11/2017 | Smith | E21B 15/003 |

FOREIGN PATENT DOCUMENTS

| | | |
|---|---|---|
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Notice of Pending Litigation Under 37 CFR 1.56 Pursuant to Granted Request for Prioritized Examination Under 37 CFR 1.102€(1), Jun. 28, 2016.

Defendants' First Amended Answer, Affirmative Defenses, and Counterclaims to Plaintiff's Complain for Patent Infringement, Jun. 27, 2016, p. 9, section 16.

Defendants' Answer, Affirmative Defenses, and Counterclaims to Plaintiff's Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complaint for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet.

* cited by examiner

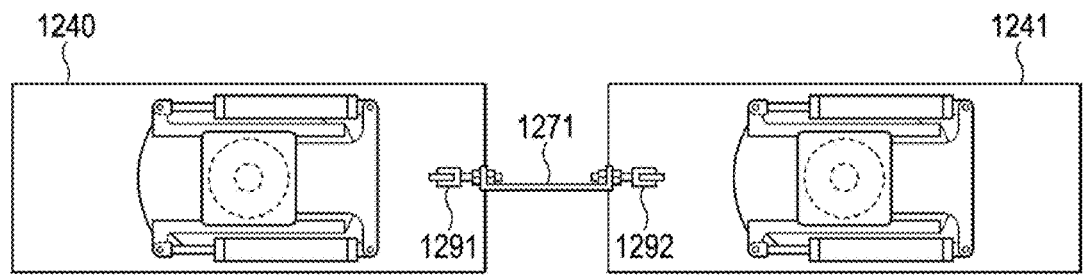
FIG. 12A
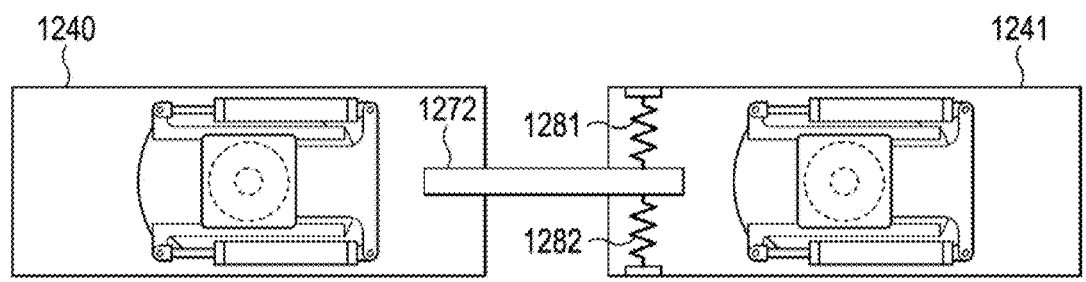
FIG. 12B
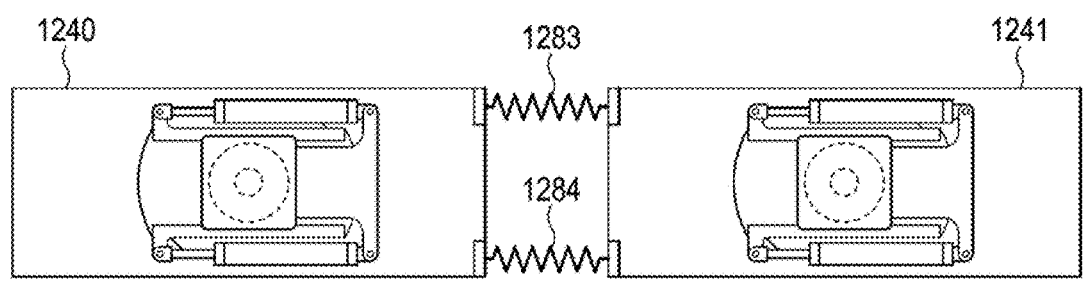
FIG. 12C
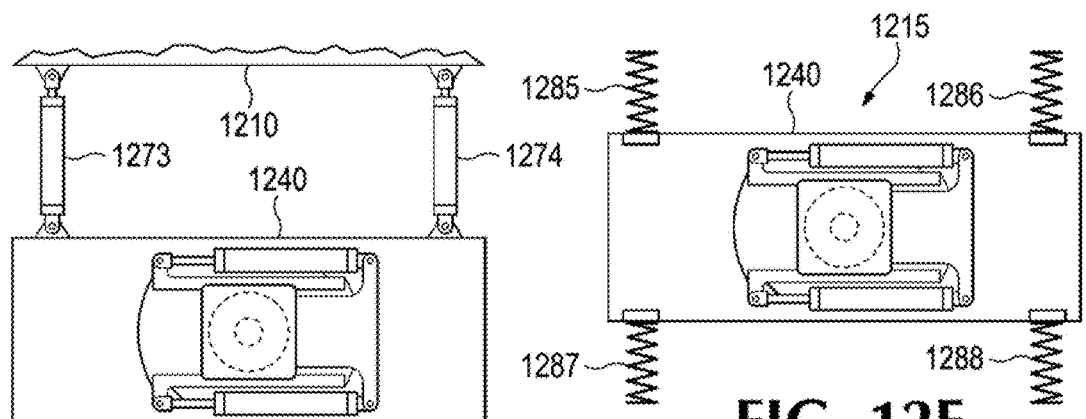
FIG. 12D
FIG. 12E

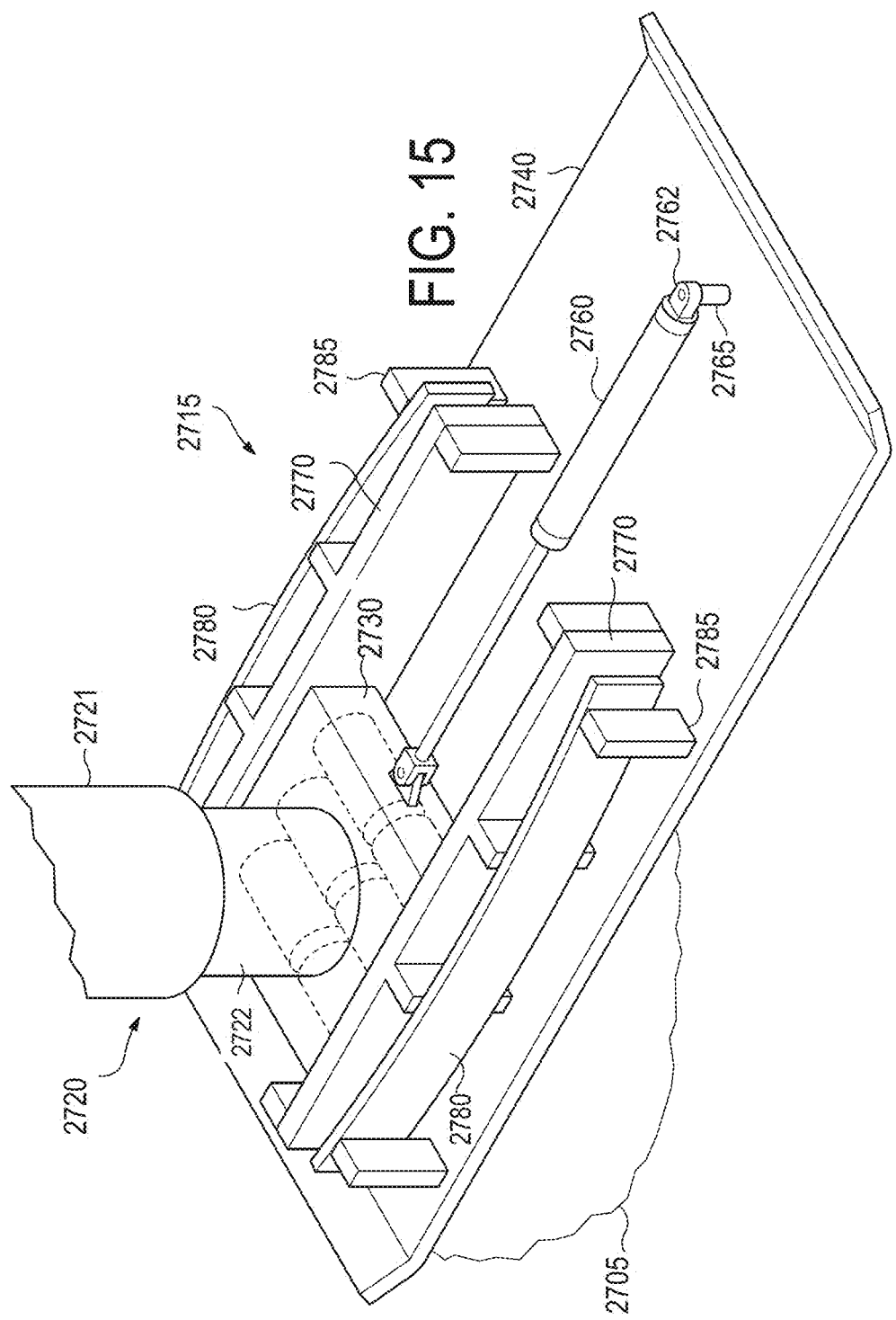

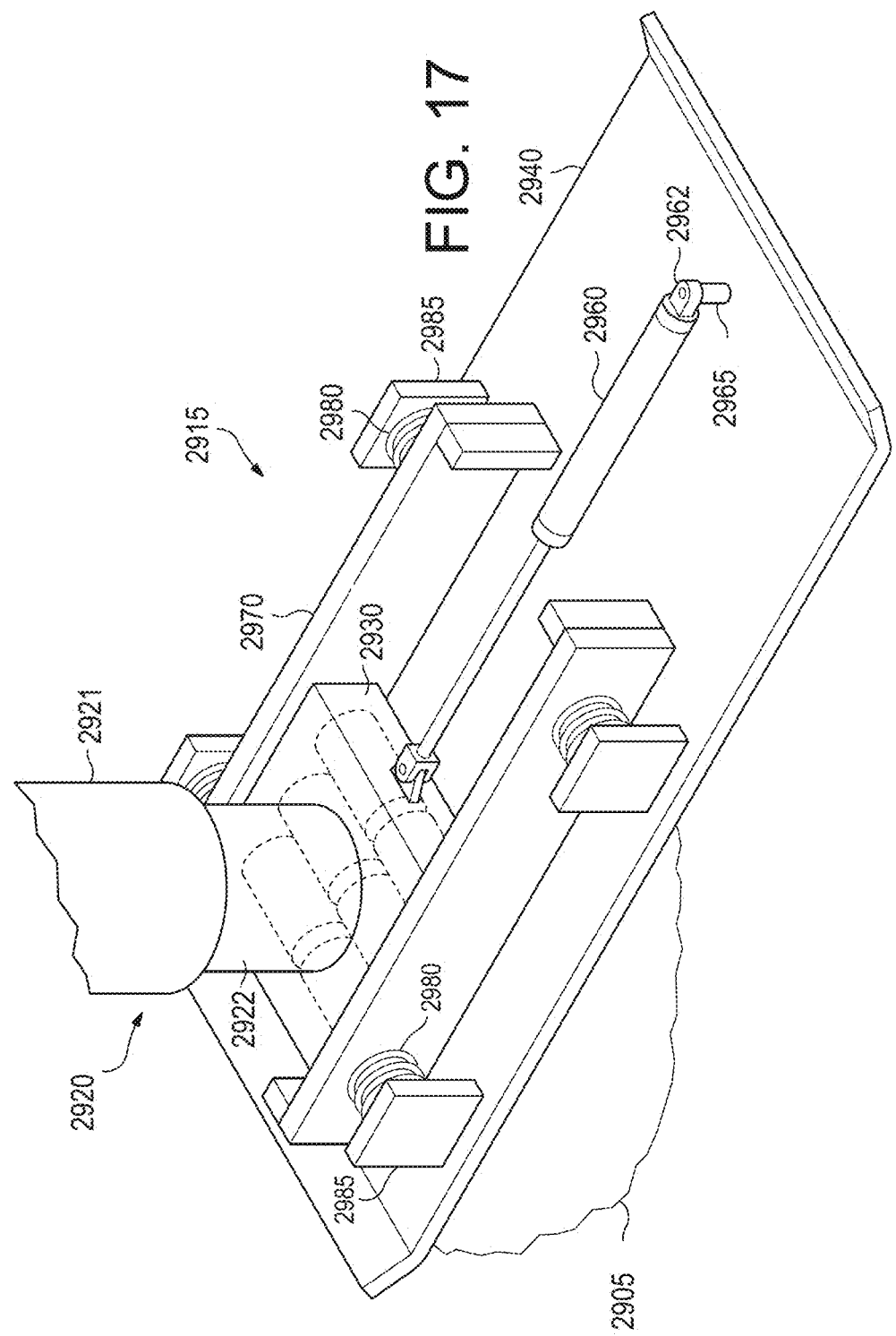

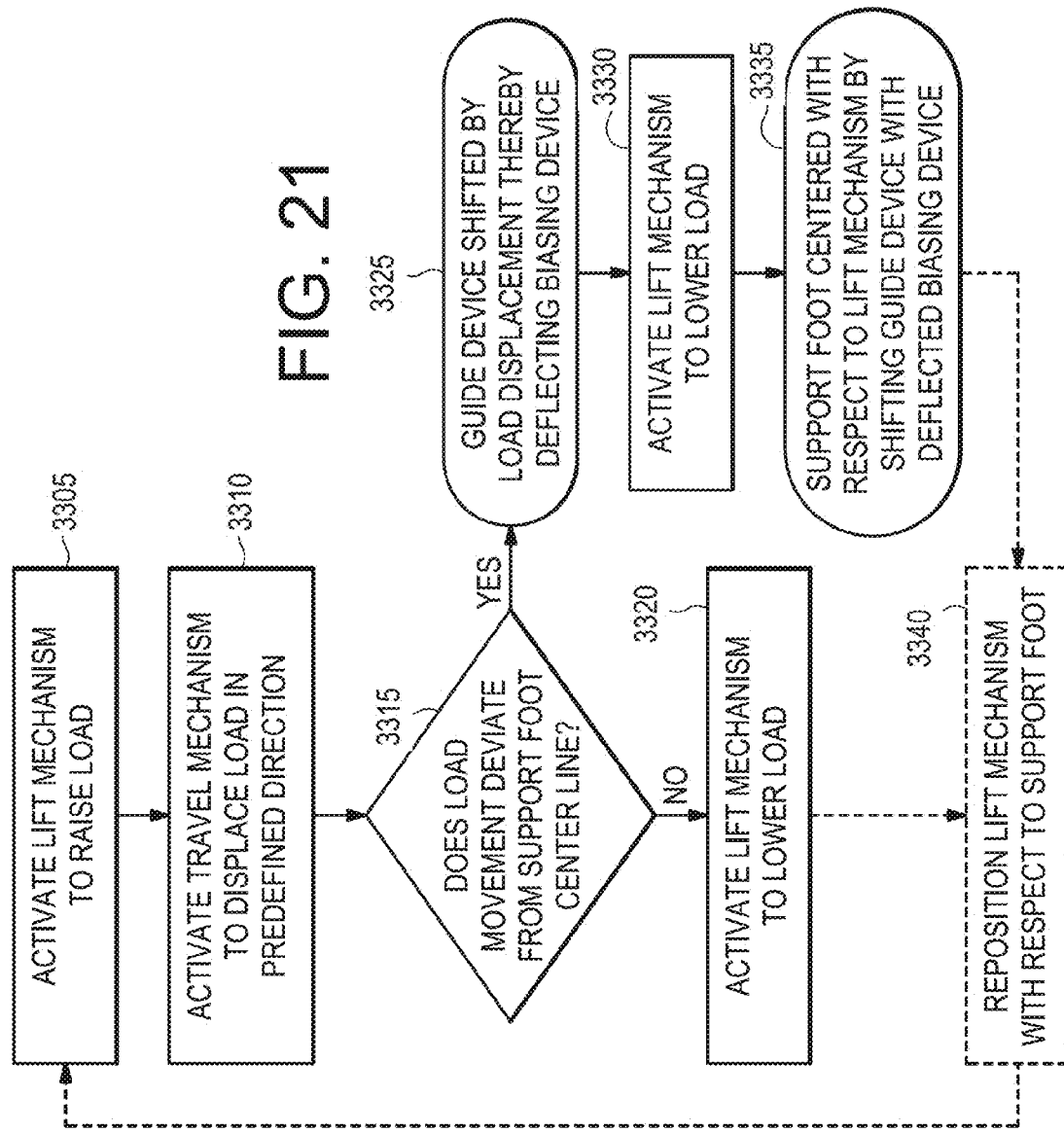

MOUNTING STRUCTURE WITH STORABLE TRANSPORT SYSTEM

STATEMENT OF RELATED MATTERS

This application is a continuation of U.S. patent application Ser. No. 15/285,366, filed Oct. 4, 2016, which claims priority to and is a continuation of U.S. patent application Ser. No. 14/529,566, filed Oct. 31, 2014, now U.S. Pat. No. 9,533,723, issued Jan. 3, 2017. U.S. patent application Ser. No. 14/529,566 is a continuation-in-part of U.S. patent application Ser. No. 13/909,969, filed Jun. 4, 2013, now U.S. Pat. No. 9,096,282, issued Aug. 4, 2015, which claims priority to U.S. Provisional Application No. 61/757,517, filed Jan. 28, 2013. U.S. Ser. No. 13/909,969 is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011. U.S. patent application Ser. No. 13/909,969 is also a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011. Additionally, U.S. patent application Ser. No. 13/909,969 is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011. The contents of all the above patents and patent applications are herein incorporated by reference in their entireties.

FIELD OF THE INVENTION

This disclosure relates generally to apparatuses for transporting a load, and more particularly to apparatuses for moving heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

SUMMARY

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

Other embodiments of the present invention are directed to a load transporting apparatus that automatically centers a support foot of the apparatus about a roller assembly during a recovery phase of an incremental walking movement. In particular, the load transporting apparatus includes guide devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

BRIEF DESCRIPTION OF THE DRAWINGS

FIGS. 12A, 12B, 12C, 12D, and 12E are diagrams of walking apparatuses with various alignment restoration devices according to embodiments of the invention.

FIG. 15 is a perspective view of an example walking apparatus according to embodiments of the invention.

FIG. 17 is a perspective view of another example walking apparatus according to embodiments of the invention.

FIG. 21 is a flow diagram illustrating method of operating a load transporting apparatus according to embodiments of the invention.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
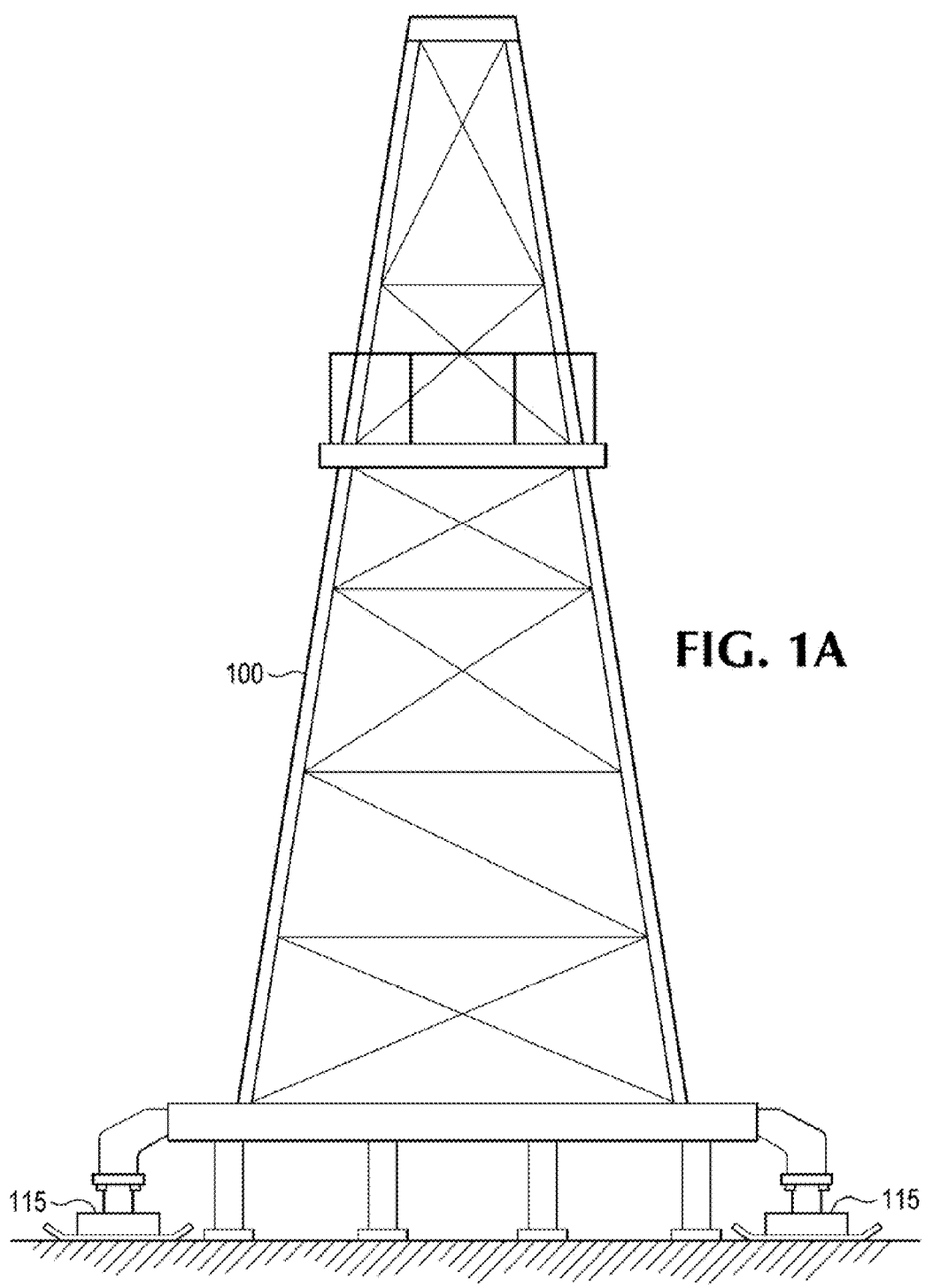
FIGS. 1A and 1B are diagrams of walking apparatuses attached to various loads according to embodiments of the invention.
Figure 1B:
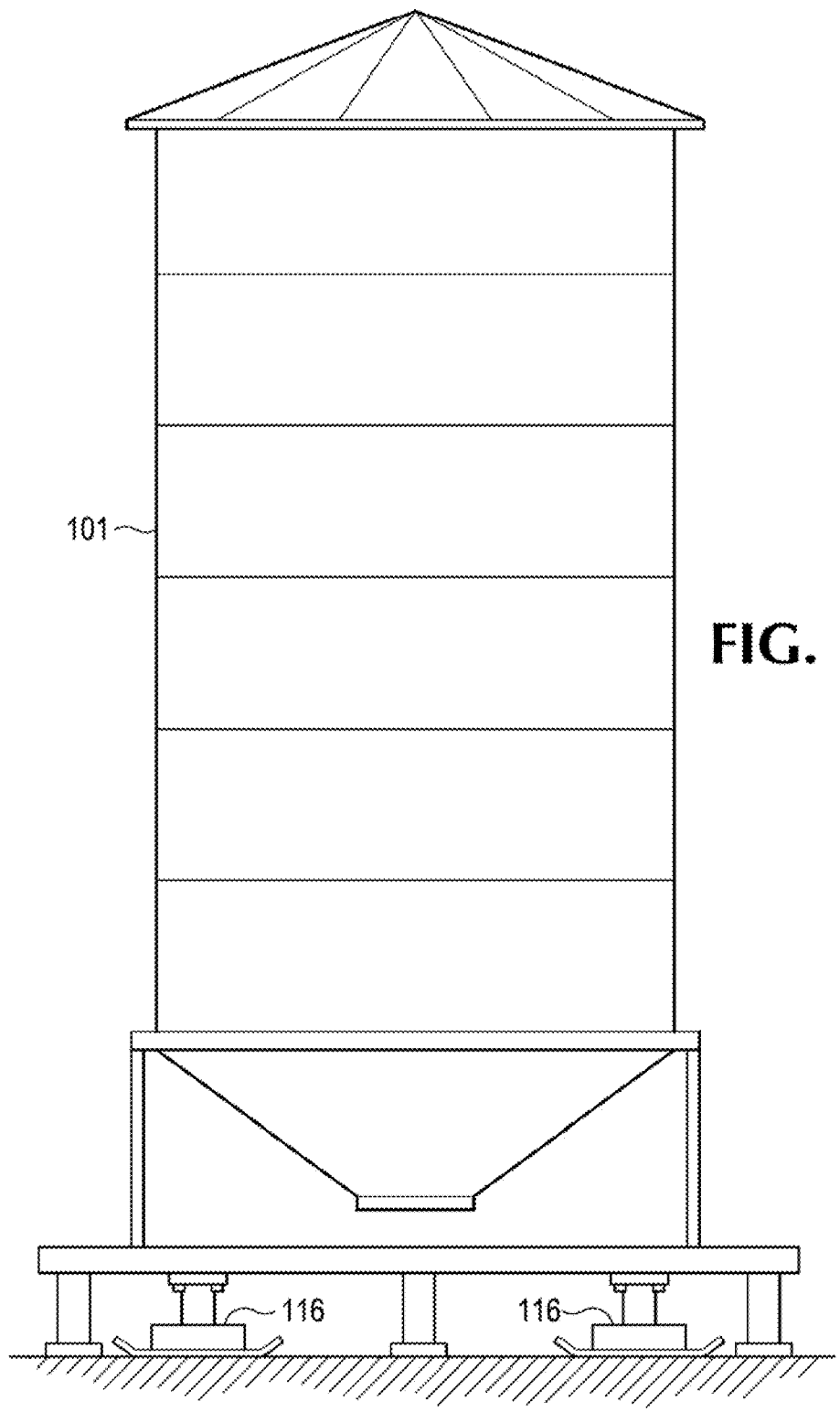

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
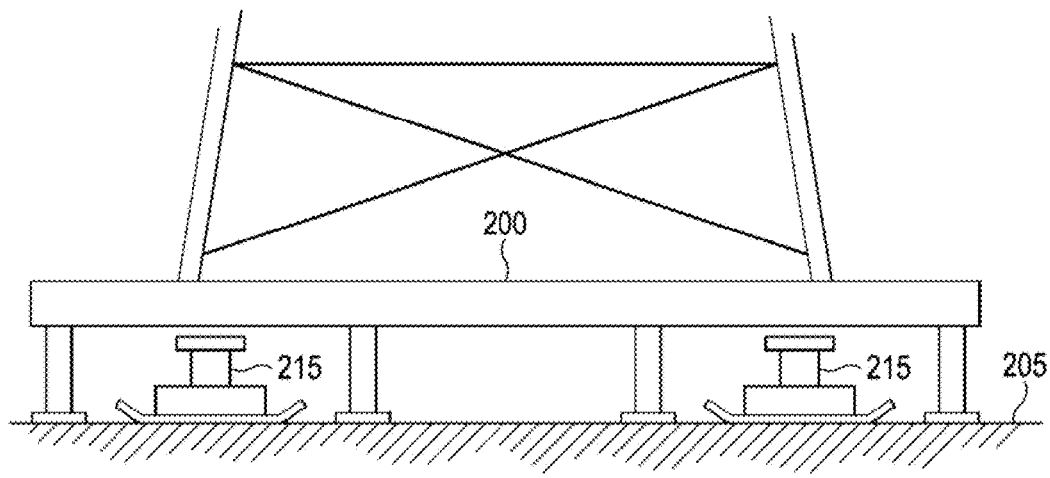
FIGS. 2A, 2B, 2C, 2D, 2E, and 2F are detail diagrams showing an example operational progression of walking apparatuses to move a load according to embodiments of the invention.
Figure 2B:
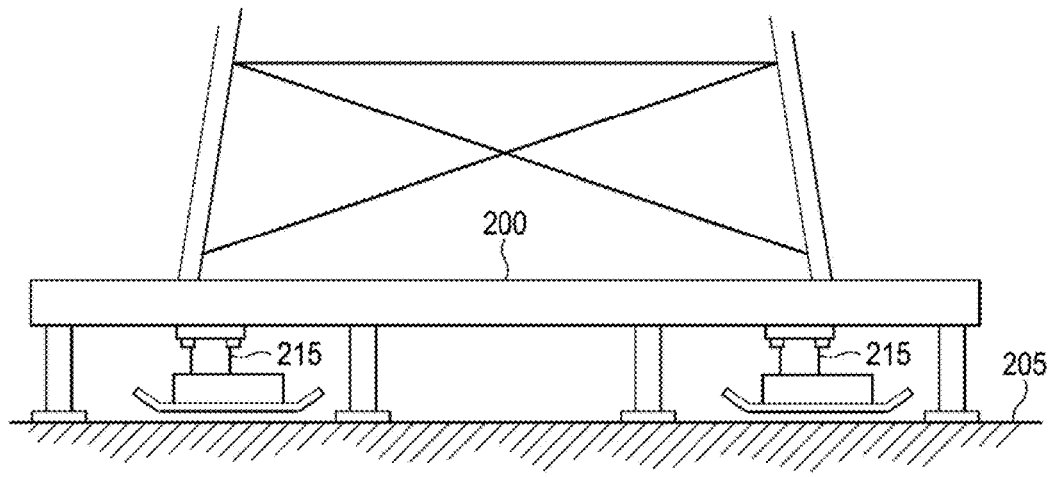
Figure 2C:
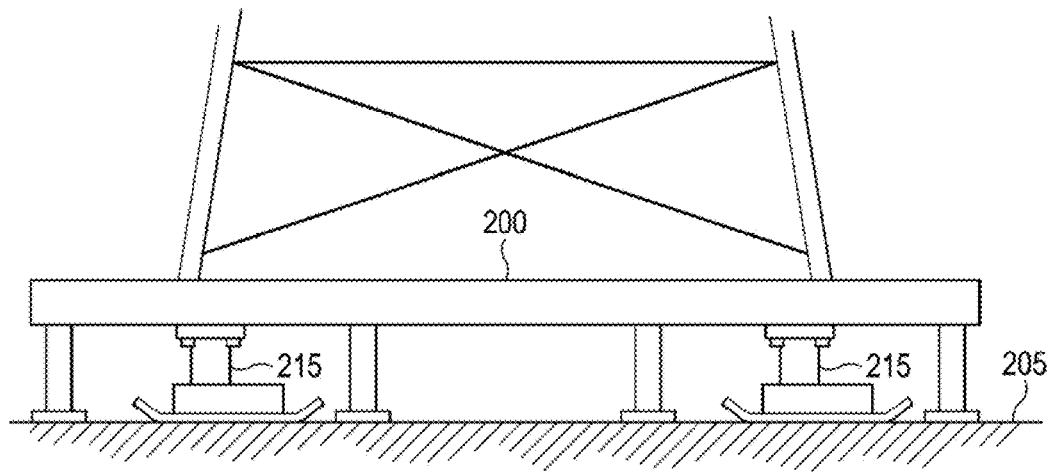

FIGS. 2A-2F provide an overview of an example operation of walking apparatuses to move a load according to embodiments of the invention. Referring to FIGS. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
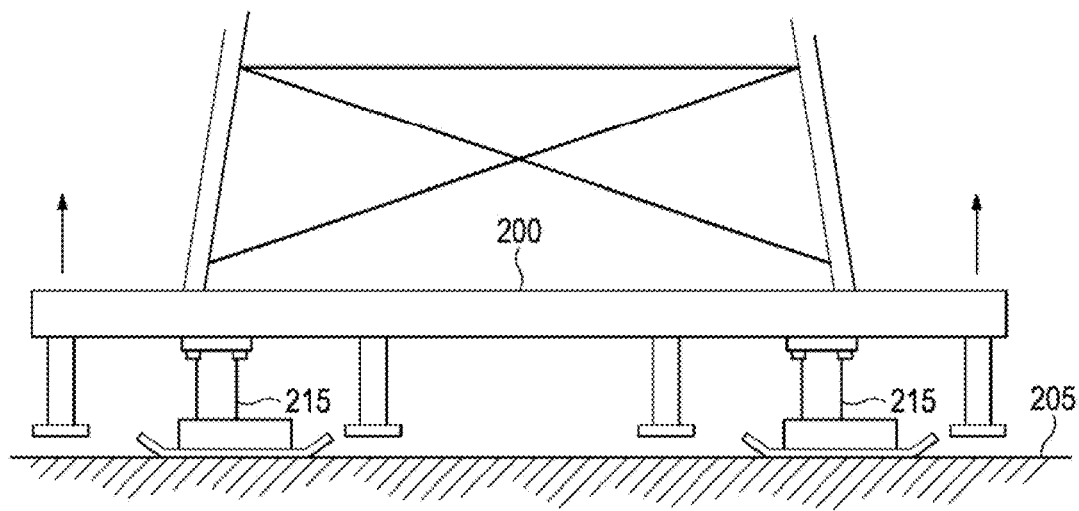

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
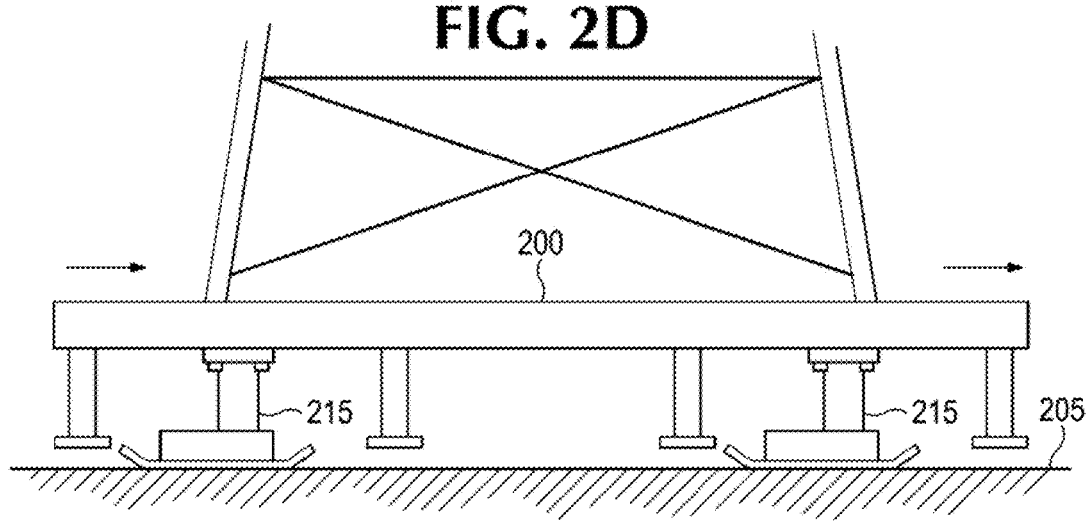
Figure 2F:
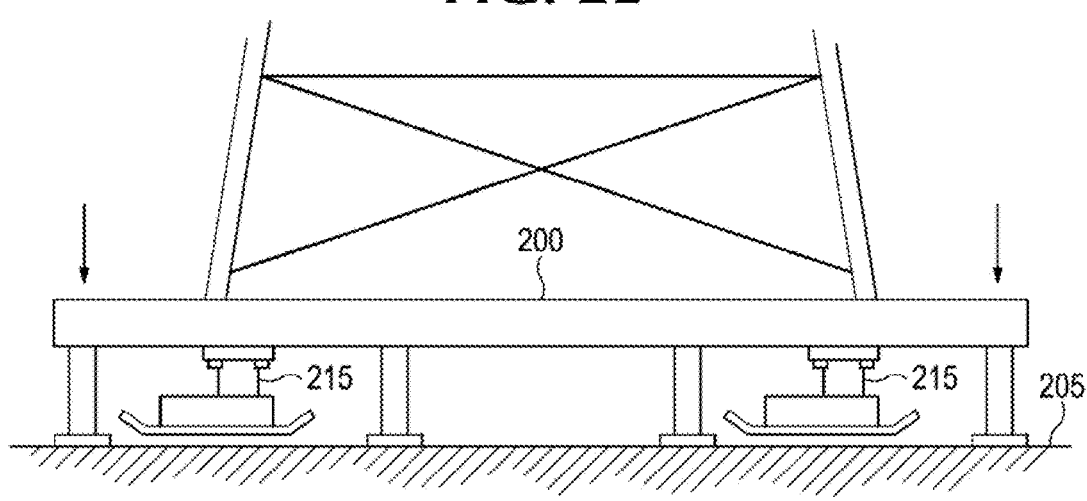

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2D to 2F.

Figure 3A:
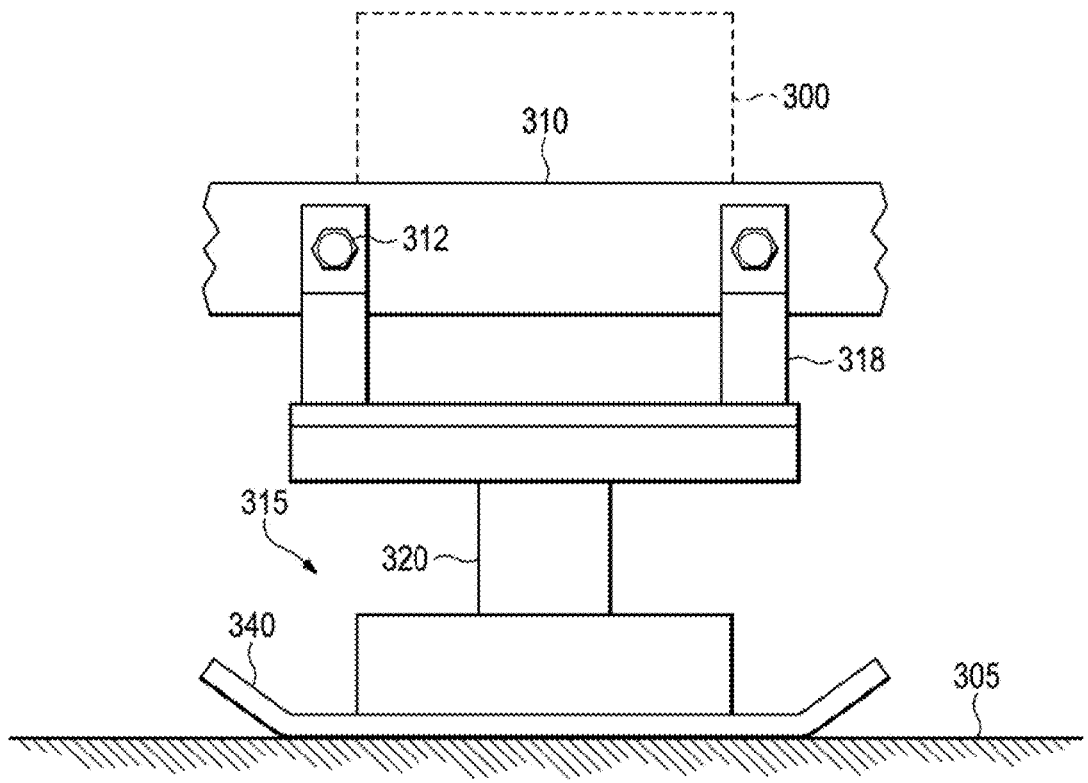
FIGS. 3A and 3B are diagrams illustrating example connection arrangements used to connect a walking apparatus to a load according to embodiments of the invention.
Figure 3B:
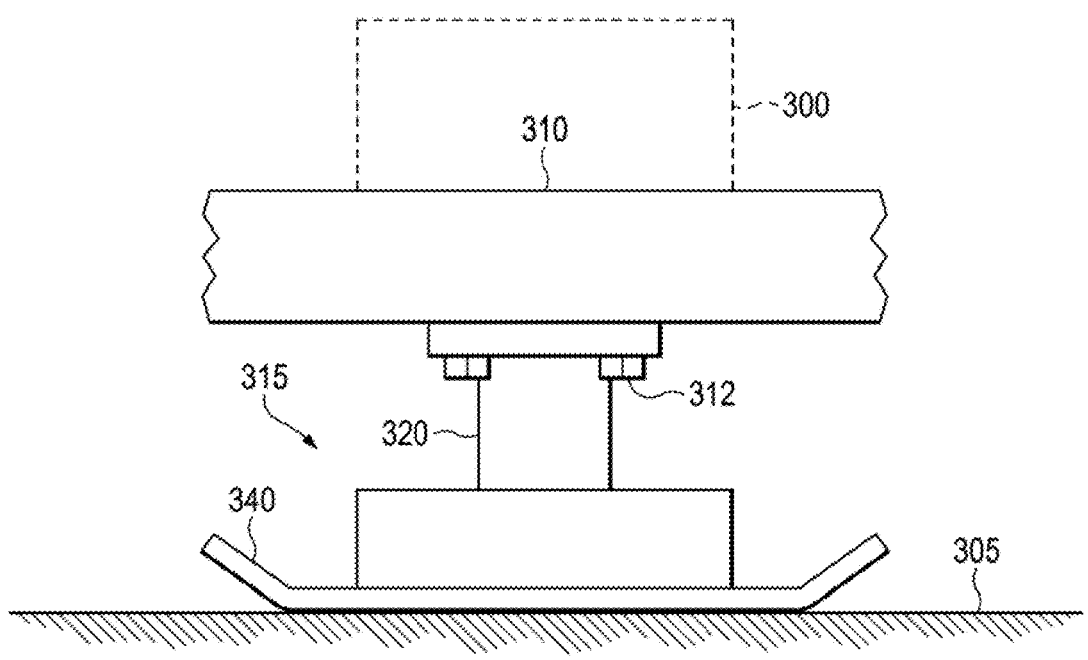

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
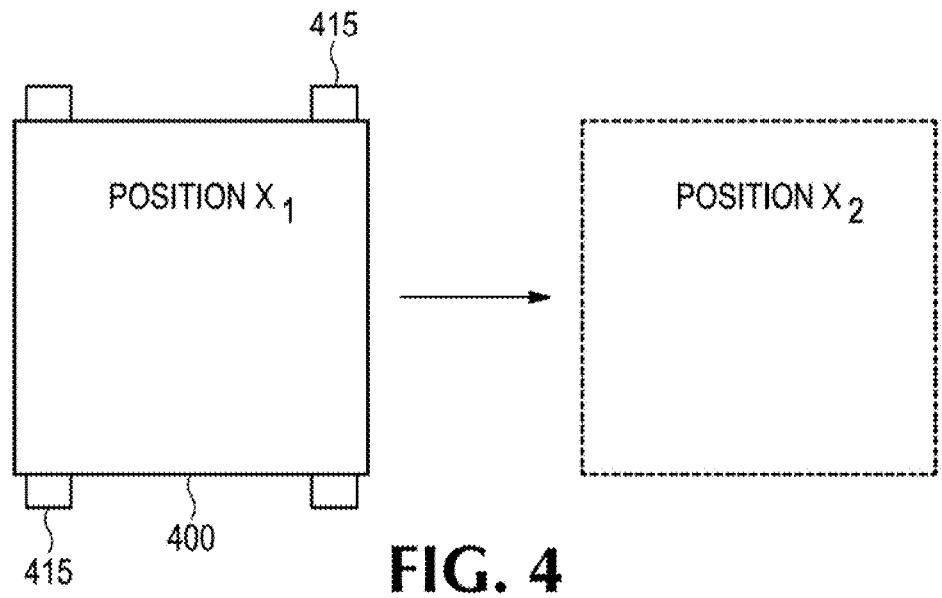
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
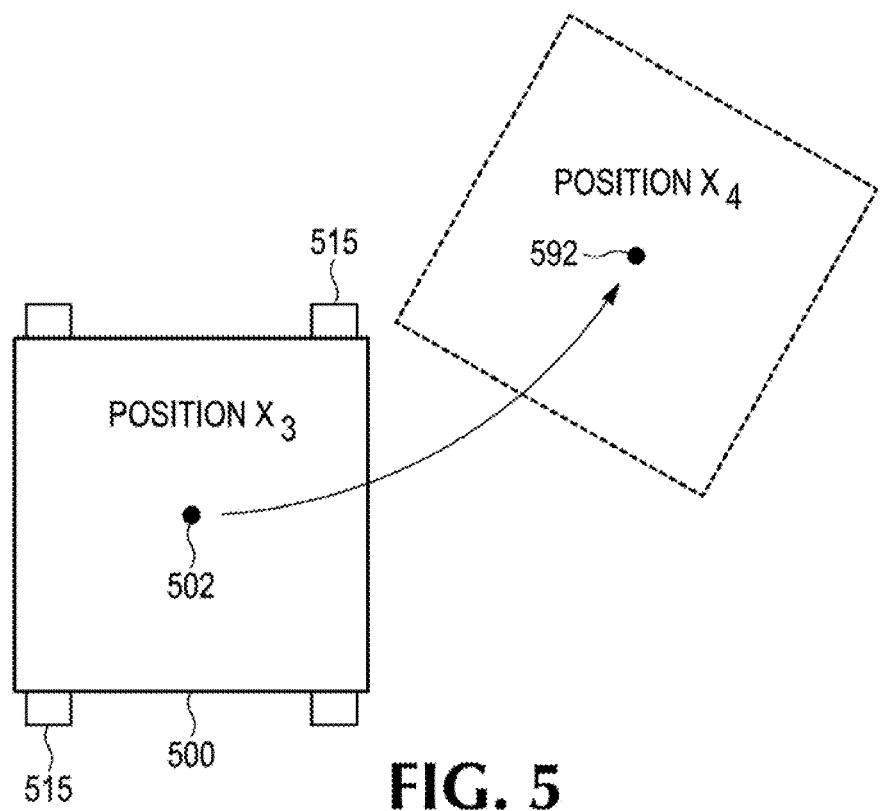
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6:
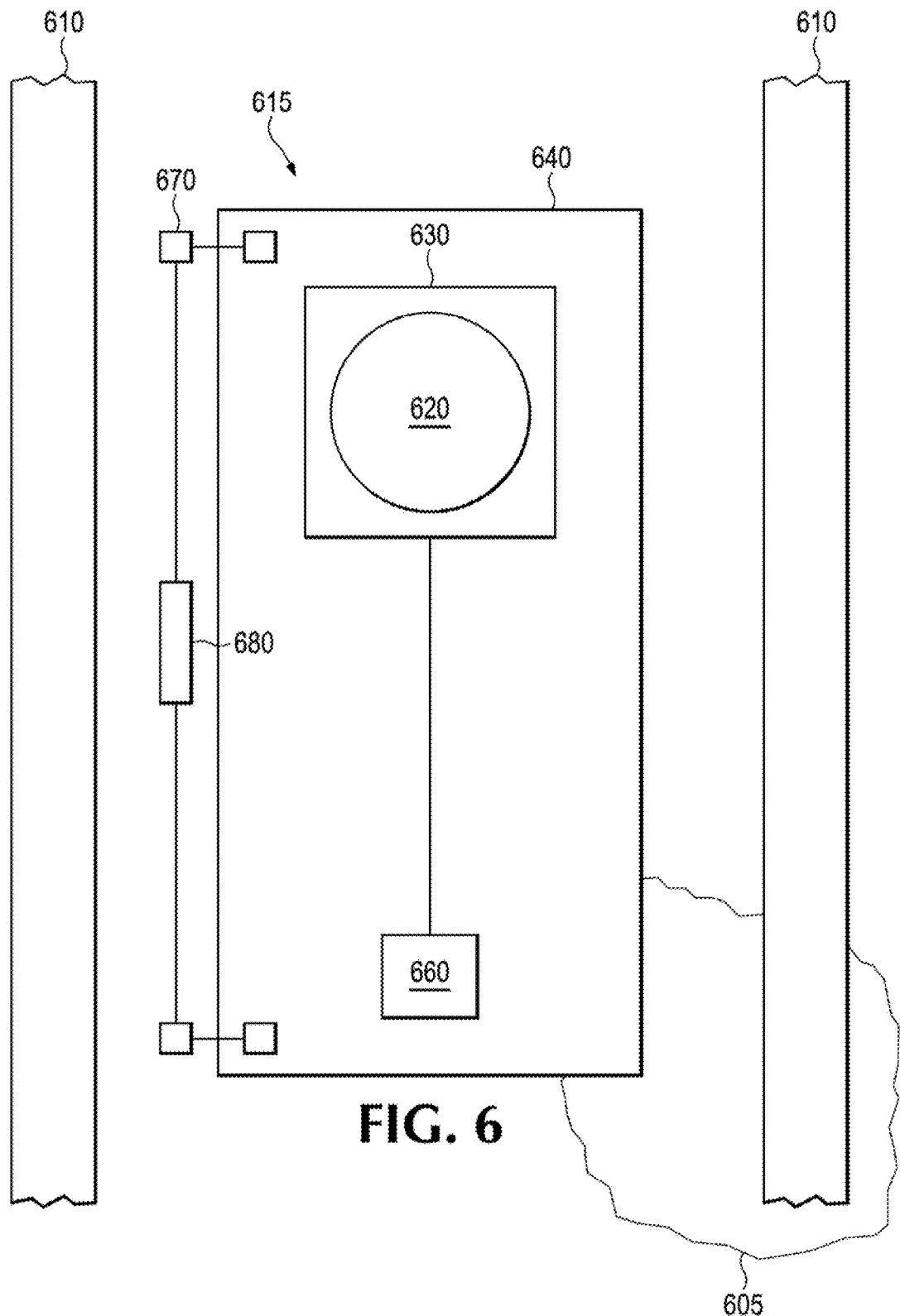
FIG. 6 is a schematic diagram of a top view of a walking apparatus according to embodiments of the invention.

FIG. 6 is a schematic diagram of a top view of a walking apparatus according to embodiments of the invention. Referring to FIG. 6, a load transporting apparatus 615 is configured to move a load (e.g., element 100 FIG. 1) over a base surface 605 in one or more incremental steps each including a load-movement phase and a recovery phase. The load transporting apparatus 615 includes a lift mechanism 620 structured to lift a load-bearing frame 610 supporting the load and a support foot 640 connected to the lift mechanism, the support foot structured to interface with the base surface 605. A roller assembly 630 is also coupled to the lift mechanism 620. A travel mechanism 660 is coupled to the roller assembly 620, and is structured to displace the roller assembly relative to the support foot 640. The load transporting apparatus also includes one or more linking devices 670 coupled to the support foot 640, and one or more biasing devices 680 coupled to the linking devices. The biasing devices 680 are structured to become activated during a load-movement phase when the roller assembly 630 is non-linearly displaced by the travel mechanism 660 relative to the support foot 640, and structured to return the support foot to an aligned position relative to the load-bearing frame 610 during a recovery phase. Here, the support foot 640 may be aligned with the load-bearing frame 610 when a longitudinal centerline of the support foot is parallel with a main beam of the load-bearing frame.

In these embodiments, the linking devices 670 are coupled to the biasing device 680 so that when the roller assembly 630 moves the load in a direction different than the orientation of the support foot 640, a deflection force is generated and/or stored as potential energy in the biasing device 680. This deflection force may be stored by deforming the biasing device 680 within the elastic region of a stress-strain curve associated with a material of the biasing device. For example, in embodiments where the biasing device 680 is a torsional bar, the deflection force transmitted to the biasing device during the non-linear displacement or movement may cause the torsional bar to twist.

The contact between the support foot 640 and the base or ground surface 605 creates substantial frictional forces that prevent the support foot from rotating or moving during the non-linear displacement. During the recovery phase of the walking cycle, the support foot 640 is raised above the base surface 605, which eliminates the frictional forces between the foot and the base surface. Once the support foot 640 begins to lose contact with the base surface 605, the potential energy stored in the biasing device 680 is used to return the support foot to an aligned position relative to the load-bearing frame 610. The alignment of the load-bearing frame 610 is dictated by the movement of the roller assembly 630 by the travel mechanism 660. Hence, when the roller assembly 630 is non-linearly displaced (e.g., moved such as shown in FIG. 5), the orientation of the load-bearing frame 610 becomes skewed from the orientation of the support foot 640. In the above example, where the biasing device 680 is a torsional bar, the support foot 640 is returned to a positioned aligned relative to the load-bearing frame 610 when the support foot loses contact with the base surface 605 and the torsion bar is allowed to "untwist," thereby re-orienting the support foot. In other words, the torsion bar is activated when an angular displacement occurs between the support foot 640 and the load-bearing frame 610, where the activation of the torsion bar including a torquing force being applied to the torsion bar.

Although a torsion bar is discussed as the biasing device 680, may different types of biasing devices may be used in other embodiments, such as leaf springs, coil springs, chains, hydraulic cylinders, motors, or any other type of device that can be deflected and/or store potential energy to apply a realignment force to the support foot 640.

Figure 7A:
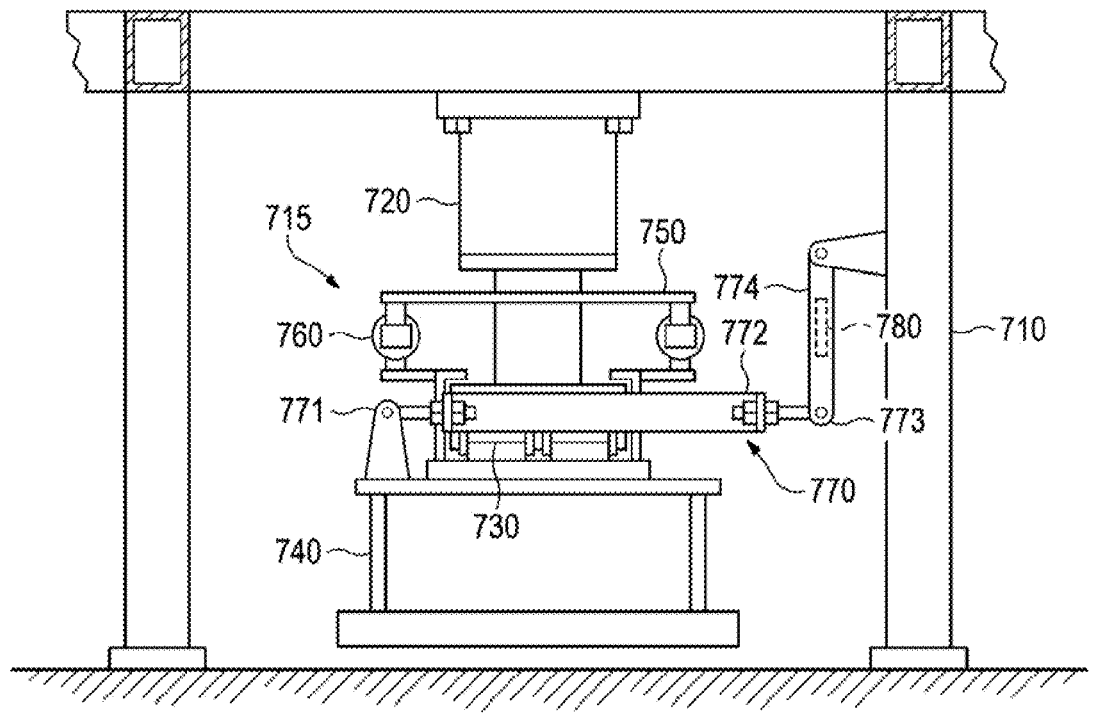
FIG. 7A is a side view of an example walking apparatus in a recovery position according to embodiments of the invention.
Figure 7B:
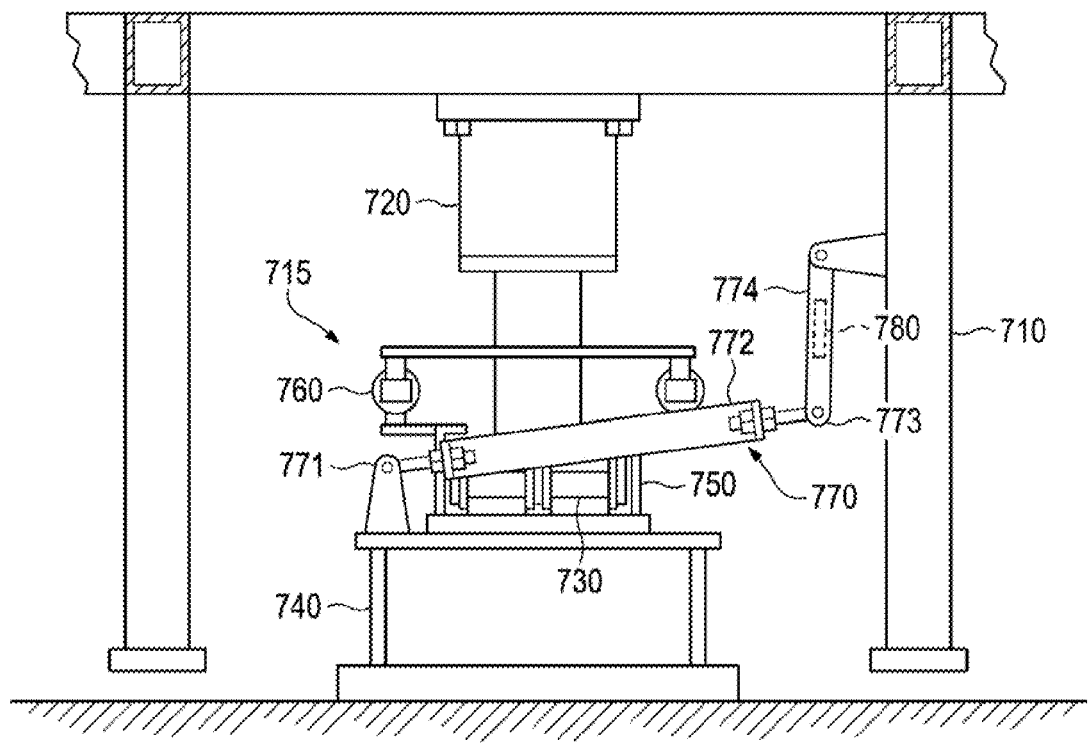
FIG. 7B is a side view of the example walking apparatus shown in FIG. 7A in a load-movement position according to embodiments of the invention.

FIG. 6 is presented in a schematic style view as many possible variations in the appearance and mechanical structure of the load transporting apparatus 615 exist. FIGS. 7A and 7B provide a more detailed view of one embodiment of a load transporting apparatus. FIG. 7A is a side view of an example walking apparatus in a recovery position according to embodiments of the invention. FIG. 7B is a side view of the example walking apparatus shown in FIG. 7A in a load-movement position according to embodiments of the invention. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710. Additional details regarding the structure of the load transporting apparatus 715 can be found in co-pending application Ser. No. 13/711,193, entitled ROTATION DEVICE FOR LOAD TRANSPORTING APPARATUS, the contents of which are herein incorporated by reference in their entirety.

The roller track 750 of the walking apparatus 715 may be coupled to the support foot 740 with a connection mechanism that allows the support foot to rotate relative to the roller track. Various connection mechanisms may be used to facilitate this relative rotation, such as a rotation pin described below in FIG. 9 and in the above mentioned application Ser. No. 13/711,193. In addition, the lift mechanism 720 may be structured to allow the roller assembly 730 to rotate about a substantially vertical axis in the center of a cylinder rod of the lift mechanism. That is, the roller assembly 730 may also be free to rotate around the cylinder rod of the lift mechanism 720.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain that rotate as well as roll on the roller track 750. That is, in some embodiments, the roller assembly 730 may include a WBOT series roller assembly from Hilman Rollers. Due to the configuration of the roller chain 730 of the roller assembly 730 and the tolerance between the roller assembly and the roller track 750 of the walking machine 715, the rollers of the roller chain will typically be engaged with the roller track during operation and use of the walking machine.

The roller assembly 730 may be secured to the lower end of the lift mechanism 720, with the roller assembly being captured within a U-shaped roller track 750. The roller assembly 730 may be configured to roll along the bottom inside surface of the roller track 750 as well as along the underside of the two upper flanges of the roller track. The one or more travel cylinders 760 may be coupled between the lift mechanism 720 and the roller track 750. Accordingly, as will be understood from the more detailed discussion below, these travel cylinders 760 permit for the translation of the roller track 750 relative to the lift mechanism 720 and vice versa. As discussed above, the roller track 750 may be secured to the elongate ground-engaging foot 740 (support foot) via a rotational pin (not shown in FIG. 7, but similar to element 955 of FIG. 9), which enables the roller track to be rotationally positioned relative to the foot for steering of the walking machine 715.

Figure 8A:
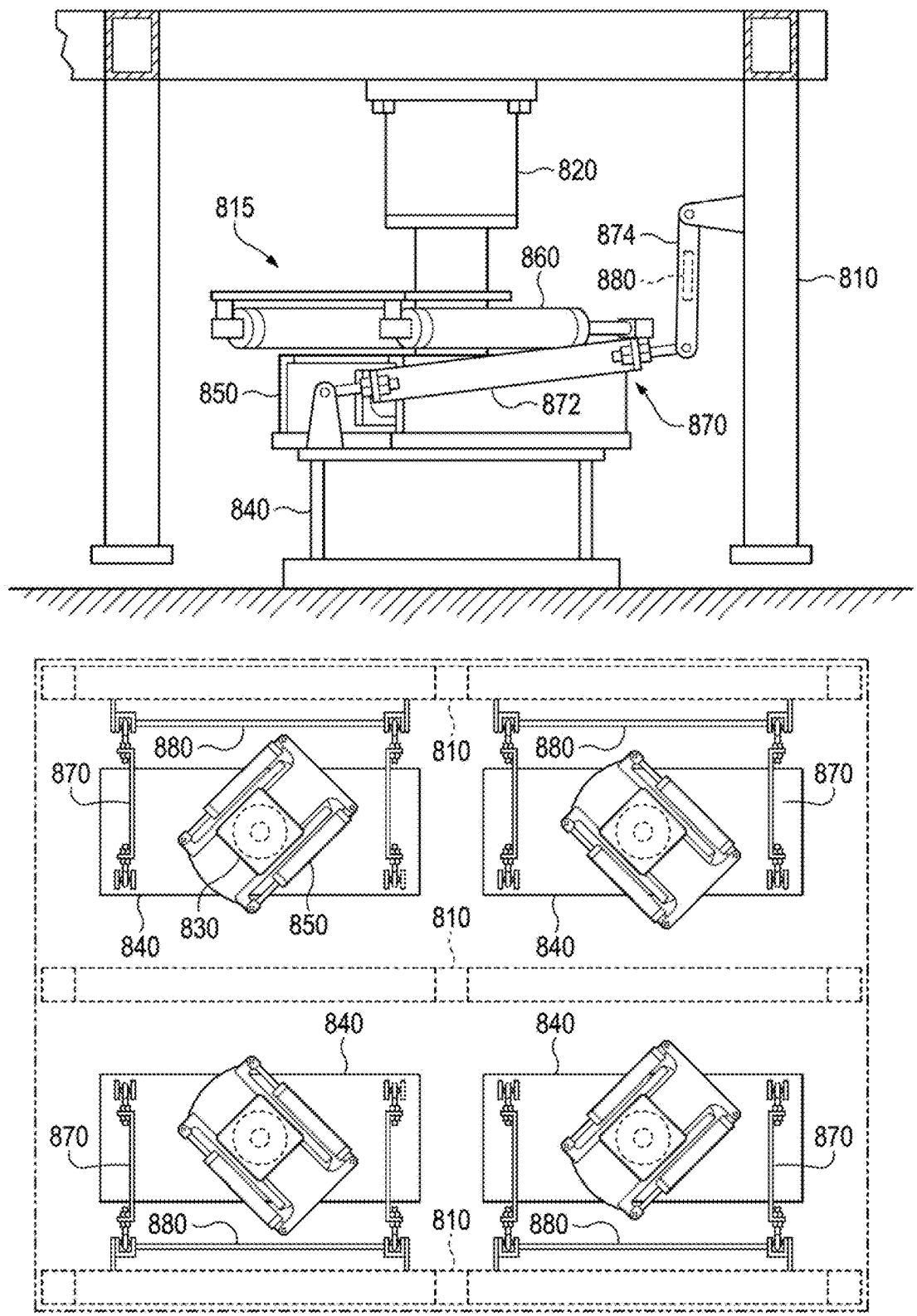
FIGS. 8A, 8B, 8C, and 8D are side and top views of walking apparatuses that illustrate an example operation progression of a load transporting system according to embodiments of the invention.

As shown in FIGS. 7A and 7B, a linking mechanism 770 is coupled to the support foot 740 and a biasing device 780 (shown more clearly as element 880 in FIG. 8A). In some embodiments, the linking mechanism 770 may include a first linking device attached at a first end of the support foot 740, where a second linking device connected to a second end of the support foot opposite of the first end of the first support foot (such as shown in FIGS. 6 and 8A). The biasing device 780 may be coupled between the first and second linking devices of the linking mechanism 770.

In the embodiments shown in FIGS. 7A and 7B, the linking mechanism 770 includes a first linking rod 772 connected to the support foot 740 with a first pivot joint 771. In some embodiments, the first pivot joint 771 may be a spherical rod end bearing configured to allow movement in three degrees of freedom. In other embodiments, the first pivot joint 771 may be another type of joint, such as a hinge joint, that restricts movement to one or two degrees of freedom.

The linking mechanism 770 may also include a second linking rod 774 connected to the first linking rod 772 with a second pivot joint 773. As with the first pivot joint 771, the second pivot joint 773 may be a spherical rod end bearing, or any other type of joint. The second linking rod 774 may further be connected to the load-bearing frame 710. In other embodiments, the one or more biasing devices 780 are also coupled to the load-bearing frame 710.

As shown in FIGS. 7A and 7B, the first and second pivot joints 771, 773 allow linking mechanism 770 to move vertically with the support foot 740 without deflecting or otherwise activating the biasing device 780.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the movement of the roller assembly 730 deviates from a set direction of travel, and structured to return the support foot to a centered position relative to the support foot 740 during a recovery phase.

FIGS. 8A, 8B, 8C, and 8D are side and top views of walking apparatuses that illustrate an example operation progression of a load transporting system according to embodiments of the invention. Here, FIGS. 8A-8C may show a load-movement phase of a walking cycle, while FIG. 8D may show a recovery phase of a walking cycle, where the walking apparatus is in a spin steering mode.

Referring to FIG. 8A, a walking apparatus includes a support foot 840 positioned on a base surface 805 and connected to roller track 850. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. A linking device 870 includes a first linking member 872 that is connected to the support foot, and a second linking member 874 that connects the first linking member to the load-bearing frame 810. A biasing device 880 is also connected to the linking device 870, and structured to become deflected or activated during a non-linear movement of the roller assembly 830 relative to the support foot 840. As shown in FIG. 8A, the walking apparatus 815 is in an initial position of a walking cycle in a spin steering mode. The roller tracks 850 of each walking apparatus 815 are oriented in a desired direction of travel. Here, in this first step of making a spin movement, the lift mechanisms 820 are activated to lift the load-bearing frame 810 (and load) above the base surface.

Figure 8B:
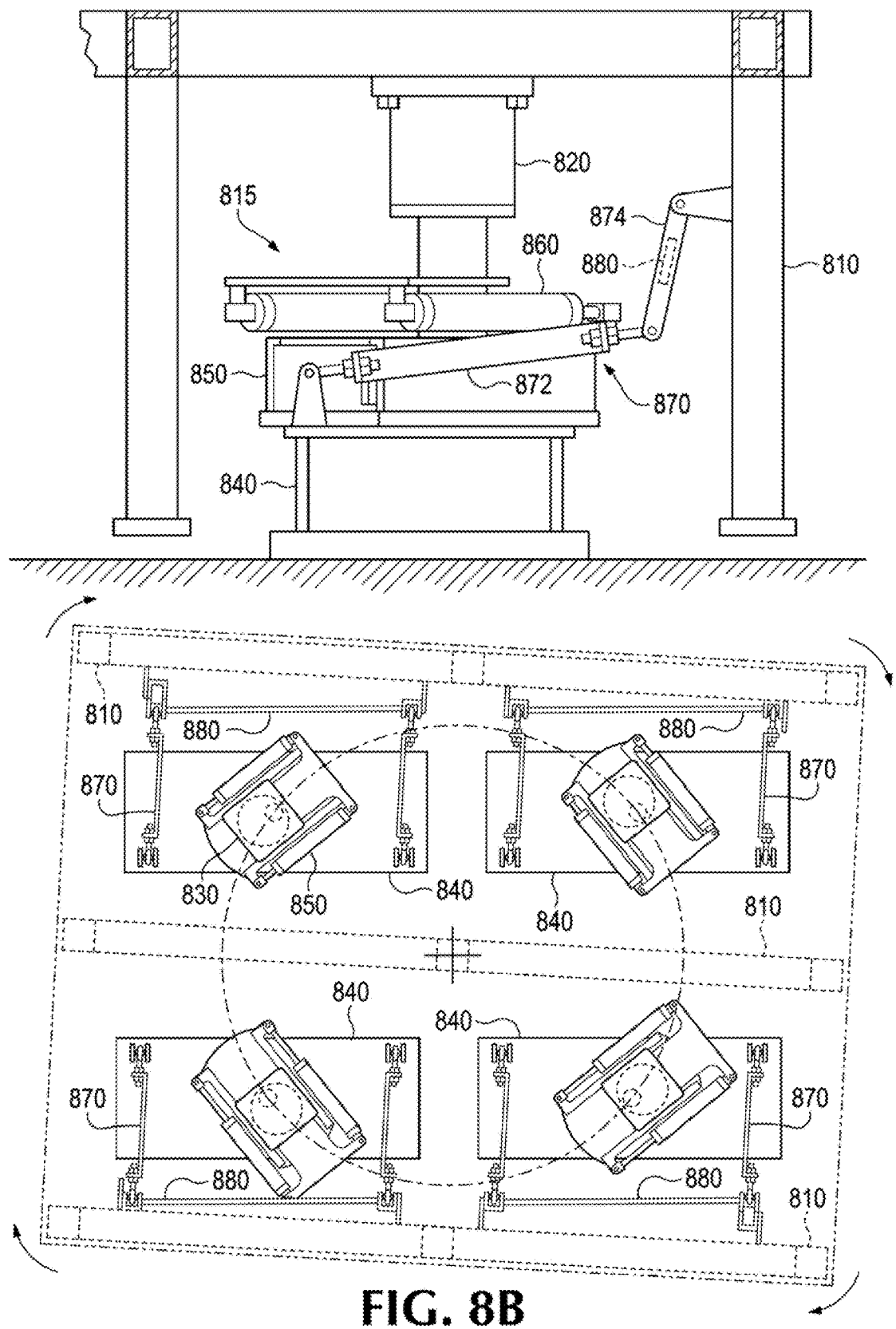

Referring to FIG. 8B, a step in a walking motion of the walking machine is illustrated. Specifically, as indicated by the arrows showing rotation of the load-bearing frame 810, the travel mechanism 860 is activated to displace the roller assembly 830 relative to the roller track 850 as shown. In this second step the walking system is moved in a circular or spin direction. Here, the travel cylinders of the travel mechanism 860 are actuated and the load-bearing frame 810 moves to a new angle. The support feet 840 are on the support surface and an angle of displacement occurs between the load-bearing frame 810 and the support feet. This non-linear movement or angular displacement causes an angular change in the biasing device 880. In embodiments where the biasing device 880 is a torsion bar, the resulting torque on the torsion bar causes the part of the linking device 870 to be in compression and causes another part of the linking device to be in tension.

Figure 8C:
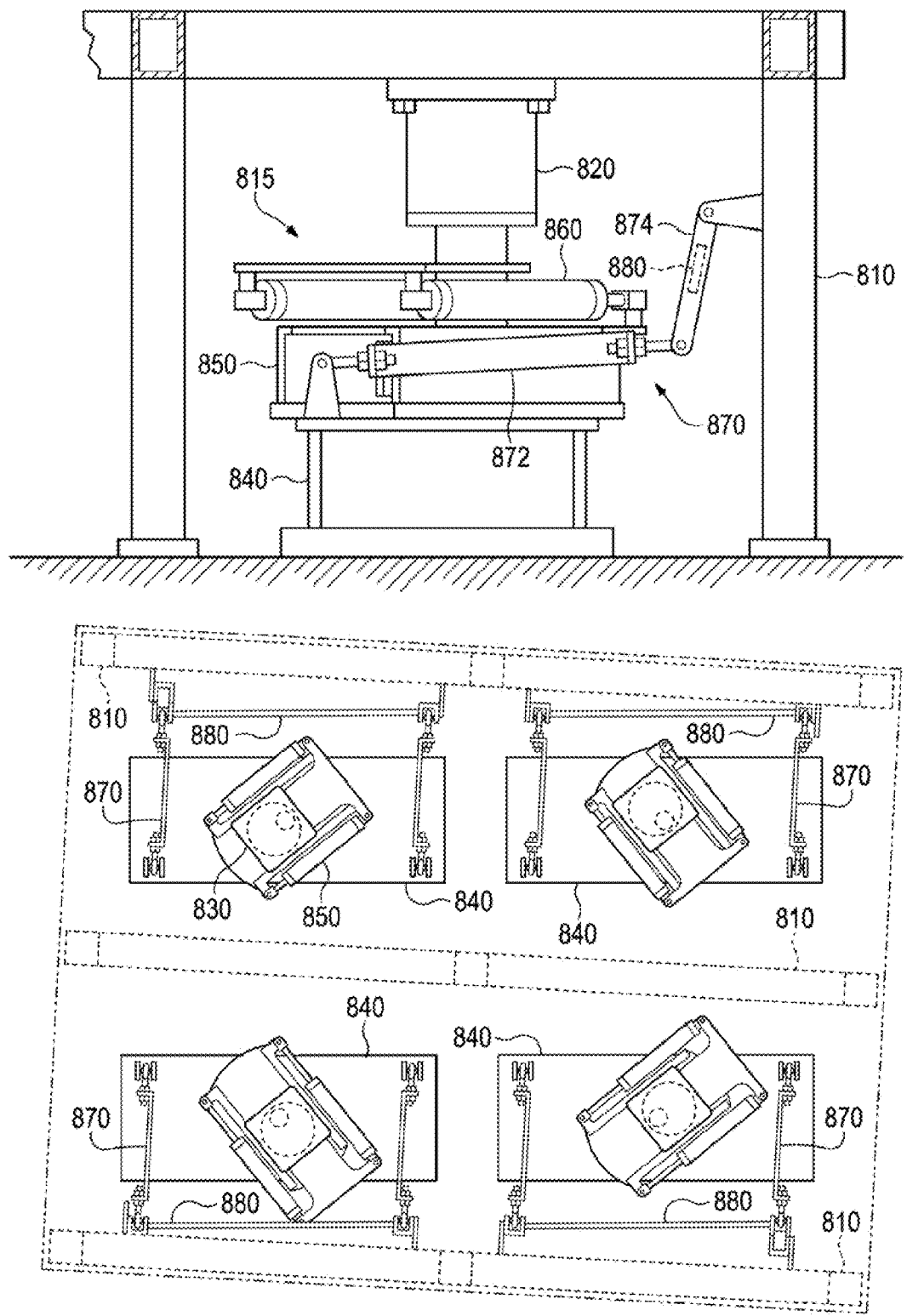

Referring to FIG. 8C, the travel mechanism 860 has finished moving the roller assembly 830 and load-bearing frame 810. Additionally, the lift mechanism 820 has been activated to lower the load and load-bearing frame 810. Here, the load-bearing frame 810 has just contacted the ground surface. However, the support foot 840 is still positioned on the ground surface as well. Hence, the biasing devices 880 are still in a deflected, activated, or biased state.

Figure 8D:
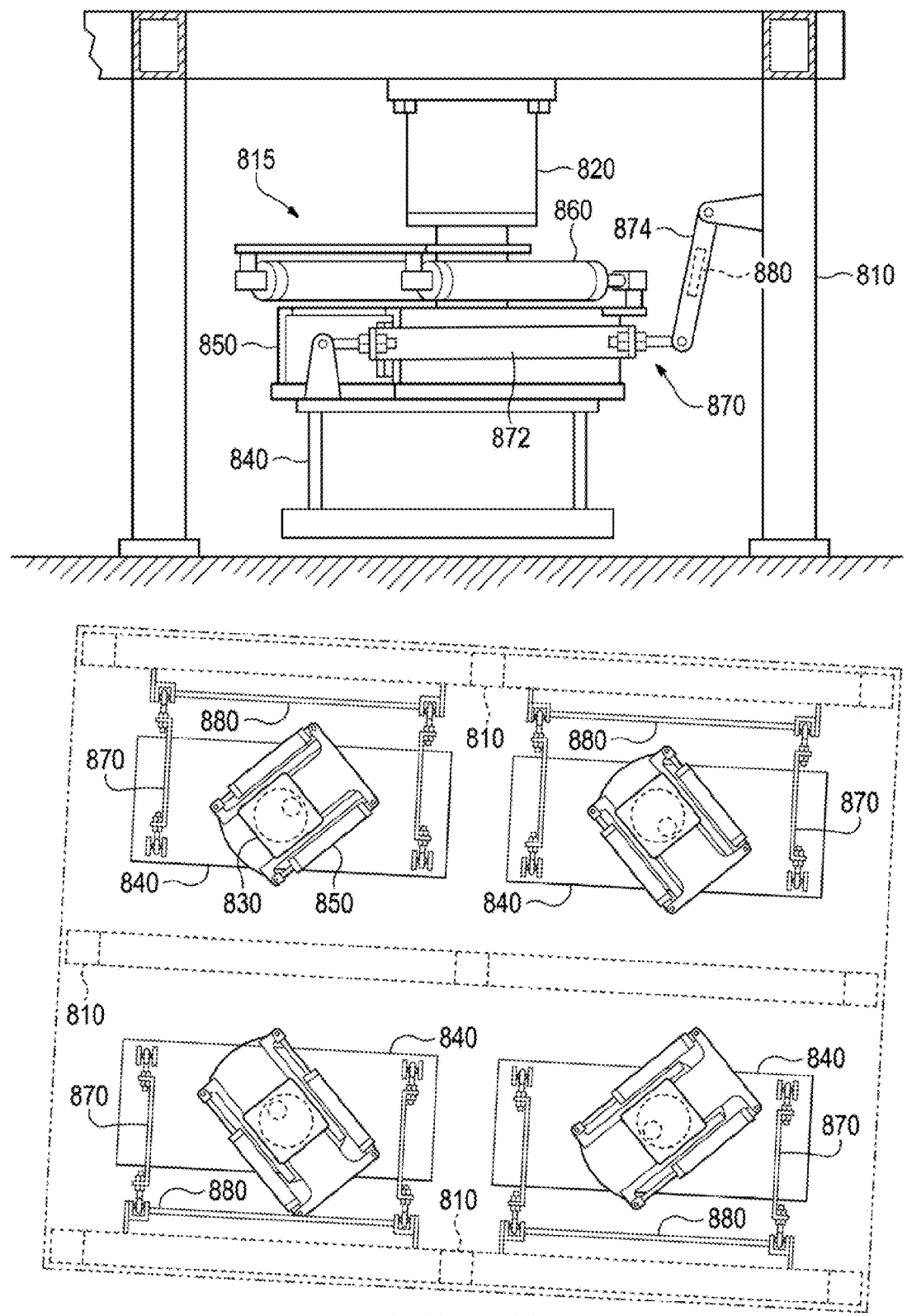

Referring to FIG. 8D, the lift mechanism 820 is continued to be operated such that the support foot 840 loses contact with the ground surface. As soon as this connection between the support foot 840 and the ground surface disappears, the biasing device 880 causes the support foot to "snap" back into alignment with the load-bearing frame 810 as shown.

Figure 9A:
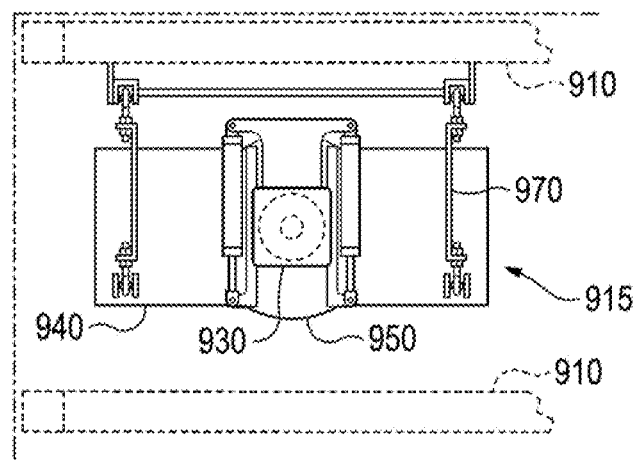
FIG. 9A is a top view of a walking apparatus in a perpendicular orientation according to embodiments of the invention.
Figure 9B:
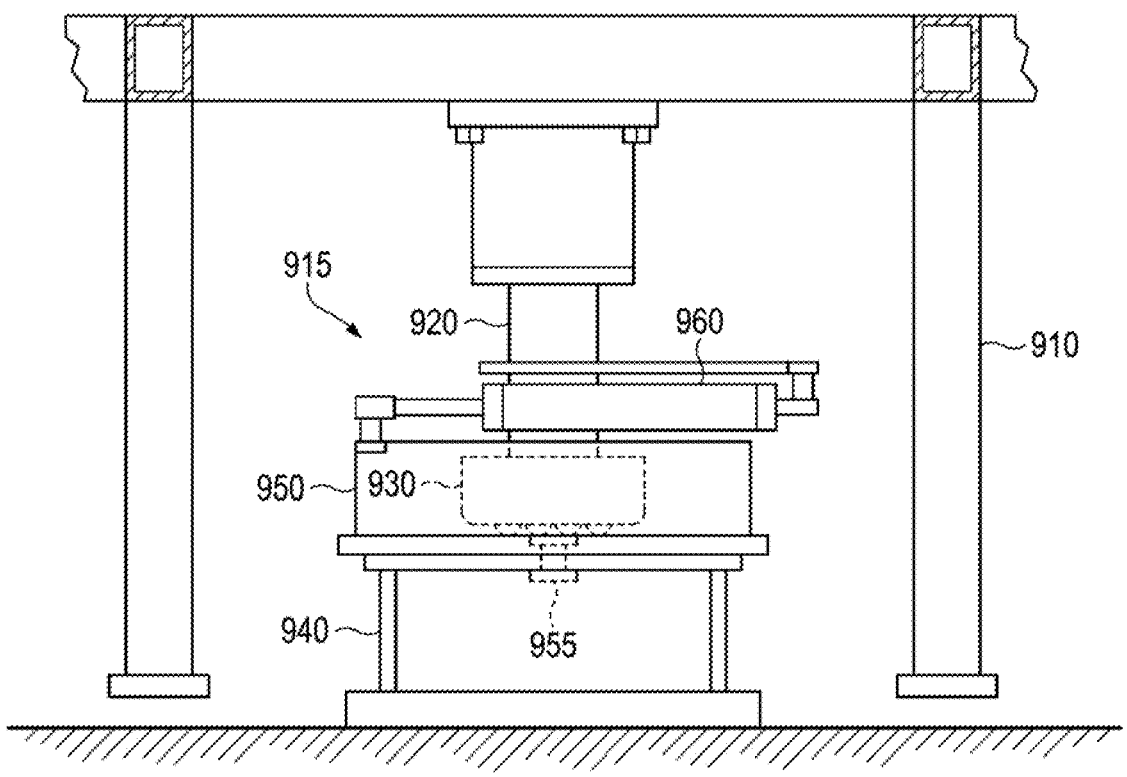
FIG. 9B is a side view of the walking apparatus shown in FIG. 9A in a load-movement position according to embodiments of the invention.
Figure 9C:
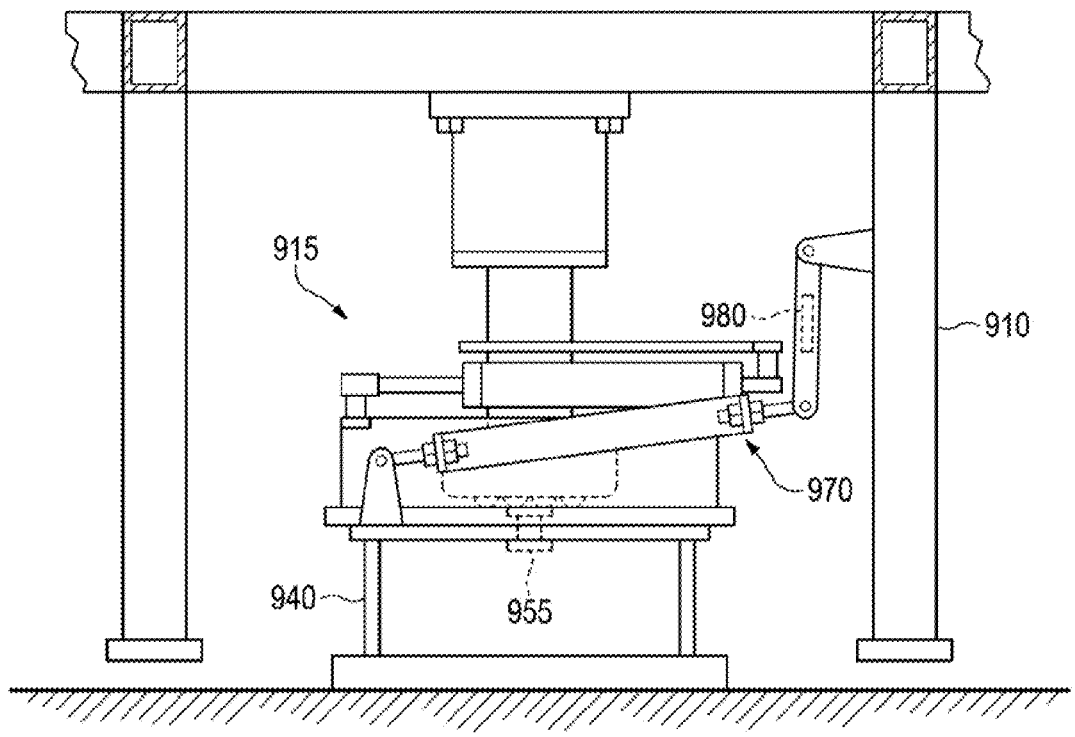
FIG. 9C is a side view of the walking apparatus shown in FIG. 9A in a recovery position according to embodiments of the invention.

FIGS. 9A-9C illustrate another embodiment of a walking apparatus. Here, FIG. 9A is a top view of a walking apparatus in a perpendicular orientation according to embodiments of the invention. FIG. 9B is a side view of the walking apparatus shown in FIG. 9A in a load-movement position where the linking devices have been removed for clarity sake. FIG. 9C is a side view of the walking apparatus shown in FIG. 9A in a recovery position with the linking devices added back in for reference purposes.

Referring to FIGS. 9A-9C, a walking apparatus 915 includes a lift mechanism 920 coupled to a load-bearing frame 910 that supports a load to be moved. The lift mechanism 920 is connected to a roller assembly 930 that is positioned on a roller track 950. The roller assembly 930 is moved relative to the roller track 950 with one or more travel mechanisms 960. The roller track 950 is coupled to a support foot 940 with a rotation pin 955, such as a king pin or other connection means that allows rotation of the roller track relative to the support foot as described in the rotation device application (Ser. No. 13/711,193) cited above. A linking device 970 is coupled between the support foot 940 and the load-bearing frame 910. A biasing device 980 is connected to the linking device 970. As described above, the biasing device 980 becomes deflected or activated when the roller assembly 930 moves in a non-linear direction relative to the support foot 940. For example, the roller track 950 is oriented perpendicular to the orientation of the support foot 940 in FIG. 9A. As the roller assembly 930 moves in the direction of the orientation of the roller track 950, the roller assembly and the load-bearing frame will also move substantially perpendicularly to the orientation of the support foot 940.

Here, the movement of the roller assembly 930 in this orientation does not activate or deflect the biasing device 980 because the linking devices 970 include joints that allow for the free movement of the roller assembly. The linking devices 970 may be structured in this manner because the orientation of the support foot 940 relative to the load-bearing frame 910 does not change.

Figure 10:
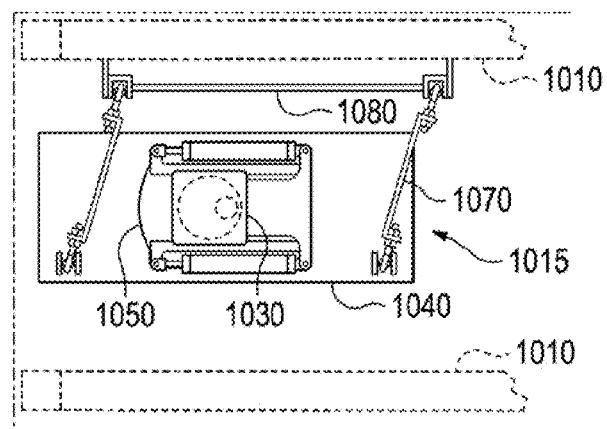
FIG. 10 is a top view of a walking apparatus after a load-movement phase of a walking cycle completed in a parallel direction according to embodiments of the invention.

This can also be seen when the roller assembly is moved parallel to the orientation direction of the support foot, as shown in FIG. 10. Referring to FIG. 10, a walking apparatus 1015 has just completed a load-movement phase of a walking cycle where a roller track 1050 is oriented in the same direction as a support foot 1040. Here, the roller assembly 1030 was moved to the right, along with the load-bearing frame 1010, as shown. The joints of the linking device 1070, however, allow the linking device to be angled from the linear movement without deflecting or otherwise activating the biasing device 1080. During a recovery phase, the load-bearing frame 1010 is lowered and the support foot 1040 is raised above a base surface. The support foot 1040 can then be repositioned relative to the roller assembly 1030 by activation of the transport mechanism 960 (FIG. 9B).

Some of the embodiments discussed above rely on the load-bearing frame as a reference point to realign the support feet during non-linear movements of the load. However, in other embodiments, other linking and biasing devices can be utilized to maintain alignment of the support feet. Some of these techniques are discussed below with respect to FIGS. 11 and 12A-12E.

Figure 11:
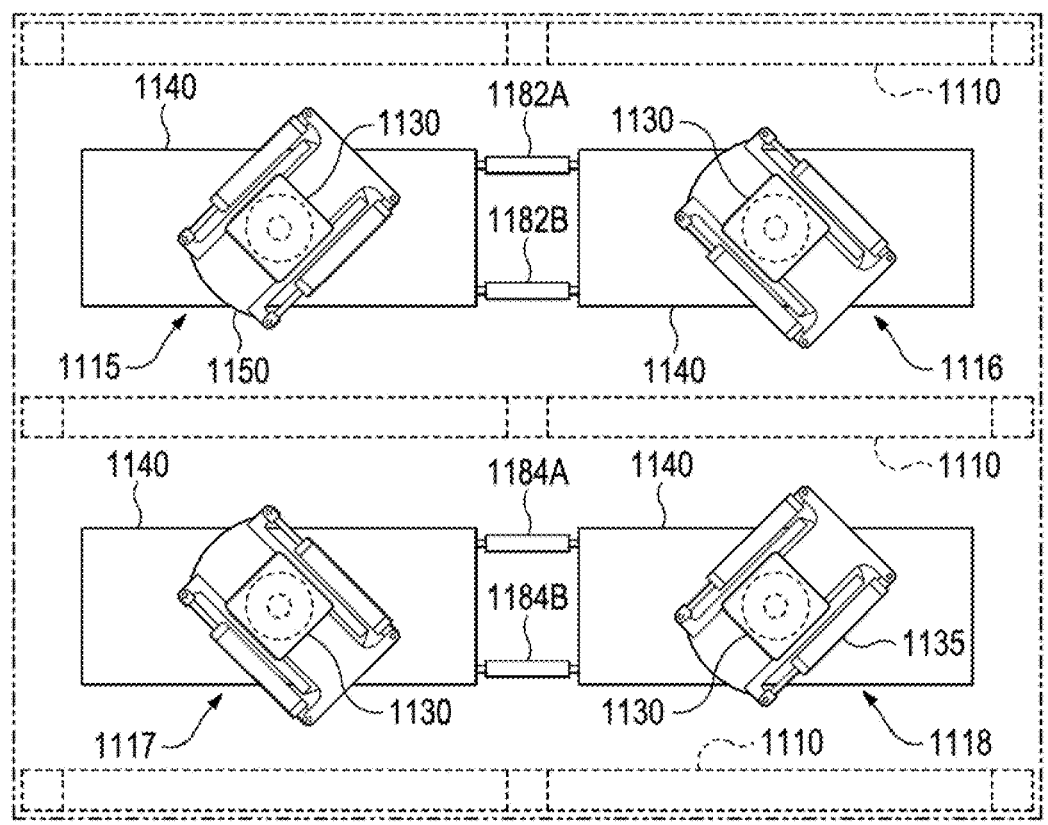
FIG. 11 is a top view of a load movement system according to embodiments of the invention.

FIG. 11 is a top view of a load movement system according to embodiments of the invention. Referring to FIG. 11, multiple load transporting apparatuses 1115,1116, 1117, 1118 are used to move a load supported by a load-bearing frame 1110. Each of these load transporting apparatuses 1115,1116, 1117, 1118 include a roller track 1150, a roller assembly 1130 that moves relative to the roller track, and a support foot 1140. Here, load transporting apparatuses that are in orientation-rows are connected with one or more biasing devices 1182, 1184. In particular, the support foot 1140 of a first load transporting apparatus 1115 is connected to the support foot of a second load transporting apparatus 1116 with two biasing devices 1182A and 1182B. These biasing devices 1182A, 1182B ensure that the first and second load transporting apparatuses 1115, 1116 are maintained in alignment with one another and the load-bearing frame 1110.

Here, the linking devices include a first linking device 1182A coupled between a first side of a first end of the first support foot 1140 and a first side of a first end of the second support foot 1140, and a second linking device 1182B coupled between a second side of the first end of the first support foot and a second side of the first end of the second support foot. The placement of the first and second linking devices 1182A, 1182B may ensure that the support feet 1140 are aligned together during a non-linear movement.

Similarly, the support foot 1140 of a third load transporting apparatus 1117 is connected to the support foot of a fourth load transporting apparatus 1118 with two biasing devices 1184A and 1184B. These biasing devices 1184A, 1184B ensure that the third and fourth load transporting apparatuses 1117, 1118 are maintained in alignment with one another and the load-bearing frame 1110.

Although FIG. 11 illustrates one example embodiment of biasing device connections that can maintain alignment of a support foot relative to a load-bearing frame, many different configuration variations exist. FIGS. 12A, 12B, 12C, 12D, and 12E are diagrams of walking apparatuses with various alignment restoration devices that illustrate some of these variations according to embodiments of the invention.

Referring to FIG. 12A, a linking device 1271 is connected between a first support foot 1240 of a first load transporting apparatus 1215 and a second support foot 1241 of a second load transporting apparatus 1216. The linking device 1271 may be attached to the first support foot 1240 with a first joint 1291, and may be attached to the second support foot 1241 with a second joint 1292. In some embodiments, the first and second joints 1291, 1292 may be ball joints that allow rotational movement. The linking device 1271 may be rigid rod, or may include a section of chain.

Referring to FIG. 12B, a linking device 1272 is connected between a first support foot 1240 of a first load transporting apparatus 1215 and a second support foot 1241 of a second load transporting apparatus 1216. The linking device 1272 may be rigidly attached to the first support foot 1240, but may be attached to the second support foot 1241 with a first biasing device 1281 and a second biasing device 1282. The first and second biasing devices 1281, 1282 may be placed on opposite sides of the linking device 1272 to provide a balanced system to return the support feet 1240, 1241 to uniform alignment after a non-linear movement.

Referring to FIG. 12C, a first biasing device 1283 and a second biasing device 1284 are connected between a first support foot 1240 of a first load transporting apparatus 1215 and a second support foot 1241 of a second load transporting apparatus 1216. This embodiment may be similar to the shown in FIG. 11, except that the first and second biasing devices 1283, 1284 are specified as spring devices.

Referring to FIG. 12D, the support foot 1240 of a load transporting apparatus 1215 is connected to a load-bearing frame 1210 via a first linking cylinder 1273 and a second linking cylinder 1274. The first and second linking cylinders 1273, 1274 may be hydraulic cylinders that are activated during a recovery phase of a walking cycle to return the support foot 1240 to alignment with the load-bearing frame 1210. Alternatively, the first and second linking cylinders 1273, 1274 may be spring cylinders that automatically return the support foot 1240 to alignment with the load-bearing frame 1210 during a recovery phase of a walking cycle without additional operator input.

Referring to FIG. 12E, a support foot 1240 of a load transporting apparatus 1215 is connected at each corner to a biasing device 1285, 1286, 1287, 1288. These biasing devices 1285, 1286, 1287, 1288 may ensure that the support foot 1240 is maintained in alignment with a load-bearing frame during the recovery phase of a walking cycle by releasing potential energy stored during compression and/or elongation during non-linear movements.

Figure 13:
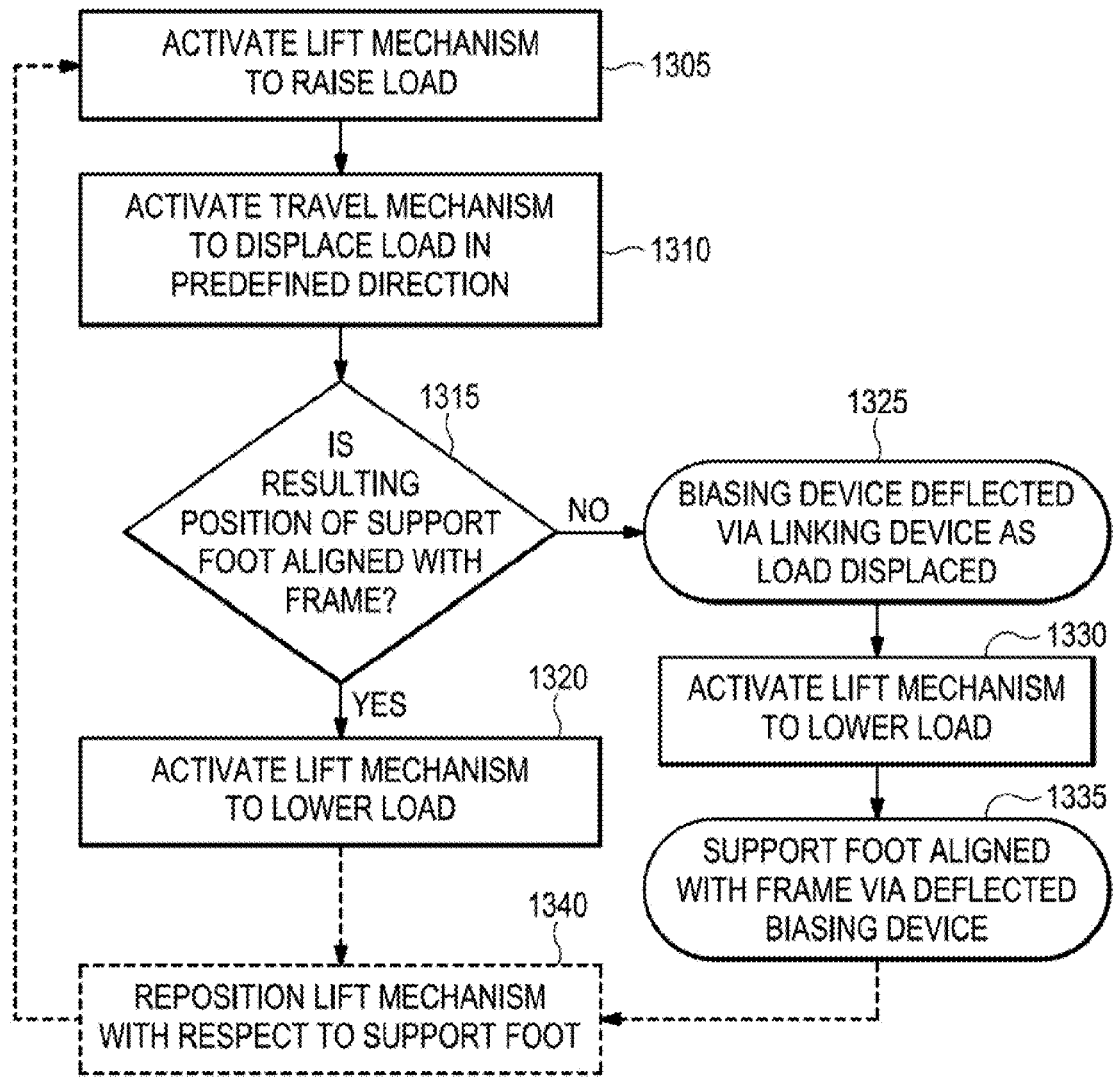
FIG. 13 is a flow diagram illustrating method of operating a load transporting apparatus according to embodiments of the invention.

FIG. 13 is a flow diagram illustrating method of operating a load transporting apparatus according to embodiments of the invention. In particular, the flow diagram of FIG. 13 illustrates a method of aligning a support foot of a load transporting device relative to a load-bearing frame during a load-transporting movement. The load transporting device includes a roller assembly coupled to a lift mechanism, a travel mechanism structured to displace the roller assembly relative to the support foot, one or more linking devices coupled to the support foot, and one or more biasing devices coupled to the linking devices.

Referring to FIG. 13, a flow begins at process 1305 where the lift mechanism is activated to lower the support foot to a ground surface and raising a load supported by the load-bearing frame. In process 1310, the travel mechanism is activated to displace the roller assembly connected to the lift mechanism relative to the support foot and ground surface, thereby moving a position of the load. Depending on the movement of the travel mechanism relative to the support foot, the position of the support foot may be aligned with the load-bearing frame or may not be aligned with the load-bearing frame. As discussed above, when the load is moved in a direction perpendicular to the orientation of the support foot, or moved parallel to the orientation of the support foot, the support foot typically remains aligned with the load-bearing-frame. If the load is moved in a different direction relative to the support foot, such as when the load is being steered in a non-linear path, the support foot can become misaligned with the load-bearing frame. In process 1315, it is observed whether the resulting position of the support foot is aligned with the load-bearing frame.

When the support foot remains aligned with the load-bearing frame, the flow proceeds to process 1320 where the lift mechanism is activated to lower the load and raise the support foot. However, when the support foot is not aligned with load-bearing frame, the biasing device is deflected via the linking device as the load is displaced as shown in step 1325. That is, the biasing devices are deflected when movement of the roller assembly results in an angular displacement between a centerline of the support foot and an orientation of the load-bearing frame. In process 1330, the lift mechanism is activated to lower the load and raise the support foot from the ground surface. As the support foot loses contact with the ground surface, the deflected biasing device acts on the support foot to align the support foot with the load-bearing frame, as shown in step 1335. That is, the centerline of the support foot is automatically aligned relative to the orientation of the load-bearing frame. After step 1335 or process 1320, the flow may include optional process 1340 where the lift mechanism is repositioned with respect to the support foot. If further walking steps are needed to move the load to a final position, the flow may return to process 1305 to initiate another walking cycle.

As described above, some embodiments of this invention are directed to a load transporting apparatus configured to move a load over a ground surface in one or more incremental steps each including a load-movement phase and a recovery phase. To move the load, the load transporting apparatus is coupled to a load-bearing frame configured to support the load. The load transporting apparatus includes a first support foot structured to interface with the ground surface, the first support foot having a length, width, and longitudinal centerline bisecting the width of the first support foot. The load transporting apparatus also includes a second support foot structured to interface with the ground surface, the second support foot also having a length, width, and longitudinal centerline bisecting the width of the second support foot.

First and second roller tracks are respectively coupled to the first support foot and second support foot via a first king pin connector and a second king pin connector. Additionally, first and second roller assemblies are respectively positioned on the first and second roller tracks. Each roller assembly includes a roller frame and one or more rollers set in the roller frame. First and second lift mechanisms are respectively coupled to the first and second roller assemblies. Each of the first and second lift mechanisms includes a lift cylinder connected to the load-bearing frame, and a cylinder rod, where each of the first and second lift mechanisms are structured to lift the load-bearing frame at the start of the load-movement phase.

The load transporting apparatus also includes first and second travel mechanisms respectively coupled to the first and second roller assemblies. Each of the travel mechanisms are structured to move the respective roller assembly relative to the respective support foot during the load-movement phase. A first linking device coupled to the first support foot, and a second linking device coupled to the second foot. A first biasing device is connected to the first linking device, where the first biasing device is structured to become activated during a load-movement phase when the first roller assembly is non-linearly displaced by the first travel mechanism relative to the first support foot, and structured to return the first support foot to an aligned position relative to the load-bearing frame during a recovery phase. A second biasing device is connected to the second linking device, where the second biasing device is structured to become activated during a load-movement phase when the second roller assembly is non-linearly displaced by the second travel mechanism relative to the second support foot, and structured to return the second support foot to an aligned position relative to the load-bearing frame during a recovery phase.

In some embodiments, the first linking device is coupled between the first support foot and the second support foot. In these embodiments, the second linking device is also coupled between the first support foot and the second support foot, as shown in FIG. 11, for example. In other embodiments, the first and second biasing devices are respectively coupled to the load-bearing frame, such as in FIG. 7A, for example.

Figure 14:
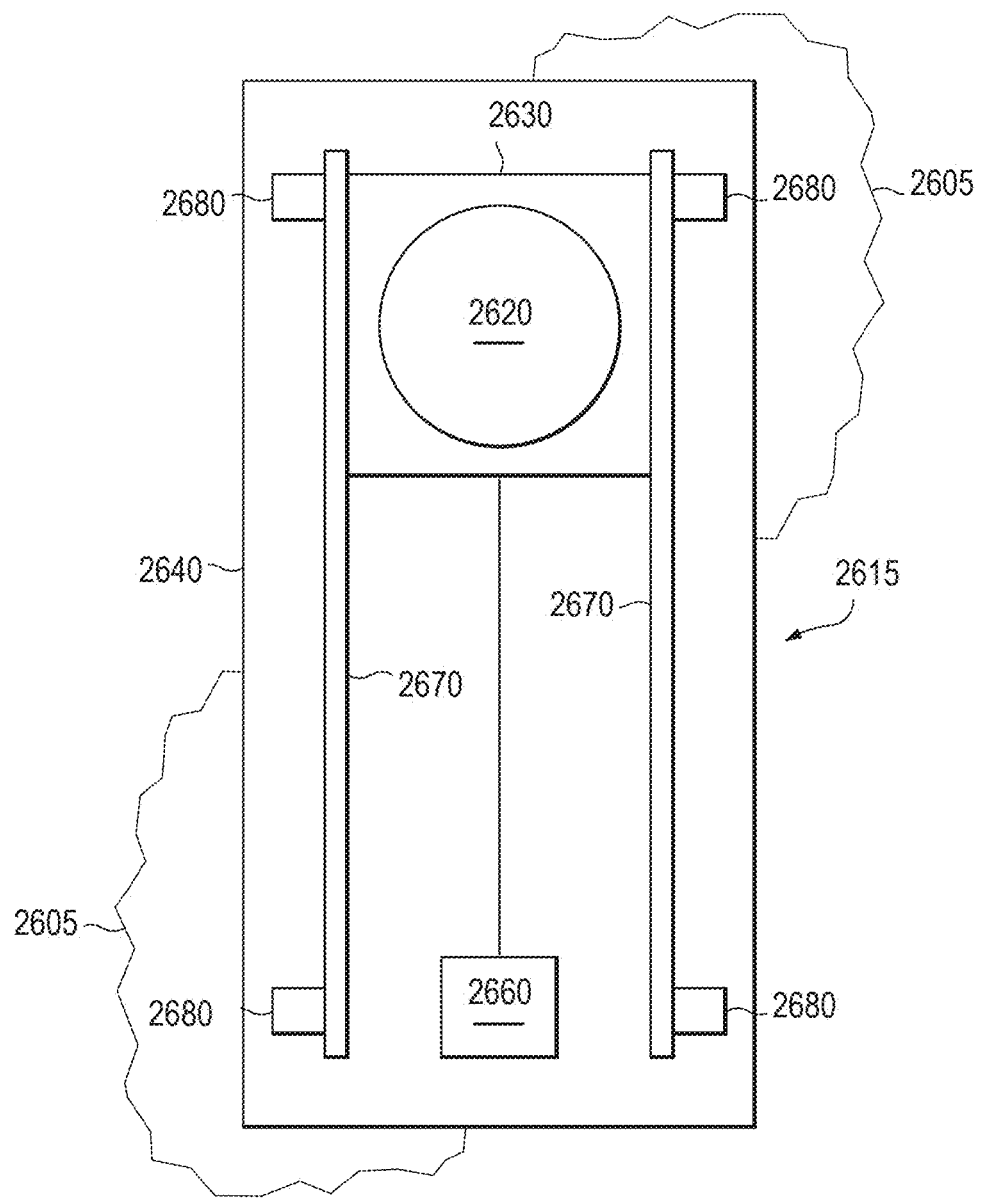
FIG. 14 is a schematic diagram of a top view of a walking apparatus according to embodiments of the invention.

FIG. 14 is a schematic diagram of a top view of a walking apparatus according to embodiments of the invention. Referring to FIG. 14, a load transporting apparatus 2615 is configured to move a load (e.g., element 100 FIG. 1) over a base surface 2605 in one or more incremental steps each including a load-movement phase and a recovery phase. The load transporting apparatus 2615 includes a lift mechanism 2620 structured to lift a load-bearing frame supporting the load and a support foot 2640 connected to the lift mechanism, the support foot structured to interface with the base surface 2605. A roller assembly 2630 is also coupled to the lift mechanism 2620. A travel mechanism 2660 is coupled to the roller assembly 2620, and is structured to displace the roller assembly relative to the support foot 2640. The load transporting apparatus also includes one or more guide devices 2670 positioned adjacent to the roller assembly 2630 and configured to guide the roller assembly during movement caused by the travel mechanism 2660. One or more biasing devices 2680 are coupled to the guide devices 2670, where the biasing devices are structured to become activated during a load-movement phase when the roller assembly 2630 is non-linearly displaced by the travel mechanism 2660 relative to a set direction of travel. The biasing devices 2680 are further structured to return the support foot 2640 to a centered position relative to the roller assembly 2630 about the longitudinal center line of the support foot during a recovery phase.

In some embodiments, the biasing devices 2680 are temporarily or permanently fixed to the support foot 2640. The orientation of the support foot 2640 in these embodiments may determine the set direction of travel. That is, the support foot 2640 may be positioned or set in a desired direction of travel prior to the start of a walking cycle. Here, the guide devices 2670 may be coupled to the biasing devices 2680, and be moveable with respect to the support foot 2640. Hence, as the roller assembly 2630 is displaced by the travel mechanism 2660, one or more of the guide devices may be displaced relative to the support foot 2640 by pressing or pulling against one or more of the biasing devices 2680. In other embodiments, the guide devices 2670 are temporarily or permanently fixed to the support foot 2640. Here, the biasing devices may be coupled to the roller assembly 2630 and move with roller assembly as it is displaced by the travel mechanism 2660. Hence, if the roller assembly 2630 is moved in a non-linear direction with respect to a centerline of the support foot 2640 or the guide devices 2670, the biasing devices 2680 may become compressed or extended to allow this displacement.

In some embodiments, the one or more guide devices 2670 include guide bars positioned on opposite sides of the roller assembly 2630. The guide bars of the guide devices 2670 may be structured to be substantially parallel with the longitudinal center line of the support foot 2640. Here, the roller assembly 2630 deflects at least one of the guide bars 2670 when movement of the roller assembly by the travel mechanism 2660 deviates from the longitudinal centerline of the support foot 2640. That is, the roller assembly 2630 deflects at least one of the guide bars 2670 when the load is displaced in a non-linear movement, such as a spin motion. When the load transporting apparatus 2615 is placed in a spin motion, the lift cylinder 2620 must move in a circular path as the roller assembly 2630 is aligned in a straight path between guide bars 2670. Hence, there is a relative motion between the lift cylinder 2620 and the centerline of the support foot 2640.

As shown in co-pending application Ser. No. 13/711,193, entitled ROTATION DEVICE FOR LOAD TRANSPORT- ING APPARATUS, the contents of which are incorporated herein in their entirety, the load transporting apparatus 2615 may further include a roller track (see e.g., element 650 in FIG. 6A of the above co-pending application), where the support foot 2640 is directly coupled to the roller track. Here, the roller track (650) may be coupled to the support foot with a rotation pin (655, FIG. 6A of the above co-pending application), such as a king pin connection device. In embodiments having these features, the rotation pin (655) may allow the roller track (650) to rotate with respect to the support foot 640. Hence, the roller track (650) may be oriented or set in a desired direction of travel even when the support foot 2640 is oriented in a different direction. The roller assembly 2630 may be positioned on the roller track (650) and displaced relative to the roller track.

Here, the biasing devices 2680 may be connected to the roller track (650) rather than the support foot 2640. In some embodiments, the guide device 2670 includes two guide bars positioned on opposite sides of the roller assembly 2630 and oriented substantially parallel to the longitudinal center line of the roller track (650), which determines the set direction of travel. In these embodiments, the roller assembly 2630 deflects at least one of the guide bars 2670 when movement of the roller assembly by the travel mechanism 2660 deviates from the longitudinal centerline of the roller track 2650 (i.e., deviates from the set direction of travel).

In these and other embodiments, the biasing devices 2680 may include spring devices respectively coupling the guide devices 2670 to the support foot 2640. These spring devices may include one or more of leaf springs, coil springs, torsion springs, air springs, or any other type of device that includes an elastic property. In other embodiments, the biasing devices 2680 may include hydraulic cylinders with accumulators.

FIG. 14 is presented in a schematic style view as many possible variations in the appearance and mechanical structure of the load transporting apparatus 2615 exist. FIG. 15 provides a more detailed view of one embodiment of a load transporting apparatus. FIG. 15 is a perspective view of an example walking apparatus according to embodiments of the invention Referring to FIG. 15, a load transporting or walking apparatus 2715 includes a lift mechanism 2720, a roller assembly 2730, and a support foot 2740. The lift mechanism 2720 may include a hydraulic jack suspended from a horizontal beam of the load-bearing frame 310 (FIGS. 3A and 3B).

The lift mechanism 2720 may include a lift cylinder 2720 that is connected to a load-bearing frame 2710, and a cylinder rod 2722 coupled to the roller assembly 2730. Here, the cylinder rod 2722 may be structured to allow the roller assembly 2730 to rotate about a substantially vertical axis in the center of the cylinder rod. That is, the roller assembly 2730 may be free to rotate around the cylinder rod 2722. The connection between the roller assembly 2730 and the cylinder rod may be a bearing or one of a number of different connection variations. In one embodiment, the cylinder rod 2722 may include a groove (not shown) around side edges of a lower portion of the cylinder rod, where the groove corresponds to a retainer cuff (not shown) of the roller assembly 2730. In this example the retainer cuff is rotatable around the groove, but may easily be assembled or disassembled during installation, break-down, or transportation of the walking apparatus 2715.

Although the embodiment shown in FIG. 15 shows the lift cylinder 2721 connected to the load bearing frame 2710 and the cylinder rod 2722 connected to the roller apparatus 2730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 2715 may also include a travel mechanism 2760 that is connected to the support foot 2740 and coupled to the roller assembly 2730 such that when the travel mechanism is activated, the roller assembly moves relative to the support foot. In some embodiments, the travel mechanism 2760 is attached to the support foot with a pin connection 2762 and pivot rod 2765 to allow the travel mechanism 2760 to rotate relative to the support foot. The travel mechanism 2760 may also be coupled to the roller assembly 2730 with a pin connection to allow the roller assembly to pivot relative to the travel mechanism.

Although the travel mechanism 2760 is shown as a single cylinder in FIG. 15, the travel mechanism may include two or more travel cylinders in other embodiments. In other embodiments, the travel mechanism 2760 may include different movement structures, such as pulleys, levers, winches, tracks, etc.

In the embodiments shown in FIG. 15, the roller assembly 2730 may include a plurality of rollers or roller chain that rotate as well as roll on the roller track 2750. That is, in some embodiments, the roller assembly 2730 may include a WBOT series roller assembly from Hilman Rollers. Due to the configuration of the roller chain of the roller assembly 2730 and the tolerance between the roller assembly and the support foot 2740 of the walking machine 2715, the rollers of the roller chain will typically be engaged with the support foot 2740 during operation and use of the walking machine.

The roller assembly 2730 may be secured to the lower end of the lift mechanism 2720, with the roller assembly being captured within a U-shaped track created in part by the guide devices 2770. The roller assembly 2730 may be configured to roll along the bottom inside surface of the support foot 2740 as well as along the underside of two upper flanges (not shown for clarity purposes) that hold the roller assembly and support foot 2740 when the walking apparatus 2715 is raised above the ground surface 2705 by the lift mechanism 2720 during the recovery phase of a walking cycle. As will be understood from the more detailed discussion below, the travel mechanism 2760 permits for the translation of the support foot 2740 relative to the lift mechanism 2720 and vice versa.

As shown in FIG. 15, guide devices 2770 are positioned on either side of the roller apparatus and extend along a travel path of the roller assembly in a direction substantially parallel to the direction of travel. The guide devices 2770 may include stops on either end to help restrict the movement of the roller assembly 2730. In addition, the guide devices 2770 may include outward-facing tabs to interface with biasing devices 2780. In this illustrated embodiment, the biasing devices 2780 are leaf springs that are attached to spring stops 2785 at either end of the leaf springs. The spring stops 2785 are further fixed to the support foot 2740 to provide fixed points of reference for the leaf springs 2780. In operation, which is discussed in additional detail below with reference to FIGS. 16A-16D, the leaf springs 2780 are deflected outward when the roller assembly 730 pushes against and shifts the guide devices 2770. The leaf springs 2780 may include steel, plastic, or any other type of material that can deflect without permanently damaging the material (i.e., without reaching a plastic region of the material's stress-strain curve).

As discussed above, in other embodiments a roller track (750) may be included in the walking apparatus 2815 and positioned between the roller assembly 2830 and the support foot 2840. For ease of understanding in FIG. 15 (and FIGS. 16A-16D below) this other embodiment can be easily visualized by replacing the references to support foot for element 2840 with references to a roller track. Hence, this embodiment would simply use element 2840 as the roller track and an additional element in a support foot under the roller track as shown in, for example, FIG. 6A of co-pending application Ser. No. 13/711,193 entitled ROTATION DEVICE FOR LOAD TRANSPORTING APPARATUS. Here, as discussed above, the roller track may be secured to the elongate ground-engaging foot 640 (support foot) via a rotational pin (655), which enables the roller track to be rotationally positioned relative to the foot for steering of the walking machine 615.

FIGS. 16A, 16B, 16C, and 16D are diagrams illustrating an example operation progression of the walking apparatus shown in FIG. 15 according to embodiments of the invention.

Figure 16A:
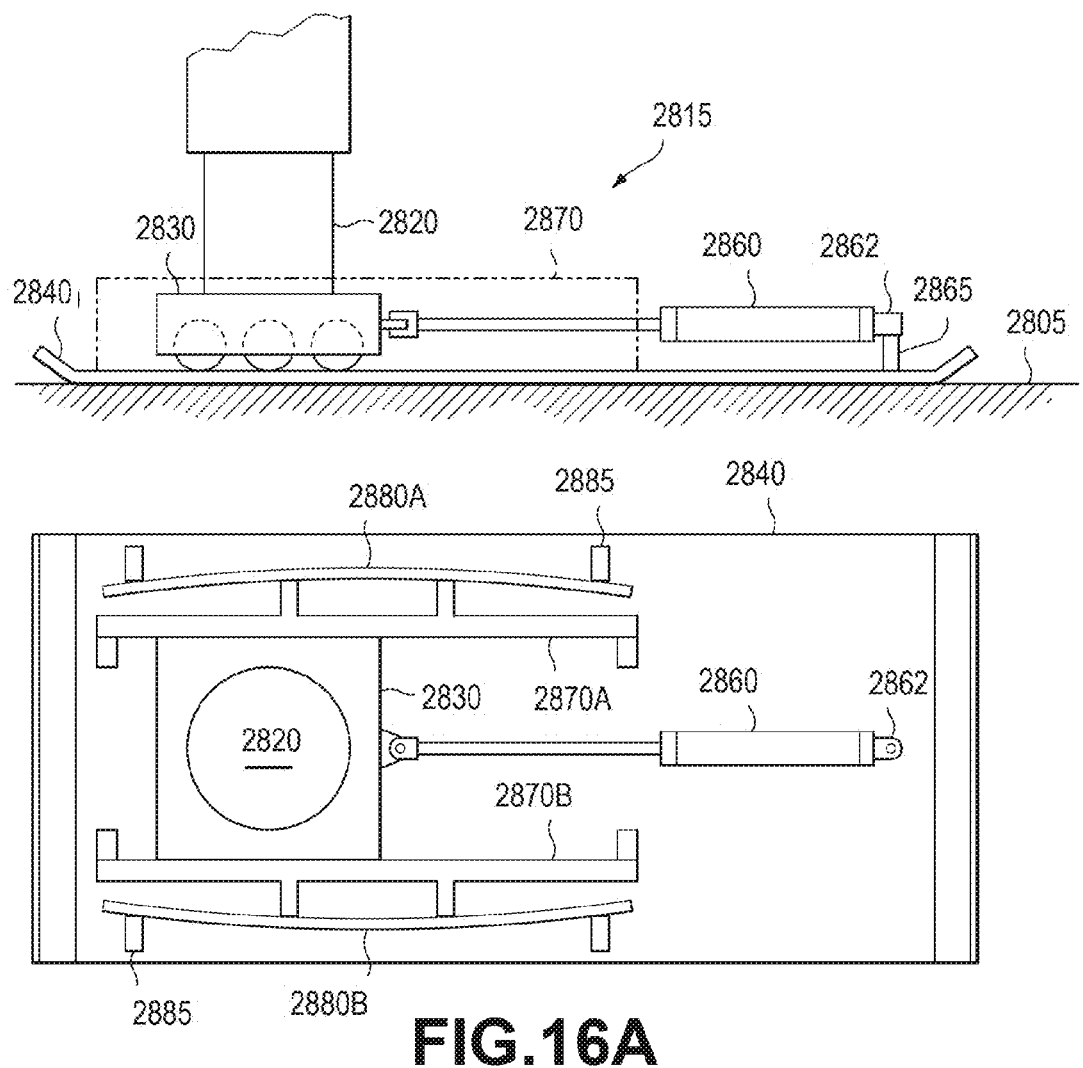
FIGS. 16A, 16B, 16C, and 16D are diagrams illustrating an example operation progression of the walking apparatus shown in FIG. 15 according to embodiments of the invention.

Referring to FIG. 16A, a walking apparatus 2815 includes a lift cylinder 2820, roller assembly 2830, travel mechanism 2860, and support foot 2840 as described above with reference to FIG. 15. Briefly, the travel mechanism, which is fixed to the support foot 2840 with a pin connection 2862 and pivot rod 2865, is configured to displace the roller assembly 2830 relative to the support foot 2840 during the load-movement phase of a walking cycle when the walking apparatus is engaged with a ground surface 2805 and a load is lifted above the ground surface by the lift mechanism 2820.

As discussed above with respect to FIG. 15, the walking apparatus 2815 also includes guide devices 2870A, 2870B positioned on either side of the roller assembly 2830, and biasing devices 2880A, 2880B, such as leaf springs, engaged with the respective guide devices. The leaf springs 2880A, 2880B are further fixed at end portions to spring stops 2885, which are attached to the support foot 2840. In FIG. 16A, the walking apparatus 2815 is shown at a point in the load-movement phase of a walking cycle prior to movement of the load.

Figure 16B:
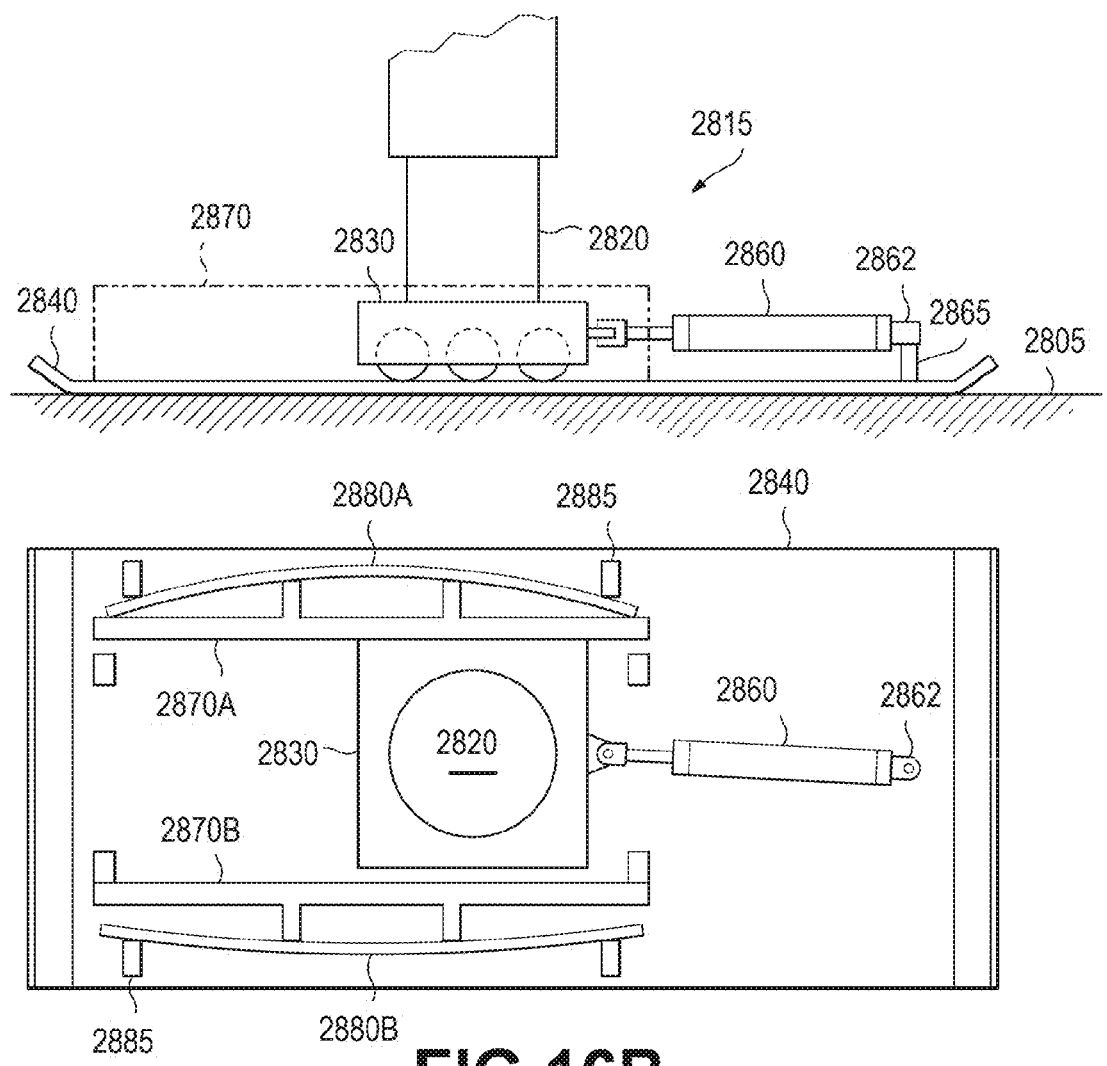

Referring to FIG. 16B, a spin movement or other non-linear movement is made by the walking apparatus 2815 as part of the load-movement phase of a walking cycle. Here, the travel mechanism 2860 is activated to pull the roller assembly 2830 toward the travel mechanism. In this instance, because the movement was non-linear, the roller assembly deviates from a set direction of travel (i.e., the orientation of the lengthwise direction of the support foot 2840) and presses against the upper guide device 2870A. By pressing against the upper guide device 2870A, the roller assembly 2830 shifts the guide device upward into the upper biasing leaf spring 2880A. This upward shift of the guide device 2870A deflects the upper leaf spring 2880A. Note that the roller assembly may become separated from the other guide device 2870B (lower guide device in this example) when shifting one of the guide devices 2870A. Note also, that the non-linear movement of the roller assembly 2830 may not be caused solely based on the pulling force of the travel mechanism 2860, but rather may be due to the movement of multiple walking apparatuses that are oriented in different directions to accomplish a spin movement, or other steering movement, as shown, for example, in FIG. 10D of the co-pending application Ser. No. 13/711,193 entitled ROTATION DEVICE FOR LOAD TRANSPORTING APPARATUS.

Figure 16C:
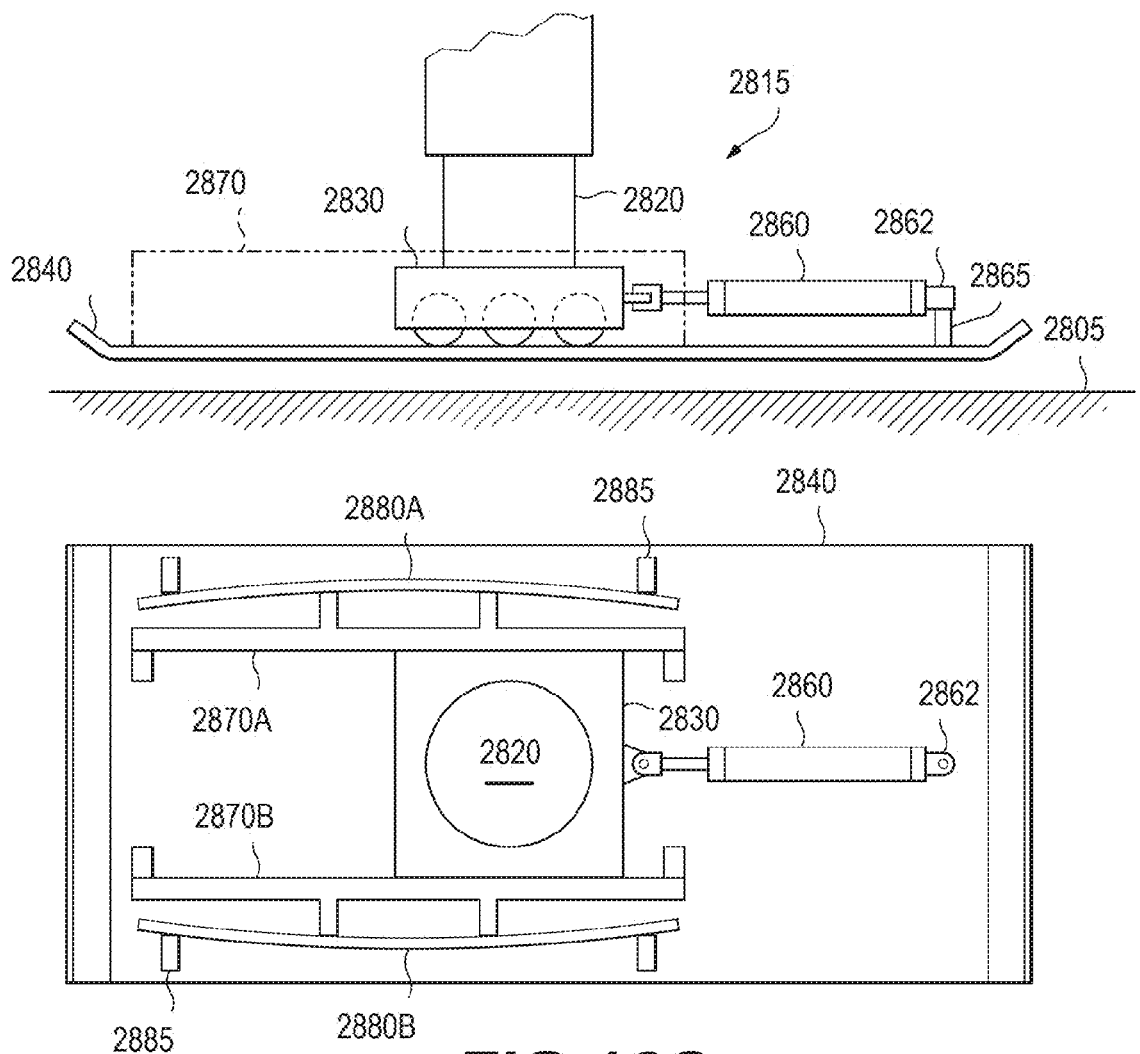

Referring to FIG. 16C, the lift mechanism 2820 is activated to lower the load to the ground surface 2805 and lift the walking apparatus 2815 above the ground surface. As the support foot 2840 loses contact with the ground surface 2805, the upper deflected leaf spring 2880A releases its stored potential energy by shifting the upper guide device 2870A back down toward the roller assembly 2830. The shifting upper guide device 2870A in turn pushes the roller assembly back to a centered position along a set direction of travel or longitudinal centerline of the support foot as shown in FIG. 16C. If this returning centering force from the deflected leaf spring 2880A is more than needed to return the roller assembly 2830 to a centered position, the lower guide device 2870B and lower biasing device 2880B help prevent the roller assembly 2830 from being pushed back past the centered position. This process shown in FIG. 16C may be part of the recovery phase of a walking cycle.

Figure 16D:
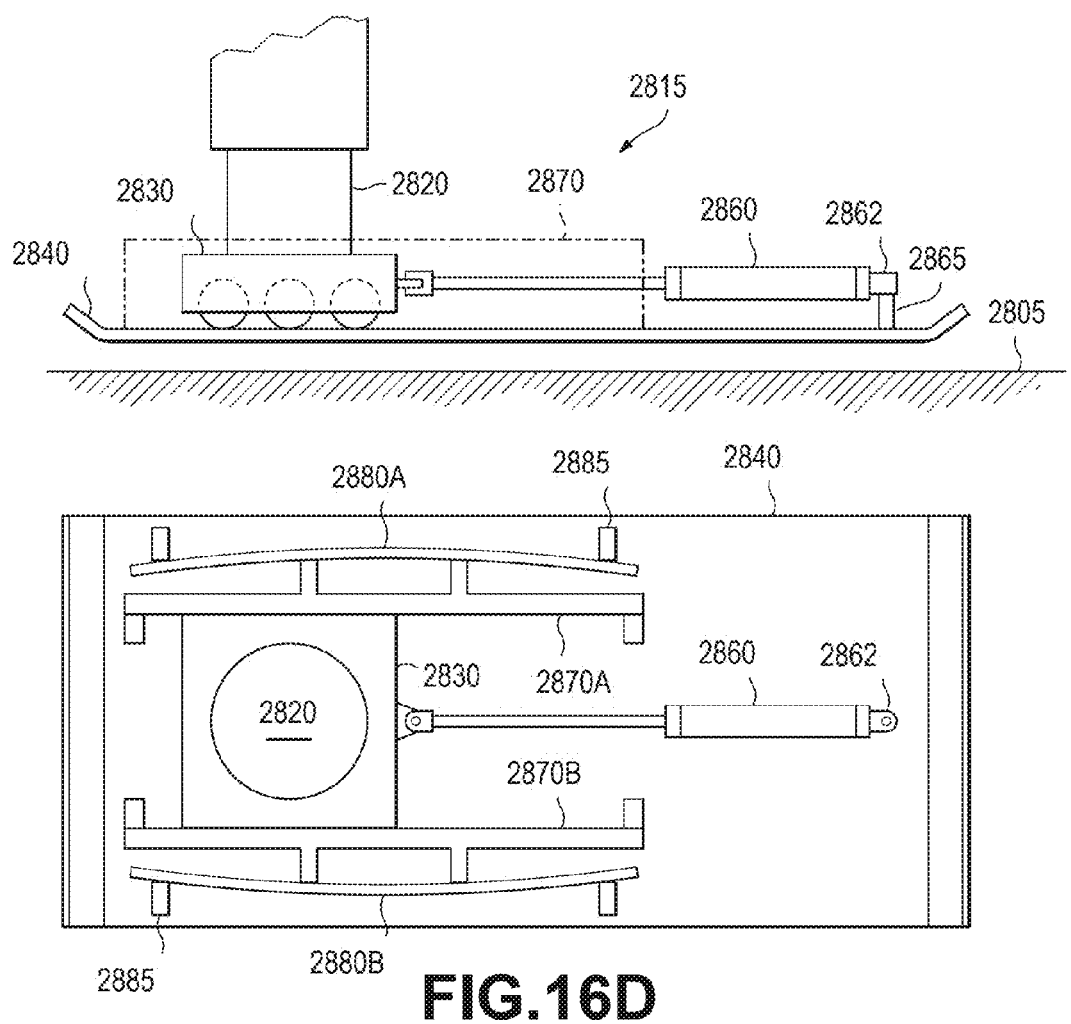

Referring to FIG. 16D, the travel cylinder 2860 is activated again to move the support foot 2840 forward in the direction of travel (here to the right). This movement repositions the support foot in anticipation of another walking cycle. From here, the lift mechanism would be activated to lower the support foot 2840 to the ground surface 2805 and raise the load, as shown in FIG. 16A.

FIG. 17 is a perspective view of another example walking apparatus according to embodiments of the invention. The embodiment of FIG. 17 is similar to the embodiment shown in FIG. 15 above except that instead of using a leaf spring 2780 as a biasing device, the embodiment in FIG. 17 uses individual coil springs 2980.

Referring to FIG. 17, a load transporting or walking apparatus 2915 includes a lift mechanism 2920, a roller assembly 2930, and a support foot 2940. The lift mechanism 2920 may include a hydraulic jack suspended from a horizontal beam of the load-bearing frame 310 (FIGS. 3A and 3B).

The lift mechanism 2920 may include a lift cylinder 2920 that is connected to a load-bearing frame 2910, and a cylinder rod 2922 coupled to the roller assembly 2930. Here, the cylinder rod 2922 may be structured to allow the roller assembly 2930 to rotate about a substantially vertical axis in the center of the cylinder rod. That is, the roller assembly 2930 may be free to rotate around the cylinder rod 2922. The connection between the roller assembly 2930 and the cylinder rod may be a bearing or one of a number of different connection variations. In one embodiment, the cylinder rod 2922 may include a groove (not shown) around side edges of a lower portion of the cylinder rod, where the groove corresponds to a retainer cuff (not shown) of the roller assembly 2930. In this example the retainer cuff is rotatable around the groove, but may easily be assembled or disassembled during installation, break-down, or transportation of the walking apparatus 2915.

Although the embodiment shown in FIG. 17 shows the lift cylinder 2921 connected to the load bearing frame 2910 and the cylinder rod 2922 connected to the roller apparatus 2930, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 2915 may also include a travel mechanism 2960 that is connected to the support foot 2940 and coupled to the roller assembly 2930 such that when the travel mechanism is activated, the roller assembly moves relative to the support foot. In some embodiments, the travel mechanism 2960 is attached to the support foot with a pin connection 2962 and pivot rod 2965 to allow the travel mechanism 2960 to rotate relative to the support foot. The travel mechanism 2960 may also be coupled to the roller assembly 2930 with a pin connection to allow the roller assembly to pivot relative to the travel mechanism.

Although the travel mechanism 2960 is shown as a single cylinder in FIG. 17, the travel mechanism may include two or more travel cylinders in other embodiments. In other embodiments, the travel mechanism 2960 may include different movement structures, such as pulleys, levers, winches, tracks, etc.

In the embodiments shown in FIG. 17, the roller assembly 2930 may include a plurality of rollers or roller chain that rotate as well as roll on the roller track 2950. That is, in some embodiments, the roller assembly 2930 may include a WBOT series roller assembly from Hilman Rollers. Due to the configuration of the roller chain of the roller assembly 2930 and the tolerance between the roller assembly and the support foot 2940 of the walking machine 2915, the rollers of the roller chain will typically be engaged with the support foot 2940 during operation and use of the walking machine.

The roller assembly 2930 may be secured to the lower end of the lift mechanism 2920, with the roller assembly being captured within a U-shaped track created in part by the guide devices 2970. The roller assembly 2930 may be configured to roll along the bottom inside surface of the support foot 2940 as well as along the underside of two upper flanges (not shown for clarity purposes) that hold the roller assembly and support foot 2940 when the walking apparatus 2915 is raised above the ground surface 2905 by the lift mechanism 2920 during the recovery phase of a walking cycle. As will be understood from the more detailed discussion below, the travel mechanism 2960 permits for the translation of the support foot 2940 relative to the lift mechanism 2920 and vice versa. As shown in FIG. 17, guide devices 2970 are positioned on either side of the roller apparatus and extend along a travel path of the roller assembly in a direction substantially parallel to the direction of travel. The guide devices 2970 may include stops on either end to help restrict the movement of the roller assembly 2930. In this illustrated embodiment, the biasing devices 2980 are coil springs that are attached to spring stops 2985. These coil springs 2980 may be positioned near end portions of the guide devices 2970 to provide stable deflection during the shifting of the guide devices. The spring stops 2985 are further fixed to the support foot 2940 to provide fixed points of reference for the coil springs 2980. In operation, which is discussed in additional detail below with reference to FIGS. 18A-18D, the coil springs 980 are deflected by compressing toward the spring stops 985 when the roller assembly 930 pushes against and shifts the guide devices 970. The coil springs 980 may include steel, plastic, or any other type of material that can act as spring device.

FIGS. 18A, 18B, 18C, and 18D are diagrams illustrating an example operation progression of the walking apparatus shown in FIG. 17 according to embodiments of the invention.

Figure 18A:
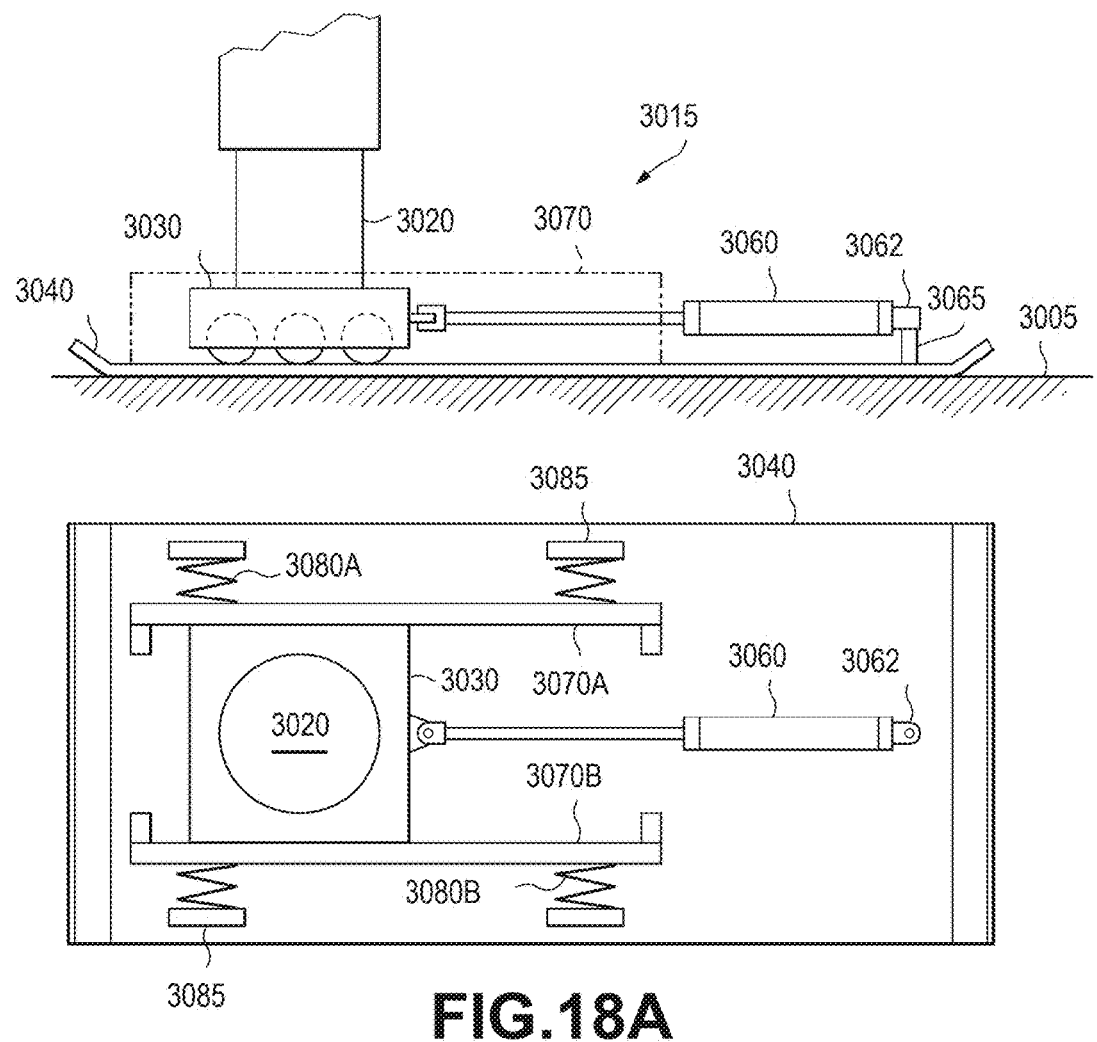
FIGS. 18A, 18B, 18C, and 18D are diagrams illustrating an example operation progression of the walking apparatus shown in FIG. 17 according to embodiments of the invention.

Referring to FIG. 18A, a walking apparatus 3015 includes a lift cylinder 3020, roller assembly 3030, travel mechanism 3060, and support foot 3040 similar to support foot 2940 as described above with reference to FIG. 17. Briefly, the travel mechanism, which is fixed to the support foot 3040 with a pin connection 3062 and pivot rod 3065, is configured to displace the roller assembly 3030 relative to the support foot 3040 during the load-movement phase of a walking cycle when the walking apparatus is engaged with a ground surface 3005 and a load is lifted above the ground surface by the lift mechanism 3020.

As discussed above with respect to FIG. 17, the walking apparatus 3015 also includes guide devices 3070A, 3070B positioned on either side of the roller assembly 3030, and biasing devices 3080A, 3080B, such as coil springs, engaged with the respective guide devices. The coil springs 3080A, 3080B are further fixed to spring stops 3085, which are attached to the support foot 3040. In FIG. 18A, the walking apparatus 3015 is shown at a point in the load-movement phase of a walking cycle prior to movement of the load.

Figure 18B:
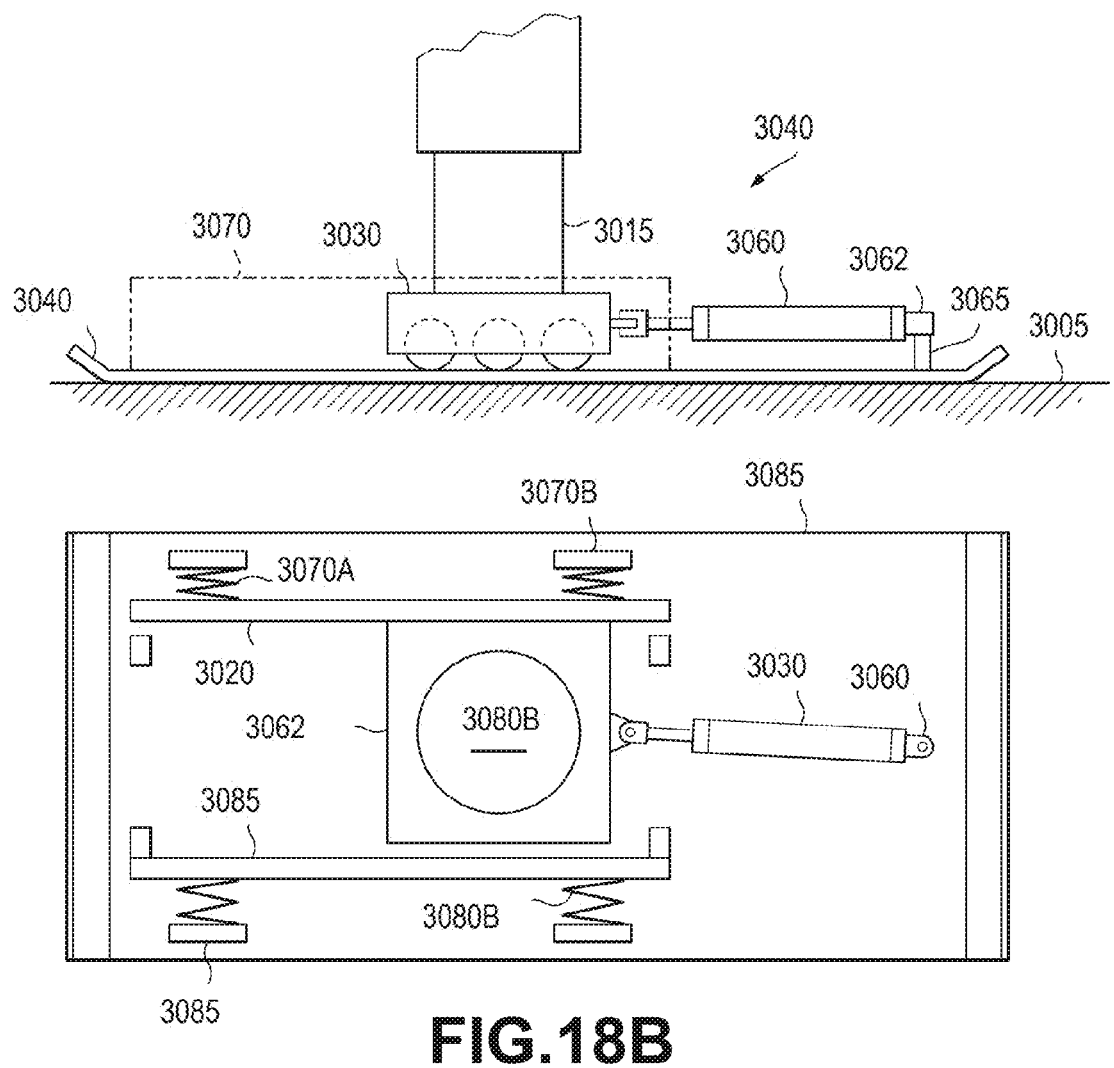

Referring to FIG. 18B, a spin movement or other non-linear movement is made by the walking apparatus 3015 as part of the load-movement phase of a walking cycle. Here, the travel mechanism 3060 is activated to pull the roller assembly 3030 toward the travel mechanism. In this instance, because the movement was non-linear, the roller assembly deviates from a set direction of travel (i.e., the orientation of the lengthwise direction of the support foot 3040) and presses against the upper guide device 3070A. By pressing against the upper guide device 3070A, the roller assembly 3030 shifts the guide device upward into the upper biasing coil springs 3080A. This upward shift of the guide device 3070A compresses the upper coil springs 3080A. Note that the roller assembly 3030 may become separated from the other guide device 3070B (lower guide device in this example) when shifting one of the guide devices 3070A. Note also, that the non-linear movement of the roller assembly 3030 may not be caused solely based on the pulling force of the travel mechanism 3060, but rather may be due to the movement of multiple walking apparatuses 3015 that are oriented in different directions to accomplish a spin movement, or other steering movement, as shown, for example, in FIG. 18 of the co-pending application Ser. No. 13/711,193 entitled ROTATION DEVICE FOR LOAD TRANSPORTING APPARATUS.

Figure 18C:
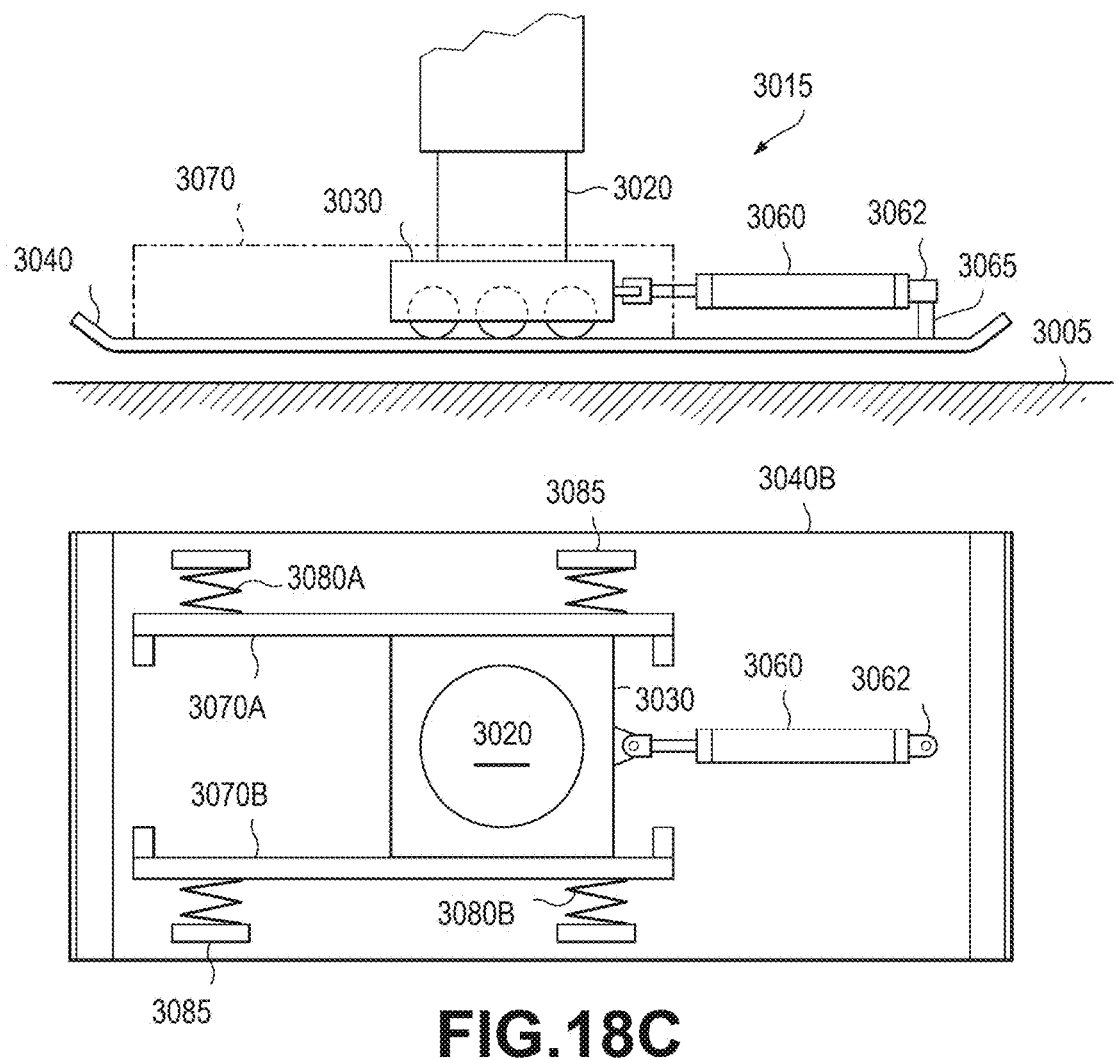

Referring to FIG. 18C, the lift mechanism 3020 is activated to lower the load to the ground surface 3005 and lift the walking apparatus 3015 above the ground surface. As the support foot 3040 loses contact with the ground surface 3005, the upper deflected coil springs 3080A release their stored potential energy by shifting the upper guide device 3070A back down toward the roller assembly 3030. The shifting upper guide device 3070A in turn pushes the roller assembly back to a centered position along a set direction of travel or longitudinal centerline of the support foot as shown in FIG. 18C. If this returning centering force from the deflected coil springs 3080A is more than needed to return the roller assembly 3030 to a centered position, the lower guide device 3070B and lower biasing device 3080B help prevent the roller assembly 3030 from being pushed back past the centered position.

Figure 18D:
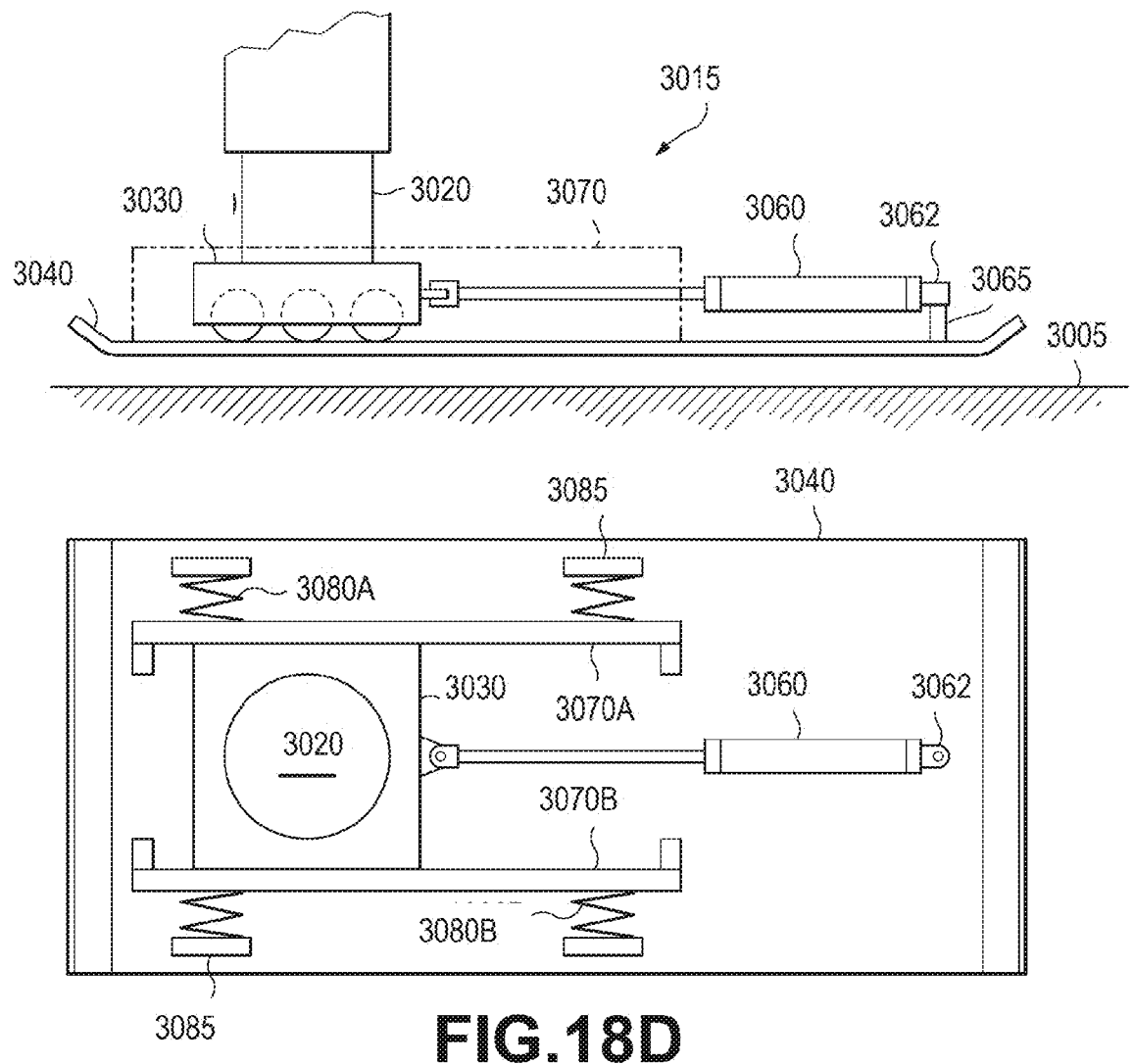

Referring to FIG. 18D, the travel cylinder 3060 is activated again to move the support foot 3040 forward in the direction of travel (here to the right). This movement repositions the support foot in anticipation of another walking cycle. From here, the lift mechanism would be activated to lower the support foot 3040 to the ground surface 3005 and raise the load, as shown in FIG. 18A.

Figure 19A:
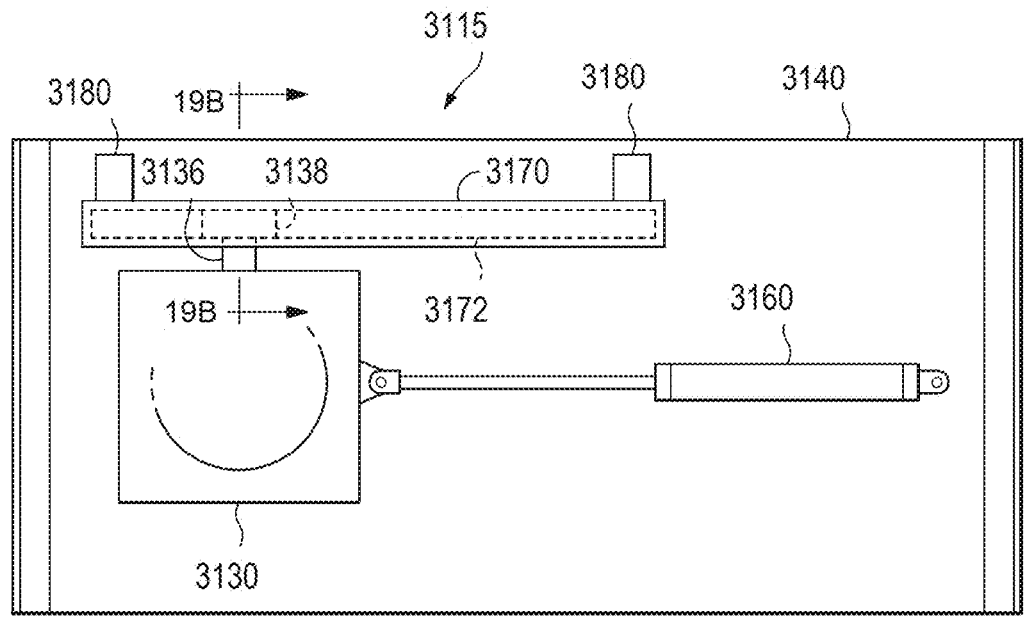
FIG. 19A is a top view of another example walking apparatus according to embodiments of the invention.
Figure 19B:
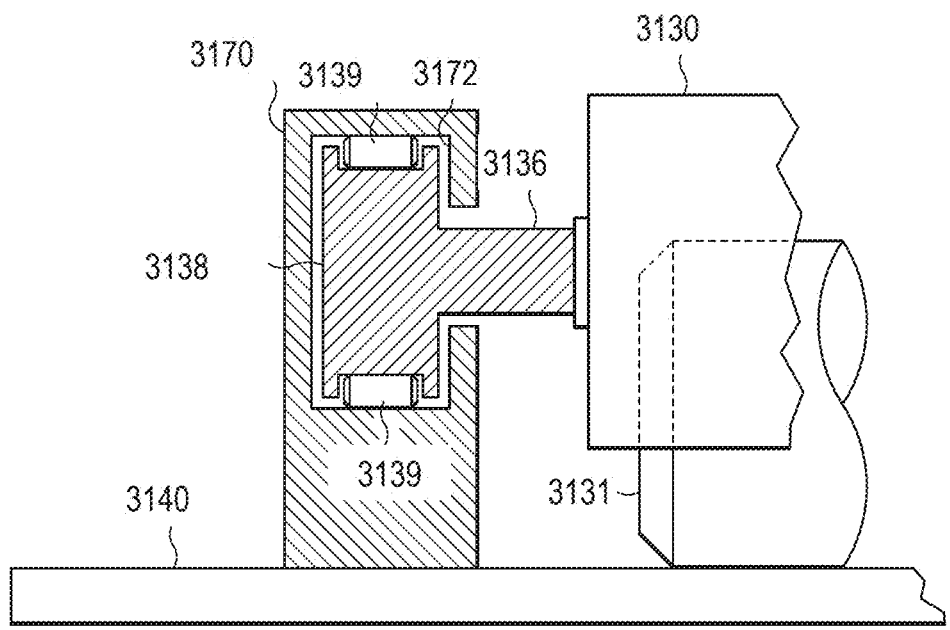
FIG. 19B is a cross-sectional detail diagram taken along line 19B of the walking apparatus shown in FIG. 19A.

FIG. 19A is a top view of another example walking apparatus according to embodiments of the invention. FIG. 19B is a cross-sectional detail diagram taken along line 19B of the walking apparatus shown in FIG. 19A. Referring to FIGS. 19A and 19B, a walking apparatus 3115 includes a roller assembly 3130 positioned on a support foot 3140. The roller assembly 3130 may include one or more rollers 3131 that allow the roller assembly to be moved by a travel mechanism 3160 connected to the roller assembly. The travel mechanism 3160 can be activated to move the roller assembly 3130 in a desired direction of travel relative to the support foot 3140 as described above. The walking apparatus 3115 also includes a guide device 3170 and one or more biasing devices 3180. The biasing devices 3180 may be fixed to the support foot 3140 (or roller track, as described above) and coupled to the guide device 3170. This configuration allows the guide device 3170 to be shifted relative to the support foot 3140 during non-linear movements, such as spin movements of the walking apparatus 3115.

Unlike some of the embodiments discussed above, the embodiment of the walking apparatus 3115 shown in FIGS. 19A and 19B include only a single guide bar 3170 positioned on one side of the roller assembly. To center the support foot 3140 during a recovery phase of a walking cycle when the roller assembly 3130 is displaced on either side of a longitudinal centerline of the support foot 3140 (i.e., deviates from a set direction of travel), the guide bar 3170 includes a slot 3172 that partially encloses a retaining portion 3138 of a guide spacer 3136. The guide spacer 3136 may be fixed to the roller assembly 3130 and move within the slot 3172 of the guide bar 3170 via guide rollers 3139. By partially enclosing the retaining portion 3138 of the guide spacer 3136, the guide device 3170 will compress the biasing devices 3180 if the roller assembly deviates from the direction of travel toward the guide device, and the guide device will expand the biasing devices if the roller assembly deviates from the direction of travel away from the guide device. Hence, this embodiment requires only a single guide bar 3170 rather than multiple guide bars around the roller assembly.

Figure 20A:
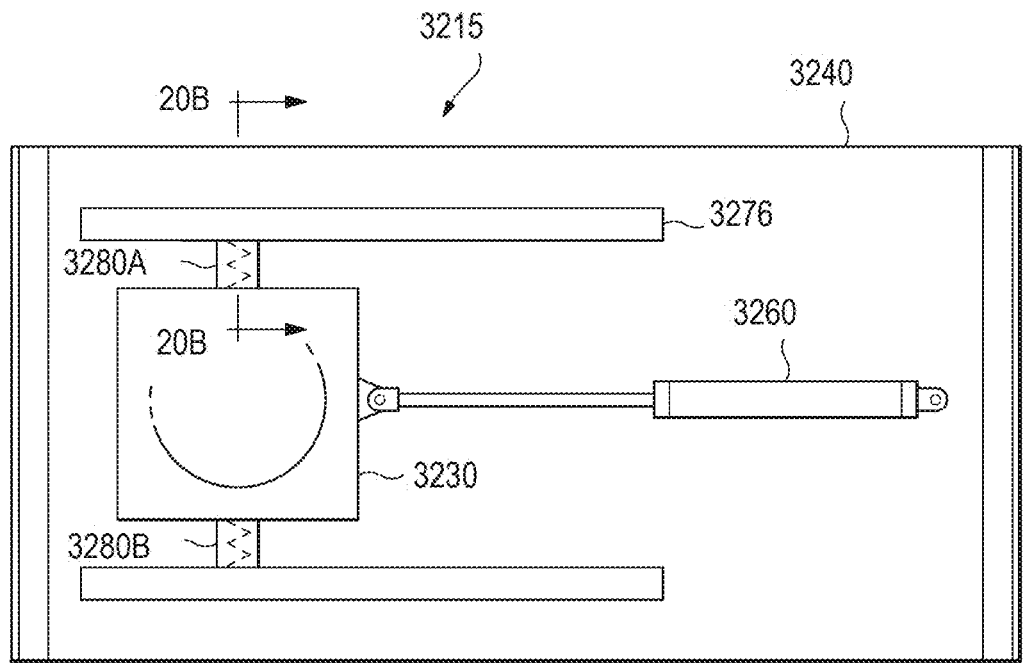
FIG. 20A is a top view of another example walking apparatus according to embodiments of the invention.
Figure 20B:
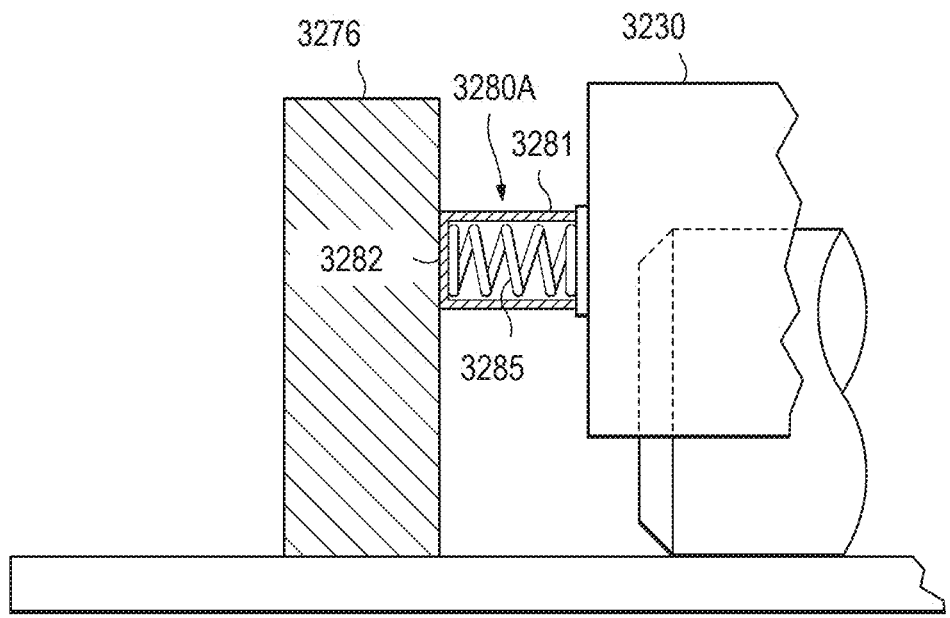
FIG. 20B is a cross-sectional detail diagram taken along line 20B of the walking apparatus shown in FIG. 20A.

FIG. 20A is a top view of another example walking apparatus according to embodiments of the invention. FIG. 20B is a cross-sectional detail diagram taken along line 20B of the walking apparatus shown in FIG. 20A. Referring to FIGS. 20A and 20B, a walking apparatus 3215 includes a roller assembly 3230 positioned on a support foot 3240. The roller assembly 3230 may include one or more rollers that allow the roller assembly to be moved by a travel mechanism 3260 connected to the roller assembly. The travel mechanism 3260 can be activated to move the roller assembly 3230 in a desired direction of travel relative to the support foot 3240 as described above. The walking apparatus 3215 also includes a guide device 3276 and one or more biasing devices 3280A, 3280B. In this embodiment, the guide bars 3276 of the guide device are fixed to the support foot 3240 and do not substantially move when the roller assembly is moved in a linear or non-linear manner relative to the set direction of travel. Rather, the biasing devices 3280A, 3280B are positioned between the fixed guide bars 3276 and the roller assembly 3230. This configuration allows the biasing devices 3280A, 3280B to be directly deflected by the movement of the roller assembly. Here, a first biasing device 3280A may be positioned and fixed on one side of the roller assembly 3230, and a second biasing device 3280B may be positioned and fixed on an opposite side of the roller assembly 3230.

In some embodiments, the biasing devices may each include a housing 3281, a pre-compressed spring 3285, and a rub surface 3282. The pre-compressed spring 3285 may be compressed a desired amount in the housing 3281. This pre-compression allows the biasing devices 3280A, 3280B to be deflected or compressed further when a deviation of travel from the roller assembly 3230 is directed toward the biasing device, while allowing the other biasing device on the other side of the roller assembly to disengage from the guide bar 3276. This allows a faster and easier return to a centered position because the biasing devices are not acting against each other. The housing 3281 may be structured to be flexible to allow further compression of the spring 3285, but have a maximum fixed extendable length to prevent the spring from extending beyond a desired pre-compressed state. The rub surface 3282 may be structured to move along the fixed guide bars 3276 without excessive friction. Hence, the rub surface may include a material with a relatively low coefficient of friction. Additionally, the rub surface may be replaceable in case it is excessively worn or otherwise damaged.

FIG. 21 is a flow diagram illustrating method of operating a load transporting apparatus according to embodiments of the invention. In particular, the flow diagram of FIG. 21 illustrates a method of centering a lift mechanism of a load transporting device relative to a support foot during a load-transporting movement. The load transporting device includes a roller assembly coupled to the lift mechanism, a travel mechanism structured to displace the roller assembly relative to the support foot, and one or more guide devices coupled to the support foot by a biasing device and positioned adjacent to the roller assembly.

Referring to FIG. 21, a flow begins at process 3305 where the lift mechanism is activated to lower the support foot to a ground surface and raising a load supported by the load-bearing frame. In process 3310, the travel mechanism is activated to displace the roller assembly connected to the lift mechanism relative to the support foot and ground surface, thereby moving a position of the load in a pre-defined direction of travel. Depending on the movement of the travel mechanism relative to the centerline of the support foot (or in embodiments with a roller track, relative to the centerline of the roller track, or set direction of travel), the position of the lift cylinder may deviate from the longitudinal centerline of the support foot or roller track (i.e., deviate from a set direction of travel). As discussed above, when the roller assembly and load are moved off of a set direction of travel, the guide devices are shifted by the load displacement thereby deflecting the biasing devices. On the other hand, if the roller assembly moves along the set direction of travel (i.e., stays centered on a longitudinal centerline of the support foot or roller track), the guide devices are not shifted and the biasing devices are not further activated. In process 3315, it is observed whether the resulting position of the roller assembly has deviated from a set direction of travel or centerline of the support foot or roller track.

When the roller assembly has followed the set direction of travel, the flow proceeds to process 3320 where the lift mechanism is activated to lower the load and raise the support foot. However, when the roller assembly has deviated from a set direction of travel, the guide device is shifted by the movement of the roller assembly and load thereby deflecting the biasing device as shown in step 3325. That is, the biasing devices are deflected when movement of the roller assembly results in deviation from a set direction of travel. In process 3330, the lift mechanism is activated to lower the load and raise the support foot from the ground surface. As the support foot loses contact with the ground surface, the deflected biasing device acts on the support foot or roller track to center the support foot relative to the roller assembly, as shown in step 3335. That is, support foot and roller track, if present, are automatically centered with respect to the lift mechanism or lift cylinder. After step 3335 or process 3320, the flow may include optional process 3340 where the lift mechanism is repositioned with respect to the support foot. If further walking steps are needed to move the load to a final position, the flow may return to process 3305 to initiate another walking cycle.

As described above, some embodiments of this invention are directed to a load transporting apparatus configured to move a load over a ground surface in one or more incremental steps each including a load-movement phase and a recovery phase. The load transporting apparatus may include a load bearing frame attached to the load, and a lift mechanism having a lift cylinder connected to the load bearing frame and a cylinder rod. The lift mechanism may be structured, for example, to lift the load-bearing frame at the start of the load-movement phase. A roller assembly may be coupled to the cylinder rod of the lift mechanism, where the roller assembly includes a roller frame and one or more rollers set in the roller frame. The load transporting apparatus also includes a support foot coupled to the roller frame of the roller assembly and structured to interface with the ground surface. The support foot has a length, width, and longitudinal centerline bisecting the width of the support foot. A travel mechanism may be coupled to the roller assembly, where the travel mechanism is structured to move the roller assembly relative to the support foot during, for example, the load-movement phase of a walking cycle. Guide bars positioned on opposite sides of the roller frame are displaced adjacent to the roller frame. The guide bars may be positioned substantially parallel with the length of the support foot. Additionally, one or more biasing devices may be coupled between the guide bars and the support foot. The biasing devices may be structured to become deflected during a load-movement phase where the roller assembly is non-linearly displaced by the travel mechanism relative to the longitudinal center line of the support foot, and structured to return the support foot to a centered position relative to the roller assembly about the longitudinal center line of the support foot during a recovery phase.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

Figure 22:
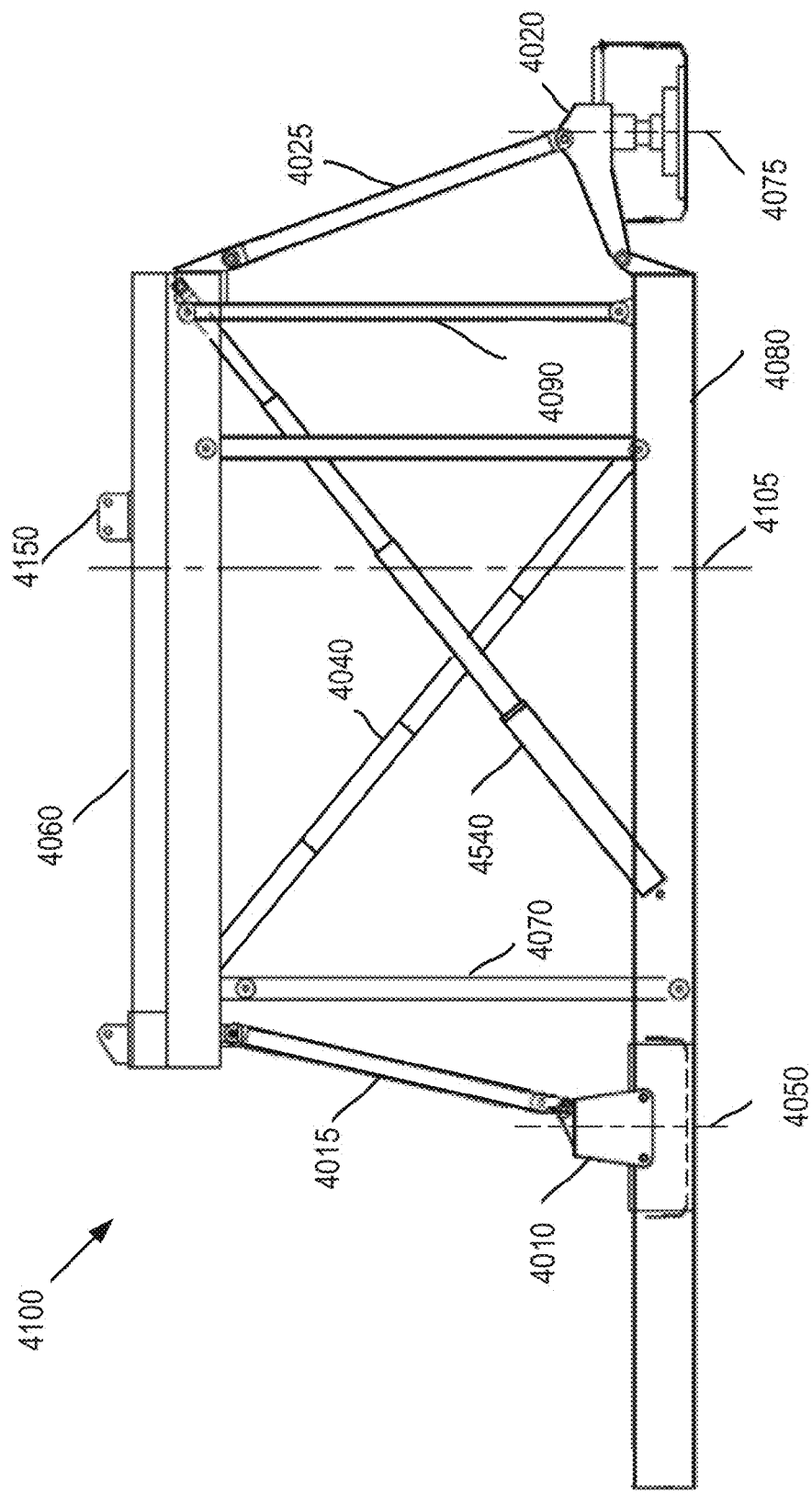
FIG. 22 illustrates an example mounting structure.

FIG. 22 illustrates an example mounting structure 4100 such as may be used to support an oil rig. Mounting structure 4100 may comprise a rig platform 4060 connected to a base 4080 by one or more rear legs such as first leg 4070 and one or more front legs, such as second leg 4090. Rig platform 4060 may comprise a rig support structure 4150 configured to support a mast, a drill, traveling blocks, and other components associated with a rig or other type of heavy load supported by mounting structure 4100.

In some examples, mounting structure 4100 may be placed over a well head such that a well head centerline 4105 of mounting structure 4100 may be located between first leg 4070 and second leg 4090. Additionally, the rig platform 4060 may be connected to the base 4080 by one or more struts, such as rear transport strut 4015 and/or front transport strut 25, and one or more hydraulic cylinders, such as hydraulic cylinder 4540. Hydraulic cylinder 4540 may comprise a telescoping hydraulic cylinder. Additionally, one or more telescoping struts, such as diagonal strut 40, may be configured to provide additional support of mounting structure 4100.

Mounting structure 4100 may comprise a walking system including a number of transport systems 4010, 4020 configured to position or move mounting structure 4100 over the well head. In some examples, transport systems 4010, 4020 may comprise one or more of the transportation devices and/or systems described in U.S. Pat. No. 8,573,334, U.S. Pat. No. 8,561,733, and U.S. Pat. No. 8,490,724, or any combination thereof.

In some examples, transport struts 4015, 4025 may be configured to primarily provide structural support while transport systems 4010, 4020 are moving mounting structure 4100 and a rig and/or load supported by mounting structure 4100. In some examples, one or both of transport struts 4015, 4025 may be oriented at a diagonal angle in order to offset or redistribute the weight of the load. For example, front transport strut 4025 may be configured to provide an offset load bearing path from rig platform 4060 to transportation device 4020 located outside of, and/or in front of, base 4080.

Base 4080 may be configured to support the weight of mounting structure 4100 during operation of a rig, in which case base may be in contact with the ground or other surface upon which mounting structure 4100 is located. In some examples, transportation devices 4010, 4020 may be configured to lift base 4080 and/or the entire mounting structure 4100 off the ground, such as when the rig is being moved from one well head to another well head. A first set of one or more transport devices, such as transport device 4010, may be configured to lift approximately half of the weight of mounting structure 4100 at a first load bearing position 4050. A second set of one or more transport devices, such as transport device 4020, may be configured to lift approximately half of the weight of mounting structure 4100 at a second load bearing position 4075. In some examples, more than two load bearing positions may be used to lift and/or move mounting structure 4100.

Figure 23:
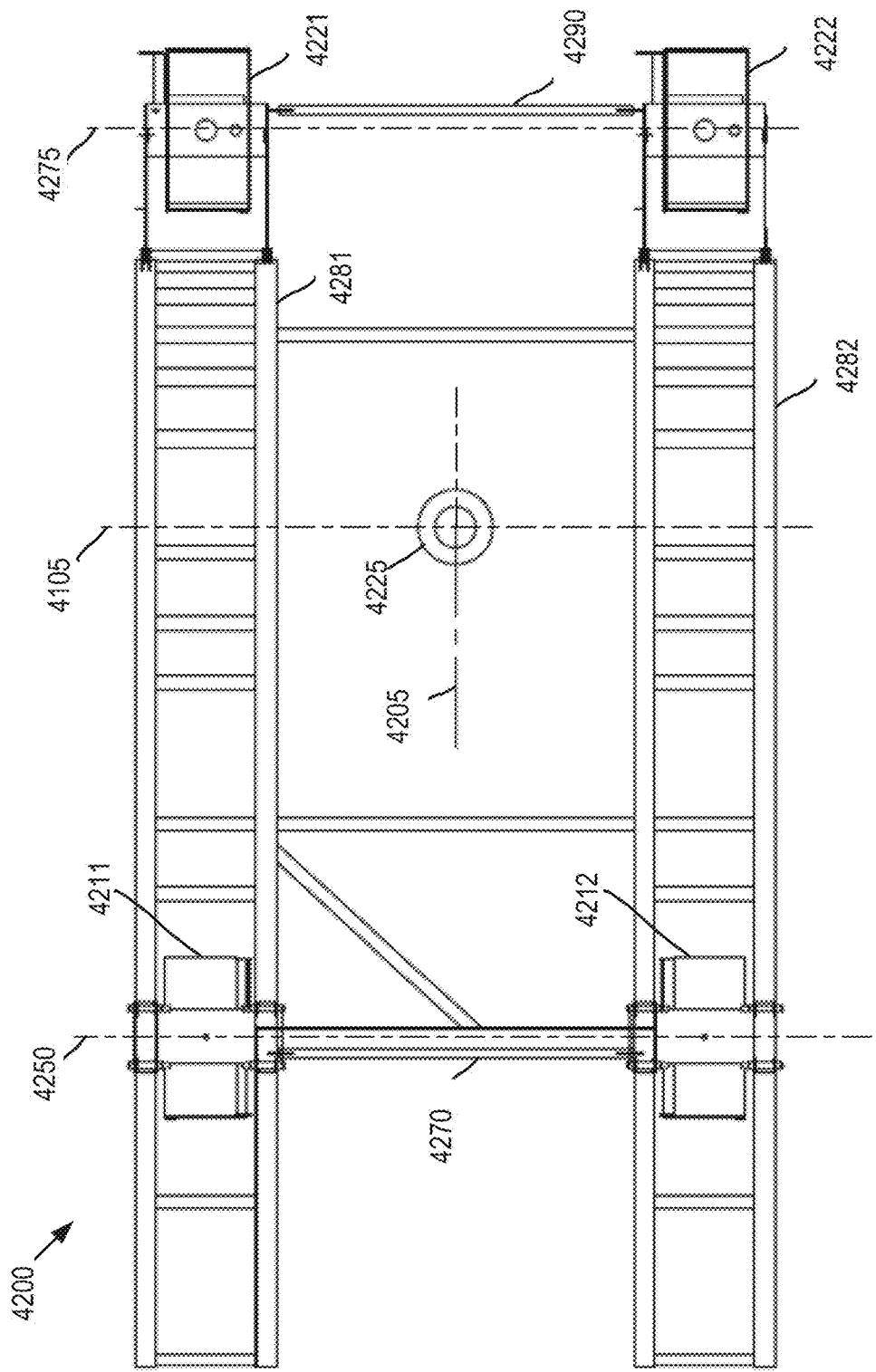
FIG. 23 illustrates a bottom view of a mounting structure.

FIG. 23 illustrates a bottom view of a mounting structure 4200 which may be configured similarly as mounting structure 4100 of FIG. 22. Mounting structure 4200 may comprise one or more struts, such as struts 4270 and 4290, connecting a left side base 4281 of mounting structure 4200 with a right side base 4282 of mounting structure 4200. A first set of transportation devices comprising a first rear transport device 4211 and a second rear transport device 4212 may be associated with a first load bearing position 4250. Additionally, a second set of transportation devices comprising a first front transport device 4221 and a second front transport device 4222 may be associated with a second load bearing position 4275.

During operation of a rig associated with mounting structure 4200, a well head 4225 may be located between first load bearing position 4250 and second load bearing position 4275. For example, well head 4225 may be located at the intersection formed by well head centerline 4105 and a longitudinal centerline 4205 of mounting structure 4200.

First rear transport device 4211 and second rear transport device 4212 are illustrated as being located within left side base 4281 and right side base 4282, respectively. Locating one or more transportation devices within the base framework may provide lateral clearance when mounting structure 4200 travels over the well head 4225, such that the well head 4225 and associated casing, valving, etc. pass between left side base 4281 and right side base 4282.

Figure 24:
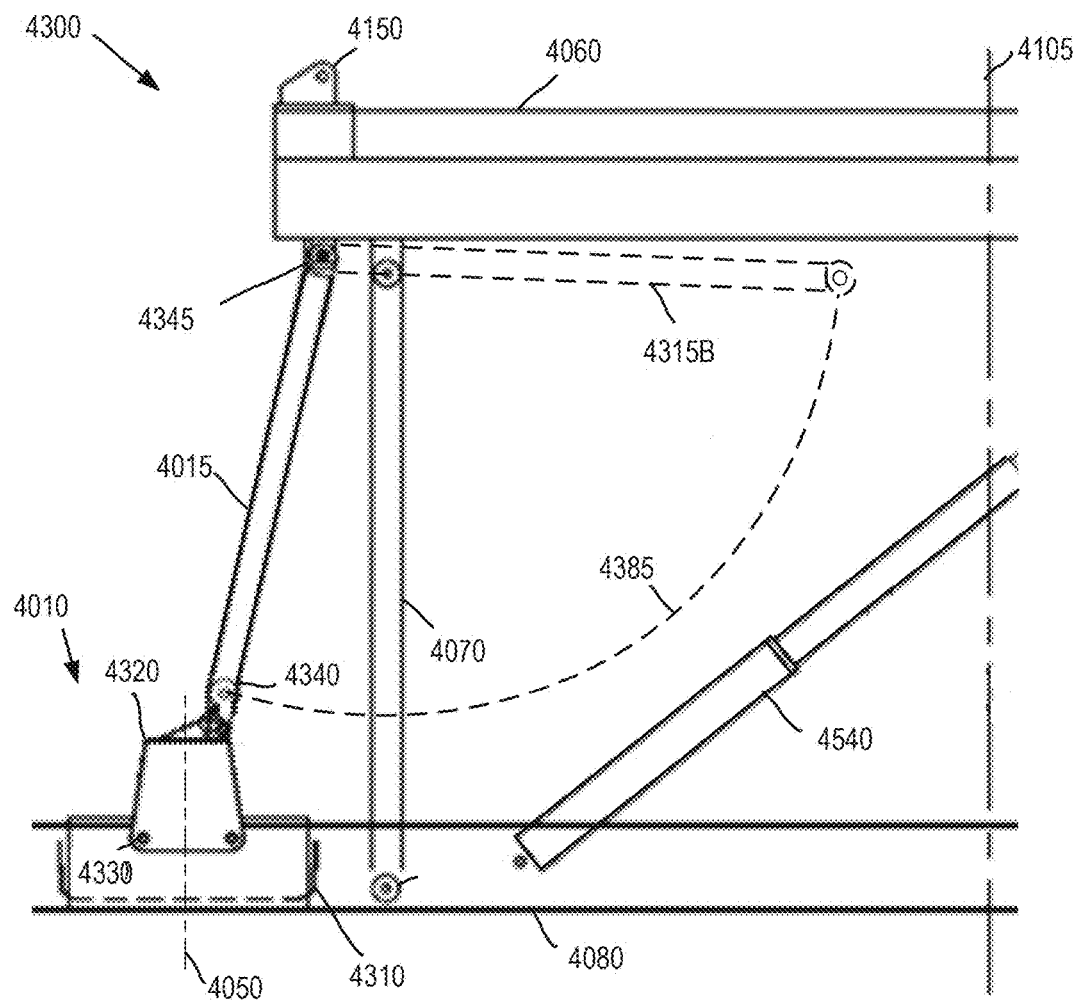
FIG. 24 illustrates an enlarged partial view of a mounting structure comprising a first support structure.

FIG. 24 illustrates an enlarged partial view of a mounting structure 300 comprising a first transportation system, such as transport system 4010 of FIG. 22. First transport system 4010 may comprise a transport support 4320, a base connection 4330, and/or a transportation device 4310. Transport support 4320 may be configured to connect strut 4015 to base 4080. Transport support 4320 may be connected to base 4080 via base connection 4330. In some examples, transport support 4320 may comprise one or more bolts, pins, rods, hooks, clamps, latches, other types of connection devices, or any combination thereof.

Strut 4015 may be connected to transport support 4320 at a first end 4340 of strut 4015. Additionally, strut 4015 may be connected to rig platform 4060 at a second end 4345 of strut 4015. In some examples, strut 4015 may be configured to diagonally connect rig platform 4060 to base 4080 at a point located above transportation device 4310. When mounting structure 4300 is at rest with base 4080 in contact with the ground or operating surface, the weight of the associated drill and/or load located on rig platform 4060 may be primarily borne by first leg 4070. First leg 4070 may be positioned directly below one or more support legs of rig support structure 4150.

Strut 4015 may be configured to transfer at least a portion of the weight of the drill and/or load (along with a portion of the overall weight of mounting structure 4300) from first leg 4070 to first load bearing position 4050 when mounting structure 4300 is in a raised position on transportation device 4310, e.g., when base 4080 is lifted off the ground.

One or more transportation devices, such as transportation device 4310, may be configured to raise and lower the entire mounting structure 4300 during operation of the drill, e.g. to move the drill relatively short distances from one well head centerline 4105 to another well head. However in some examples, mounting structure 4300 may be moved relatively large distances, such as from a first drilling site to another drilling site, which may be located many miles distant from each other, in which case it may be impractical to rely on transportation device 4310 to provide the sole means for transportation.

Mounting structure 4300 may be configured to be placed into a compact state for distant transportation. In some examples, one or more hydraulic cylinders, such as hydraulic cylinder 4540, may be configured to raise and/or lower rig platform 4060 with respect to base 4080. In preparation for, or in the process of, lowering mounting structure 4300 into the compact state, strut 4015 may be disconnected from one or both of base 4080 and rig platform 4060. In some examples, first end 4340 of strut 4015 may be disconnected from transport support 4320.

Strut 4015 may be rotated to an approximately horizontal transport/storage position 4315B, shown in dashed lines. Being connected to transport support 4320 at a raised elevation with respect to base 4080, first end 4340 of strut 4015 may rotate along an arc 4385 with sufficient clearance to avoid contact with base 4080 as strut 4015 is rotated into transport/storage position 4315B. The lower portion of first leg 4070 may be pivotably connected to base 4080 at a pivoting connection 4072.

Figure 25:
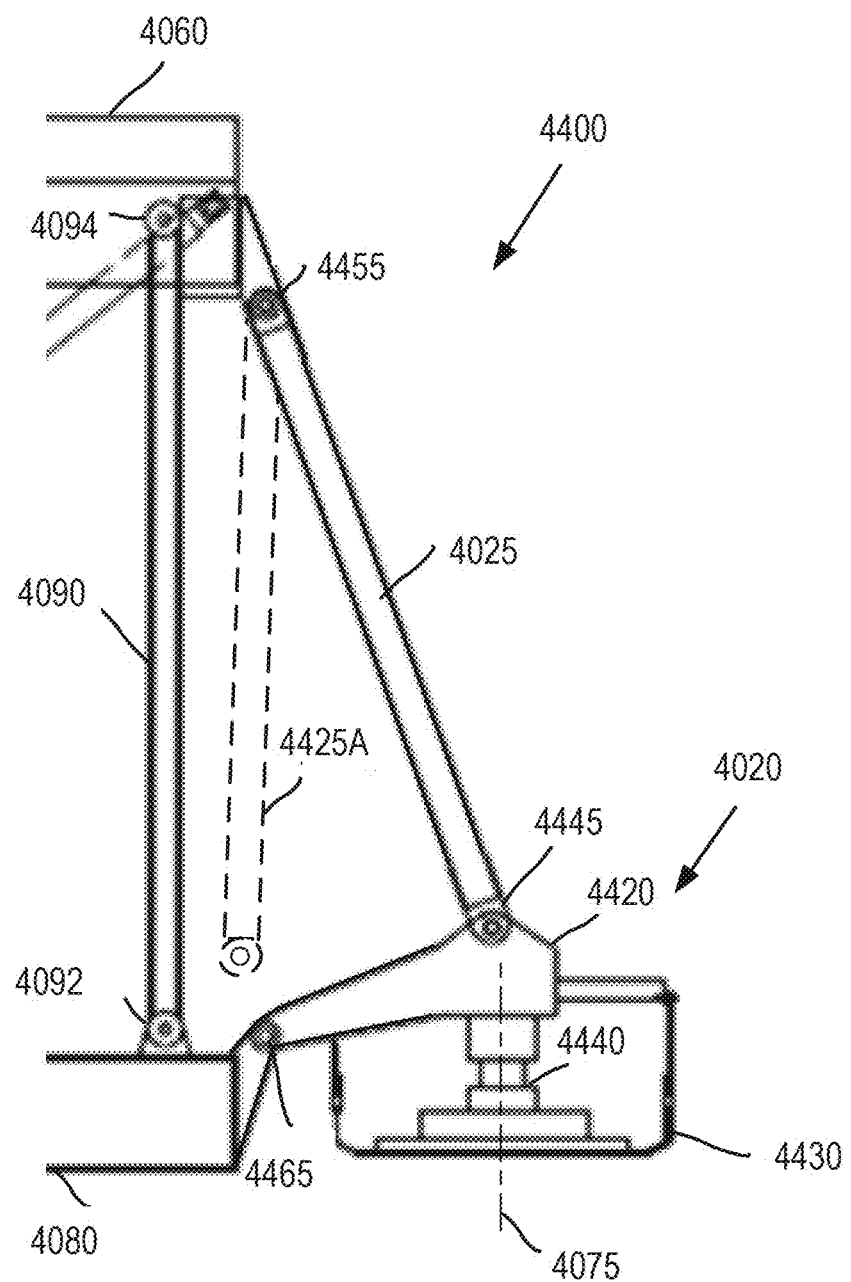
FIG. 25 illustrates an enlarged partial view of a mounting structure comprising a second support structure.

FIG. 25 illustrates an enlarged partial view of a mounting structure 4400 comprising a second transport system, such as transport system 4020 of FIG. 22. Second transport system 4020 may comprise a transport support 4420 and/or a transportation device 4430. Transportation device 4430 may comprise a hydraulic device 4440 configured to lift, lower, move, and/or rotate transportation device 4430 with respect to transport support 4420.

Transport support 4420 may be configured to connect strut 4025 to base 4080. In some examples, strut 4025 may be connected to transport support 4420 at a point above transportation device 4430. Additionally, transport support 4420 may be connected to base 4080 at a connection point 4465. In some examples, connection point 4465 may provide for a pivot point about which at least a portion of second transport system 4020 may rotate and/or be raised. Transportation device 4430 may be located in front of rig platform 4060 and/or in front of base 4080.

Strut 4025 may be connected to transport support 4420 at a first end 4445 of strut 4025. Additionally, strut 4025 may be connected to rig platform 4060 at a second end 4455 of strut 4025. In some examples, strut 4025 may be configured to diagonally connect rig platform 4060 to transport support 4420 at the point located above transportation device 4430. When mounting structure 4400 is at rest with base 4080 in contact with the ground or operating surface, the weight of the associated drill and/or load located on rig platform 4060 may be primarily borne by second leg 4090. In some examples, second leg 4090 may be positioned directly below one or more support legs of rig support structure 4150 (FIG. 22).

Strut 4025 may be configured to transfer at least a portion of the weight of the drill and/or load (along with a portion of the overall weight of mounting structure 4400) from second leg 4090 to second load bearing position 4075 when mounting structure 4400 is in a raised position on transportation device 4430, e.g., when base 4080 is lifted off the ground.

One or more transportation devices, such as transportation device 4430, may be configured to raise and lower the entire mounting structure 4400 during operation of the drill, e.g. to move the drill relatively short distances from one well head centerline to another. Additionally, mounting structure 4400 may be configured to be placed into a compact state for distant transportation. Strut 4025 may be rotated about second end 4455 towards a transport/storage position 4425A, shown in dashed lines. Being connected to transport support 4420 at a raised elevation with respect to base 4080, first end 4445 of strut 4025 may rotate with sufficient clearance to avoid contact with base 4080 as strut 4025 is rotated into transport/storage position 4425A.

Figure 26A:
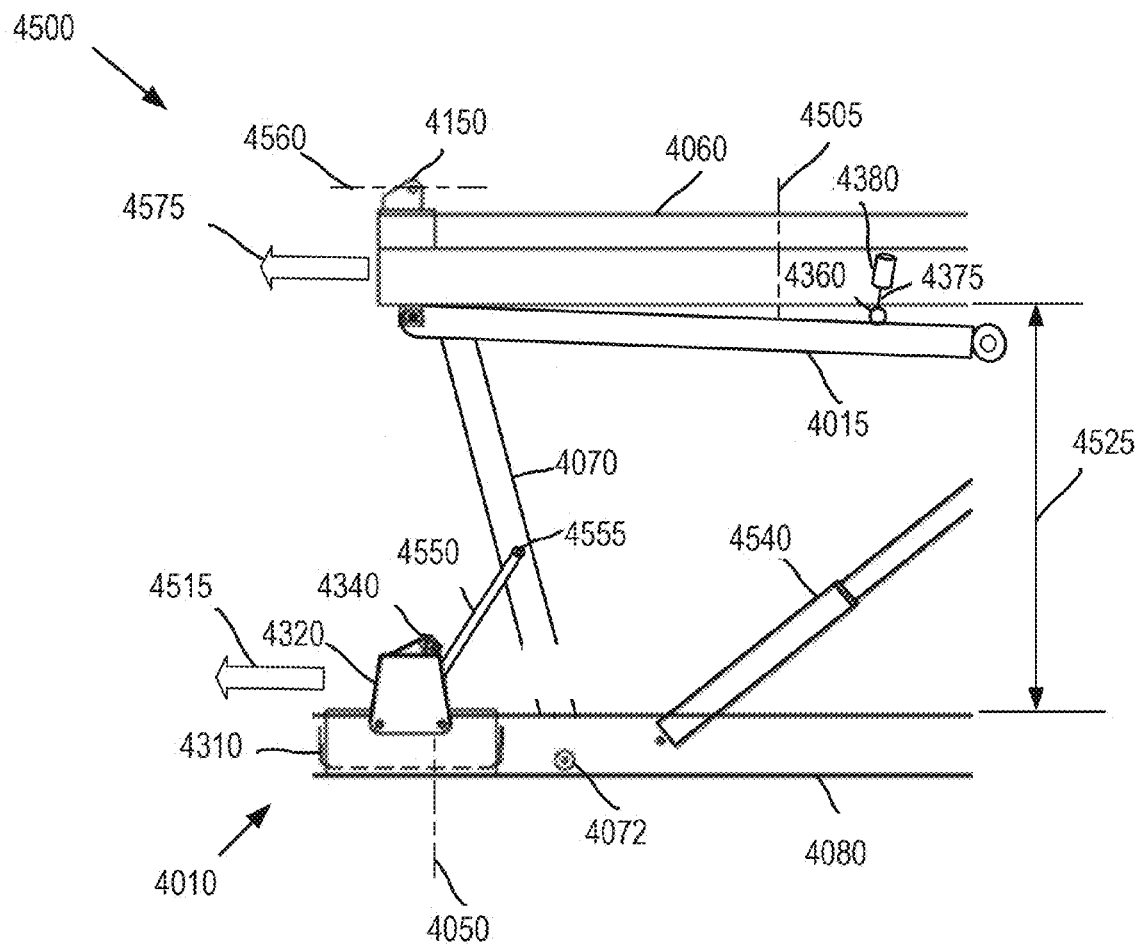
FIG. 26A illustrates a first portion of the mounting structure of FIG. 22 in a partially collapsed transport/storage position.

FIG. 26A illustrates a first portion of the mounting structure 4100 of FIG. 22 in a partially collapsed transport position, in which strut 4015 is shown in an approximately horizontal storage position. Strut 4015 may comprise a latch point 4360 configured to lift and/or securely connect strut 4015 to rig platform 4060. In some examples, a cable 4375 may extend between latch point 4360 and a lifting mechanism 4380 attached to rig platform 4060 to facilitate the rotation of strut 4015 into the horizontal transport/storage position.

The rig platform 4060 is shown as having been lowered to a partially collapsed height 4525 with respect to base 4080. Hydraulic cylinder 4540 is shown in a partially extended position as first leg 4070 pivots rig platform 4060 downward, causing a rig centerline 4505 associated with rig platform 4060 to move away from, e.g., to the left 4575 of, well head centerline 4105 (FIG. 22). In some examples, the rig and/or load may be removed from mounting structure 4100 prior to lowering rig platform 4060, such that the overall height 4560 of mounting structure 4100 may be associated with rig support structure 4150.

A push-pull rod 4550 or connecting member may operatively connect transport support 4320 of first transport system 4010 to first leg 4070. Push-pull rod 4550 may be rotatably connected to first leg 4070 at a pivoting connection 4555 and may be configured to push and/or pull at least a portion of first transport system 4010 in response to the rotation of first leg 4070 about pivoting connection 4072. In some examples, push-pull rod 4550 may be configured to push transport support 4320 and/or transportation device 4310 away from well head centerline 4105 in a substantially lateral direction 4515. At least a portion of first transport system 4010, such as transport support 4320 and/or transport device 4310, may be moved away from first load bearing position 4050 in response to lowering rig platform 4060. Push-pull rod 4550 may push transport support 4320 in the lateral direction 4515 as first leg 4070 pivots about pivoting connection 4072 with respect to base 4080. In some examples, transport support 4320 may be moved in the lateral direction 4515 after being disconnected from strut 4015.

Figure 26B:
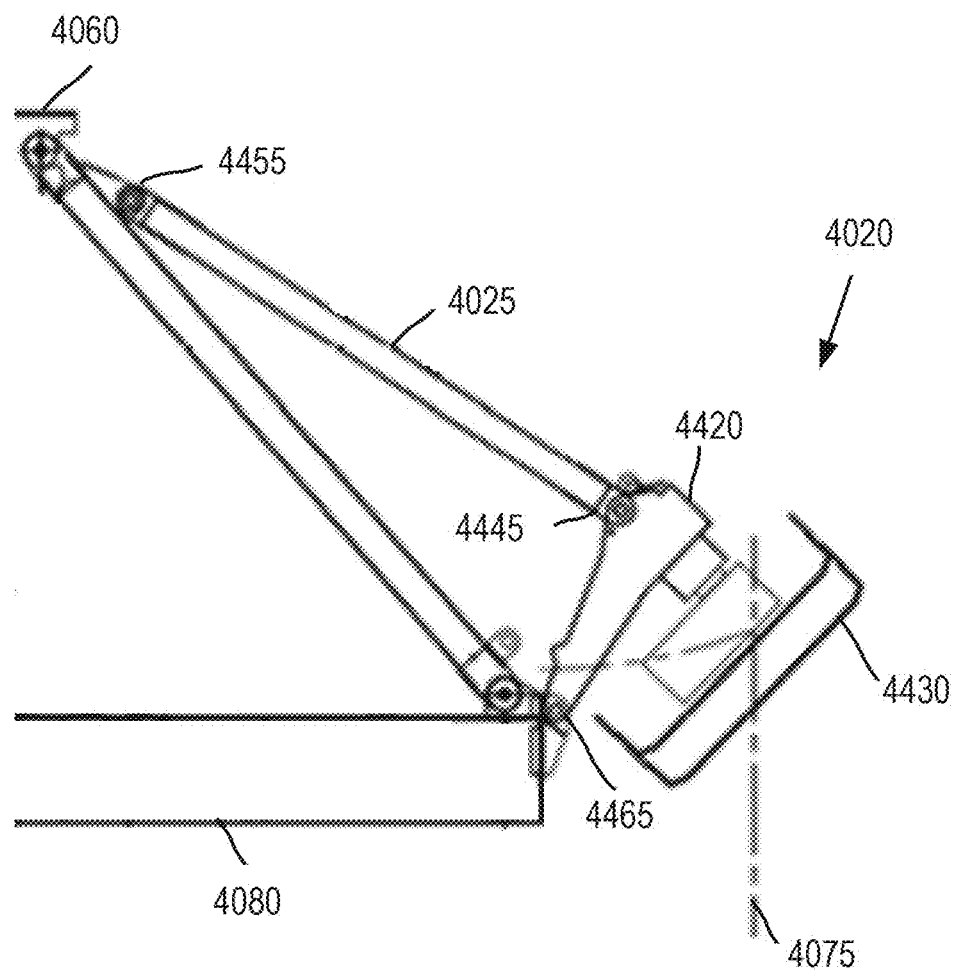
FIG. 26B illustrates a second portion of the mounting structure of FIG. 22 in a partially collapsed transport/storage position.

FIG. 26B illustrates a second portion of the mounting structure 4100 of FIG. 22 in a partially collapsed transport/storage position. At least a portion of second transport system 4020, such as transport support 4420 and/or transport device 4430, may be moved away from second load bearing position 4075 in response to lowering rig platform 4060 towards base 4080. In some examples, as rig platform 4060 is being lowered to the partially collapsed transport position, strut 4025, or another connecting member, may be configured to lift and/or rotate at least a portion of second transport system 4020 about connection point 4465. In some examples, one or both of first end 4445 and second end 4455 of strut 4025 may be configured to allow strut 4025 to pivot with respect to rig platform 4060 and transport support 4420, respectively.

Figure 27:
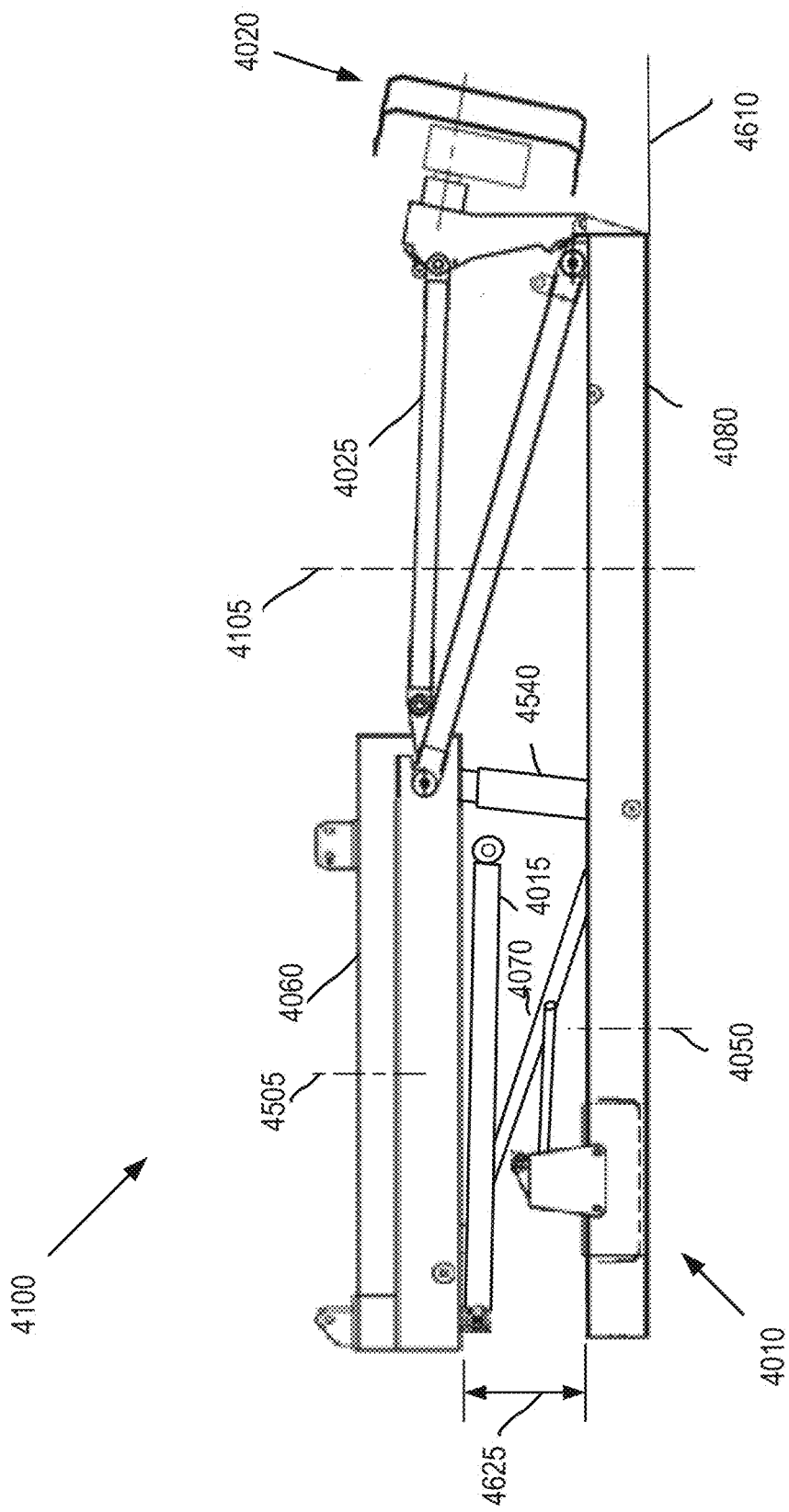
FIG. 27 illustrates the mounting structure of FIG. 22 in a fully collapsed position.

FIG. 27 illustrates the mounting structure 4100 of FIG. 22 in a fully collapsed transport/storage position. Both strut 4015 and strut 4025 are shown in a substantially horizontal transport/storage position, and hydraulic cylinder 4540 is shown in a retracted position. The rig platform 4060 is shown as having been lowered to a collapsed height 4625 with respect to base 4080. Rig centerline 4505 associated with rig platform 4060 has moved away from well head centerline 4105, such that substantially the entire rig platform 4060 is positioned to the left of well head centerline 4105.

At least a portion of transport system 4010 has also been laterally moved away from first load bearing position 4050 in response to lowering rig platform 4060, such that first transport system 4010 and/or second transport system 4020 does not interfere with the reduced overhead clearance associated with one or more struts, cylinders, or legs, such as first leg 4070, in the fully collapsed transport position of mounting structure 4100. Additionally, at least a portion of second transport system 4020 may be rotated and/or raised in response to lowering rig platform 4060 such that second transport system 4020 is no longer in contact with the ground and/or surface 4010. In some examples, an upper portion of second transport system 4020 may be rotated and/or moved independent of a lower portion of second transport system 4020.

By rotating second transport system 20, the length of mounting structure 4100 may be reduced. In some examples, the overall length of mounting structure 4100 in the fully collapsed transport/storage position may be equal to, or approximate, the length of base 4080.

Figure 28:
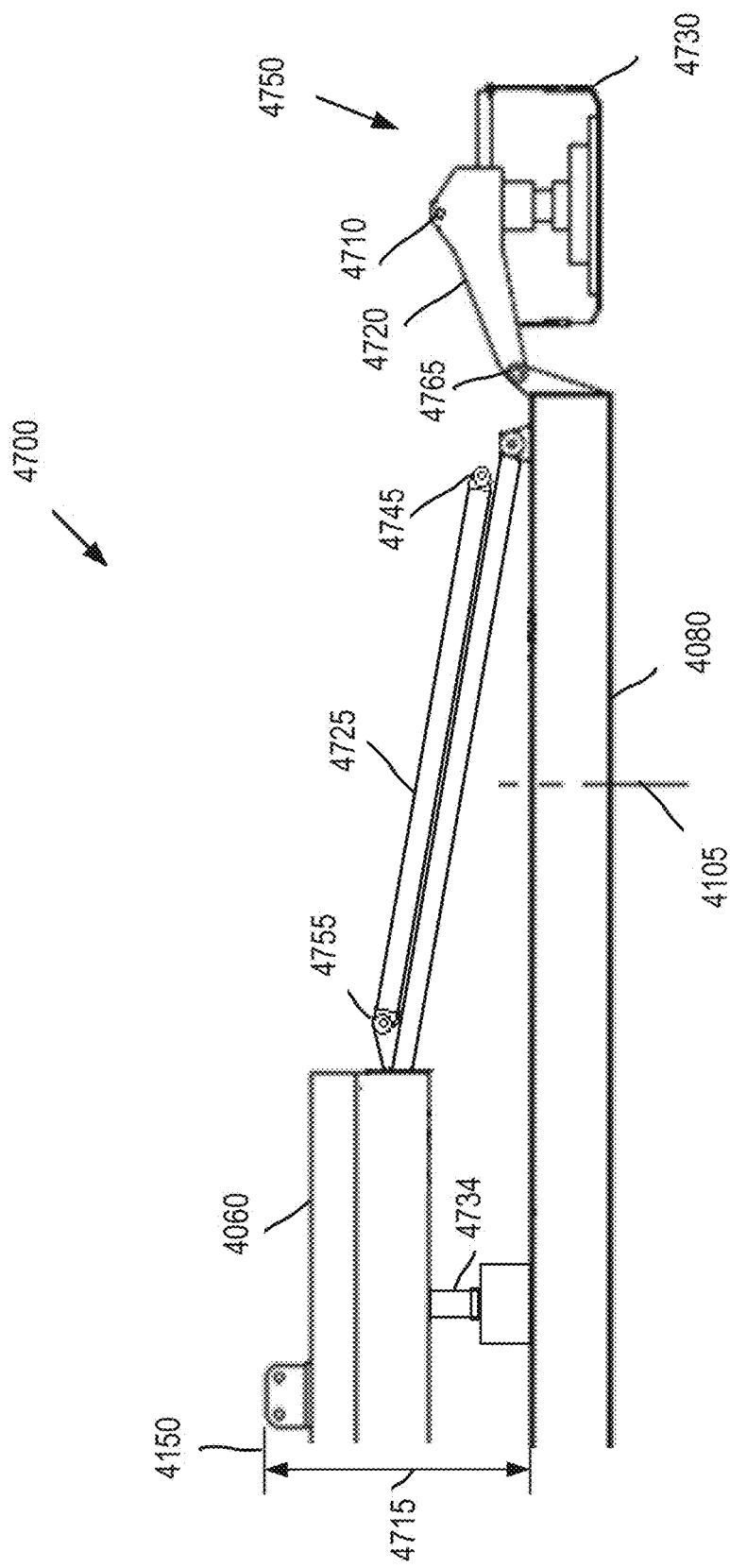
FIG. 28 illustrates a mounting structure, such as the mounting structure of FIG. 22, in an alternative example transport/storage position.

FIG. 28 illustrates a mounting structure 4700, including an example transport system 4750 in an alternative transport/storage position. A first end 4745 of a strut 4725 is shown disconnected from a transport support 4720 of transport system 4750, such that transport support 4720 and a corresponding transport device 4730 may remain adjacent to base 4080, e.g., on the ground, with rig platform in the fully collapsed transport/storage position. Rig platform 4060 is shown moved to off to one side of well head centerline 4105 and an overall height 4715 of mounting structure 4700 may determined for the highest point of the rig and/or rig support structure 4150 in the fully collapsed position.

Transport support 4720 may comprise a lift point 4710 configured to provide means for lifting and/or rotating at least a portion of transport system 4750. Lift point 4710 may be fitted with a cable and a hoist may be used to lift or rotate transport support 4720 and/or transport device 4730 off the ground. In some examples, transport support 4720 may be disconnected from base 4080 at a connection point 4765, such that at least a portion of transport system 4750 may be separately transported and/or stored from mounting structure 4700. In still other examples, transport system 4750 may be placed on base 4080 or on rig platform 4060 during transport and/or during storage of mounting structure 4700.

One or more support braces 4734 may be configured to support the weight of rig platform 4060 in the fully collapsed transport/storage position. Additionally, the one or more support braces 4734 may be configured to maintain clearance between transport system 4750 and/or transport systems 4010, 4020 (FIG. 27) and one or more struts, cylinders, or legs, such as first leg 4070 and strut 4015, with mounting structure 4700 in the fully collapsed transport/storage position.

Figure 29:
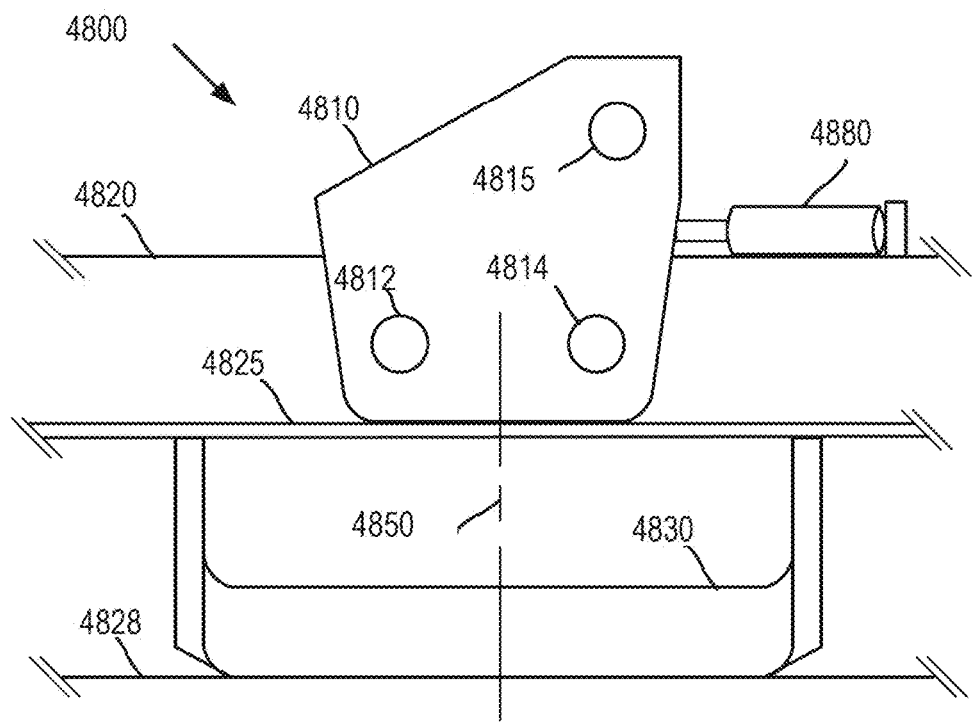
FIG. 29 illustrates an example support structure.

FIG. 29 illustrates an example support structure 4800 in a first mode of operation. The first mode of operation may be associated with operation of support structure 4800 during a drilling operation or during a rig walking operation. During the first mode of operation, the bottom of a base 4820 may be in contact with the ground or other surface 4828 upon which support structure 4800 may be placed on.

An upper portion 4810 of a transport system may be mounted to base 4820. In some examples, upper portion 4810 may comprise a number of mounting devices 4812, 4814 or holes through which one or more bolts, pins, rods, hooks, clamps, latches, or other types of connection devices may be used to mount upper portion 4810 to base 4820. Additionally, upper portion 4810 may comprise a connection device 4815 for connecting to a strut or other type of support member, such as strut 4015 (FIG. 22). Support structure 4810 may be connected to a push-pull device 4880, or connecting member, shown in a retracted position. Push-pull device 4880 may comprise a hydraulic cylinder, a jack, a piston, a gear, a winch, a roller, a track, other types of pushing devices or pulling devices such as push-pull rod 4550 (FIG. 26A), or any combination thereof In some examples, push-pull device 880 may be connected to support structure 4810 at a first end of push-pull device 4880 and may be connected to base 4820 at a second end of push-pull device 4880.

The transport system associated with support structure 4800 may be approximately centered about a load bearing path 4850. In some examples, a transport device 4830 may be configured to lift base 4820 along load bearing path 4850. Upper portion 4810 may be configured as a transport support, e.g., to operably connect transport device 4830 to base 4820. Additionally, upper portion 4810 may be configured to transfer the weight of a load supported by base 4820 onto the transport device 4830. In some examples, upper portion 4810 may be configured to transfer or offset the effective weight of the load onto the load bearing path 4850 that passes through transport device 4830.

Base 4820 may comprise a connecting structure 4825, which may be configured as a substantially horizontal plate. In some examples upper portion 4810 may be located above and/or on top of connecting structure 4825, such that mounting devices 4812, 4814 may attach to an upper portion of base 4820. Connecting structure 4825 may be located at an approximate vertical mid-point of base 4820. In some examples, connecting structure 4825 may be used to help locate upper portion 4810 with respect to base 4820. Additionally, connecting structure 4825 may provide vertical support of the weight that is transferred from upper portion 4810 to the load bearing path 4850 associated with transport device 4830.

Figure 30:
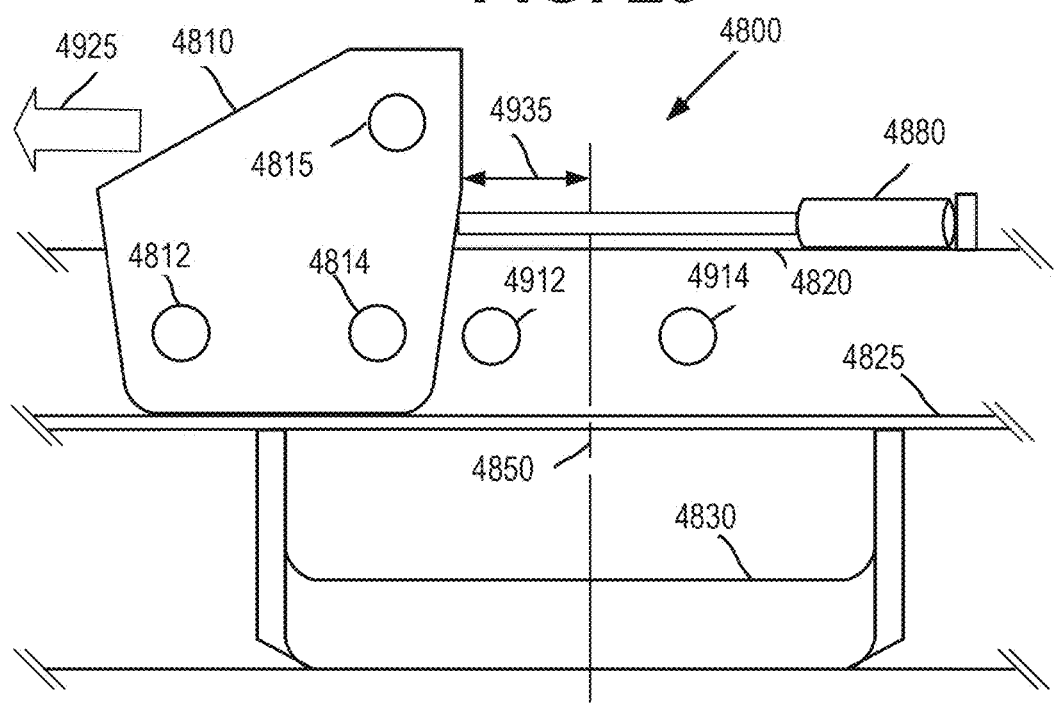
FIG. 30 illustrates the example support structure of FIG. 29 in a transport/storage position.

FIG. 30 illustrates the example support structure 4800 of FIG. 29 in a second mode of operation, in which upper portion 4810 has been moved in a lateral direction 44925 away from load bearing path 850. Upper portion 4810 may be moved far enough in the lateral direction 4925 to provide a lateral clearance 4935 with load bearing path 4850. The second mode of operation may be associated with the storage and/or long distance transport of support structure 4800.

A number of receiving devices 4912, 4914 may be located in base 4820. Receiving devices 4912, 4914 may comprise through-holes which correspond in number and relative position with mounting devices 4812, 4814 of upper portion 4810. For example, a first pin or bolt may be placed through corresponding holes associated with mounting device 4812 and receiving device 4912 with support structure configured in the first mode of operation (FIG. 8), and a second pin or bolt may be placed through corresponding holes associated with mounting device 4814 and receiving device 4914 in the first mode of operation.

The first pin and/or second pin may be configured to impede movement of upper portion 4810 in the lateral direction 4925. The pins/bolts may be removed so that upper portion 4810 is allowed to move in the lateral direction 4925 during the second mode of operation. Upper portion 4810 may be configured to slide along connecting structure 4825. In some examples, some or all of transport device 4830 may also move in the lateral direction 4925 together with upper portion 4810.

Connection device 4815 may be disconnected from a strut or other type of support member prior to upper portion 4810 being moved in the lateral direction 4925. In other examples, the push-pull device 4880, shown in an extended position, may be configured to push and/or pull upper portion 4810 in the lateral direction 4925.

Figure 31:
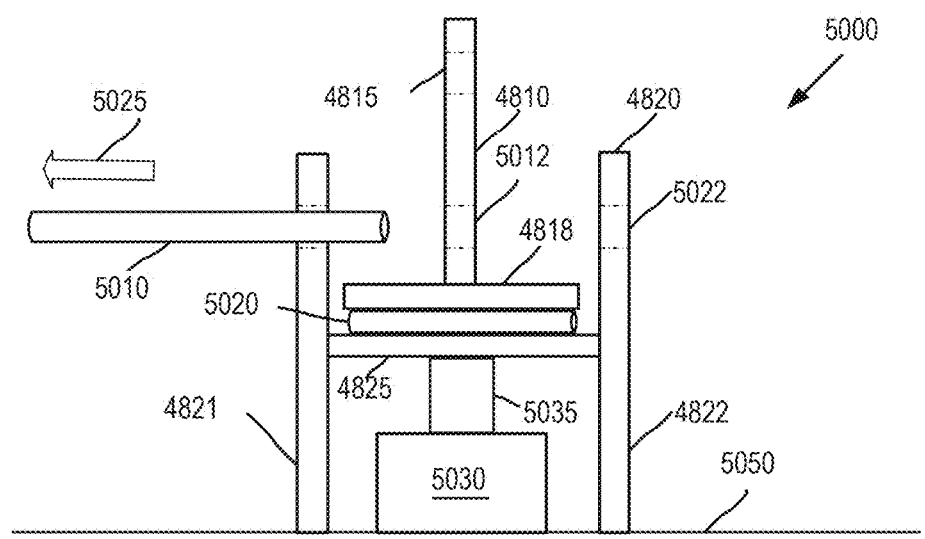
FIG. 31 illustrates a further example support structure.

FIG. 31 illustrates a further example support structure 5000 including the base 4820 and upper portion 4810 of FIG. 30 shown in a cross-sectional view. Base 4820 may comprise a first base plate 4821 and a second base plate 4822 connected by connecting structure 4825. One or more holes, such as through-hole 5022, may penetrate through one or both of first base plate 4821 and second base plate 4822. Additionally, upper portion 4810 may comprise one or more holes such as through-hole 5012. A connection device 5010 is shown in a partially withdrawn position 5025 and extending outside of a hole in first base plate 4821. Connection device 5010 may comprise a bolt, pin, rod, hook, clamp, latch, other types of connection device, or any combination thereof, that may be inserted through upper portion 4810 and base 4820 via one or more through-holes 5012, 5022.

Upper portion 4810 may be positioned directly above a transport device 5030 configured to lift and/or rotate base 4820. In some examples, a rotation/translation device 5035 may be configured to rotate and/or translate transport device 5030 within the base frame defined by first base plate 4821 and second base plate 4822. First base plate 4821 and second base plate 4822 may rest on the ground or surface 5050 when base 4820 is not being lifted by transport device 5030.

One or more rollers 5020 may be placed between a contact surface 4818 of upper portion 4810 and connecting structure 4825 to facilitate moving or rolling upper portion 4810 with respect to base 4820. In some examples, connection device 5010 may be removed entirely from through holes 5012, 5022 and used as a roller between contact surface 4818 and connecting structure 4825. In other examples, upper portion 4810 may be configured to slide via direct contact between contact surface 4818 and connecting structure 4825 without the use of any rollers. Connection device 4815 may be disconnected from a strut or other type of support member prior to upper portion 4810 being moved on the one or more rollers 5020. In other examples, a push-pull device attached to connection device 4815 may be configured to push and/or pull upper portion 4810.

Figure 32:
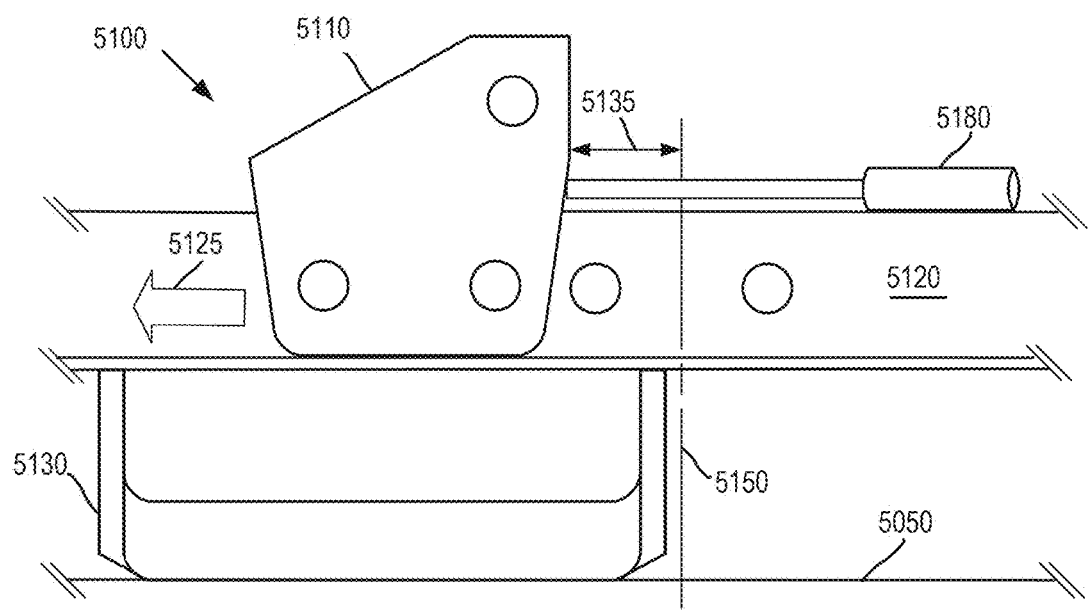
FIG. 32 illustrates an example support structure in a transport/storage position.

FIG. 32 illustrates a further example support structure 5100 in a transport/storage position. In some examples, substantially the entire support structure 5100 including an upper portion 5110 of support structure 5100 and a corresponding transport device 5130 may be moved in a lateral direction 5125 away from a load bearing path 5150. Transport device 5130 may be mounted, bolted, welded, or otherwise connected to upper portion 5110. Upper portion 5110 may be moved far enough in the lateral direction 5125 to provide a lateral clearance 5135 with load bearing path 5150. Similarly, transport device 5130 may be moved away from load bearing path 5150.

Upper portion 5110 may be configured to slide, roll, or otherwise move along one or more surfaces or rails of a base structure 5120. Additionally, transport device 5130 may be configured to slide, roll, or otherwise move along the ground or surface 5050 in the lateral direction 5125. In some examples, support structure 5100 may comprise a hydraulic cylinder or other device configured to lift transport device 5130 off of the ground or surface 5050. Transport device 5130 may be moved in the lateral direction 5125 in a raised position.

A push-pull device 5180 or connecting member, shown in an extended position, may be connected to one or both of upper portion 5110 of support structure 5100 and transport device 5130. In some examples, push-pull device 5180 may comprise similar structural features, or be configured similarly, as push-pull device 4880 (FIG. 29).

When support structure 5100 is located in the transport/storage position, it may be operably disconnected from base structure 5120 such that support structure 5100 may no longer be configured to provide a lifting function of base structure 5120 and/or of an associated rig that may be mounted to base structure 5120. After the rig has been moved to a new location, support structure 5100 may be moved back to an operational position, e.g., with a centerline of transport device 5130 approximately aligned with load bearing path 5150, so that support structure 5100 may again be configured to provide the lifting function.

Figure 33:
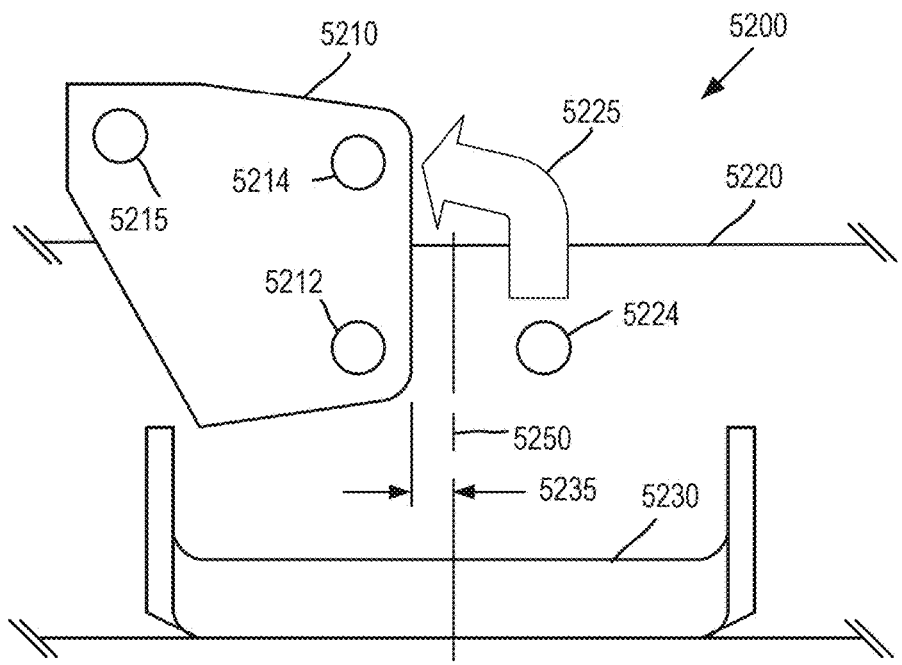
FIG. 33 illustrates a further example support structure in a transport/storage position.

FIG. 33 illustrates yet another example support structure 5200 comprising an upper portion 5210 of a transport system configured to rotate about a pivot point 5212. Pivot point 5212 may comprise a bolt, a pin, a rod, or other type or pivot point configured to pivotably connect upper portion 5210 with a base 5220. In some examples, upper portion 5210 may be configured to mount to base 5220 at both pivot point 5212 and at connection point 5214. Connection point 5214 may align with a receiving point 5224 on base in a first mode of operation associated with transport device 5230, and a pin, rod, hook, clamp, latch, other types of connection device, or any combination thereof, may be used to attach connection point 5214 with receiving point 5224.

Connection point 5214 is shown in a rotated position 5225, e.g., during a second mode of operation, up and away from receiving point 5224, such that a lateral clearance 5235 is formed between upper portion 5210 and a load bearing path 5235 associated with transport device 5230. The second mode of operation may be associated with storage and/or a long distance transport operation of base 5220.

A connection device located at connection point 5214 and/or at receiving point 5224 may be removed to allow connection point 5214 to pivot to the rotated position 5225. On the other hand, upper portion 5210 may be rotated while a second connection device remains connected at pivot point 5212.

In some examples, upper portion 5210 may be rotated and/or moved to rotated position 5225 independent of any movement of transport device 5230. In other examples, the rotation of upper portion 5210 may cause some or all of transport device 5230 to also rotate.

Figure 34:
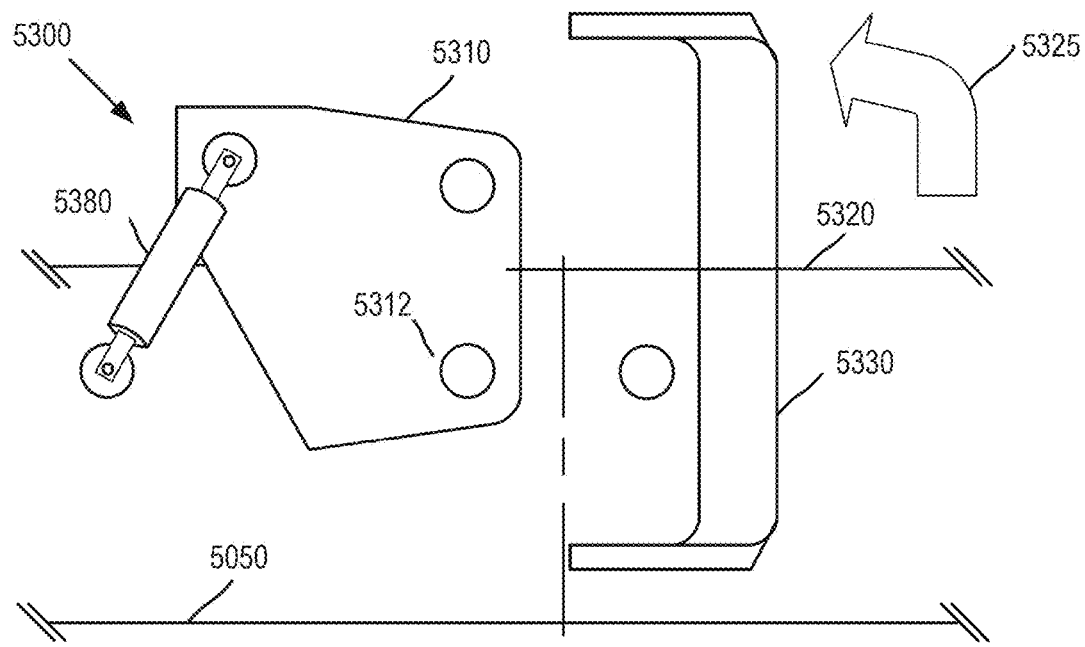
FIG. 34 illustrates yet another example support in a transport/storage position

FIG. 34 illustrates yet another example support structure 5300 in a transport/storage position. Substantially the entire support structure 5300 including an upper portion 5310 of support structure 5300 and a corresponding transport device 5330 of support structure 5300 may be moved in a rotational direction 5325 about a rotational axis 5312, such that transport device 5330 may be lifted off of the ground or surface 5050. In some examples, transport device 5330 may be rotated from an approximately horizontal orientation associated with a lifting function, to a substantially vertical orientation associated with the transport/storage position. Transport device 5330 may be mounted, bolted, welded, or otherwise connected to upper portion 5310.

A push-pull device 5380, shown in a retracted position, may be connected to one or both of upper portion 5310 of support structure 5300 and transport device 5330. In some examples, push-pull device 5380 may comprise similar structural features, or be configured similarly, as push-pull device 4880 (FIG. 29).

When support structure 5300 is located in the transport/storage position, it may be operably disconnected from a base structure 5320 such that it may no longer be configured to provide a lifting function of base structure 5320 and/or of an associated rig that may be mounted to base structure 5320.

Figure 35:
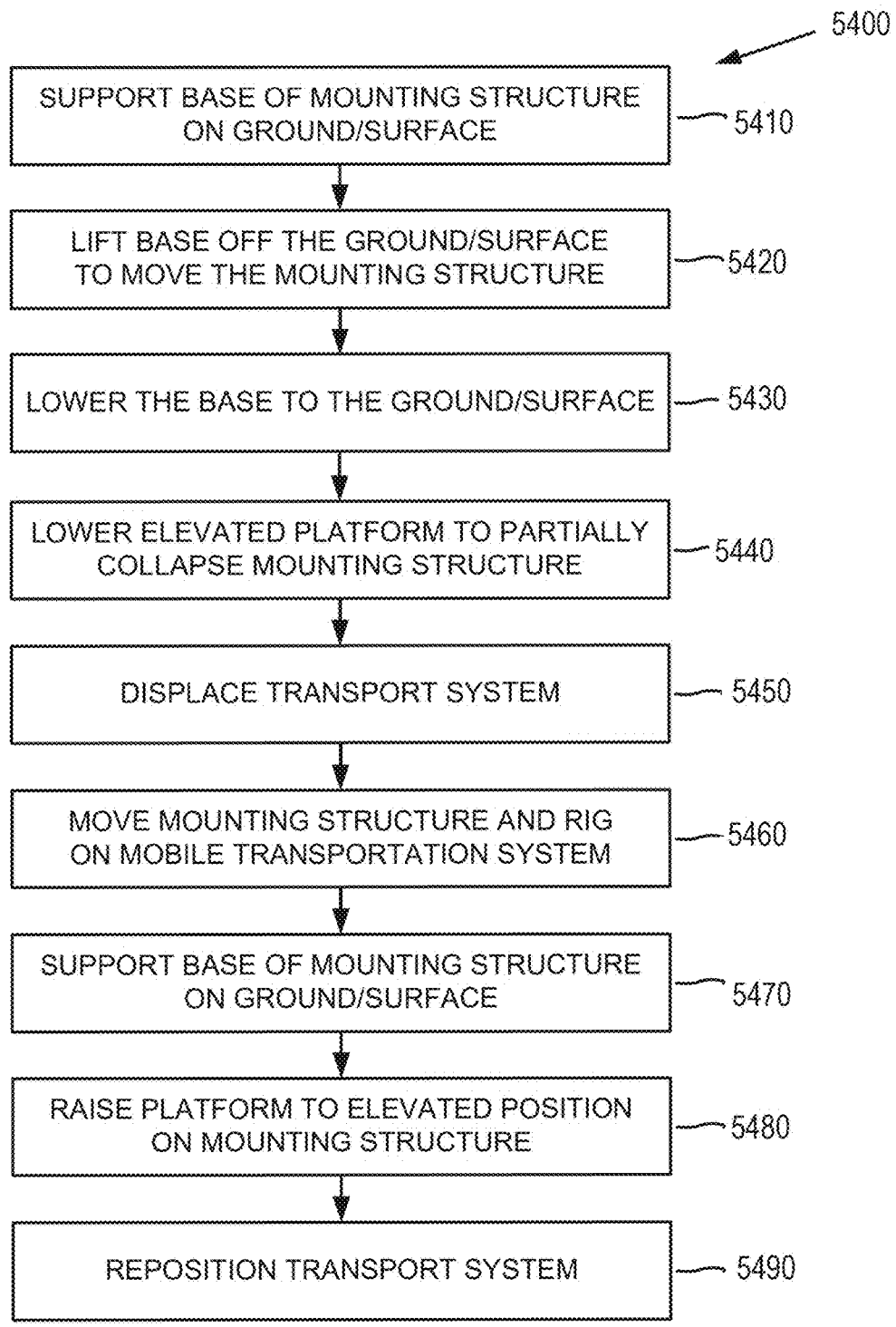
FIG. 35 illustrates an example operation associated with a mounting structure having a storable transport system.

FIG. 35 illustrates an example process 5400 associated with a mounting structure having a storable transport system. At operation 5410, a base of the mounting structure may be supported on an operating surface, such as the ground, a mat, a pad, a platform, a barge, or other type of surface. The base may be connected to an elevated platform of the rig with one or more support beams. In some examples, at least one of the support beams may comprise a diagonal strut connecting the elevated platform to the base structure. By way of illustrative example only, an extraction of a petroleum-based resource may be performed at a first, or initial, location. In other examples, operations performed at the initial location may include drilling a hole, inserting a pipe, fracking, other types of operations, or any combination thereof.

At operation 5420, the base of the mounting structure may be lifted off of the operating surface by a rig transport system to move the mounting structure to a destination and/or a second location, following the operation performed at the initial location. The mounting structure may be repositioned by moving the base from the initial location to the new location while a rig is supported by the mounting structure.

In some examples, mounting structure may be positioned by a first rig transport system positioned at the rear end of the mounting structure and a second rig transport system positioned at a front end of the mounting structure, opposite the rear end. The mounting structure may be positioned by raising the rear end of the mounting structure with the first rig transport system. Positioning the mounting structure may further comprise raising the front end of the mounting structure with the second rig transport system. In other examples, one or more transport systems may be located at different or additional locations with respect to the mounting structure.

At operation 5430, the base of the mounting structure may be lowered by the rig transport system to the operating surface at the destination and/or at the second location. A second operation may be performed at the second location.

At operation 5440, an elevated rig platform connected to the base by a plurality of support struts may be lowered. The elevated platform may be lowered while the base is in contact with the operating surface. At least some of the support struts may comprise a mounting connection that pivots to lower the rig platform toward the base. In some examples, the rig platform is lowered towards the base at the completion of an operation, such as where the mounting structure and/or rig are being prepared for storage and/or long distance transportation.

At operation 5450, at least a portion of the rig transport system may be displaced by a connecting member in response to the rig platform being lowered. The portion of the rig transport system may be displaced by the connecting member while the base remains in contact with the operating surface. The connecting member may be configured to attach the portion of the rig transport system to one of the support struts that includes a pivoting mounting connection.

In some examples, at least a portion of the rig transport system may be displaced in order to provide a more compact mounting structure in the collapsed state. Additionally at least a portion of the rig transport system may be displaced in order to provide additional clearance between the rig transport system and one or more components attached to the rig platform being lowered to the base.

In some examples, the rig transport system may be configured to contact the operating surface at a load bearing position while lifting the mounting structure at operation 5220. The connecting member may be configured to displace the portion of the rig transport system away from the load bearing position while the rig platform is being lowered at operation 5240.

The base may comprise two walls connected by a substantially horizontal connecting structure or plate. One or both of the two walls may be configured to contact the operating surface when the mounting structure is not being lifted by the rig transport system. In some examples, the rig transport system fits between the two walls. Additionally, the rig transport system may comprise a transport device or walker that is configured to rotate within the confines of the two base walls. The portion of the rig transport system that is displaced may be located above the horizontal connecting structure. In some examples, the portion of the rig transport system may be laterally displaced along the horizontal connecting structure in response to the rig platform being lowered.

The base may extend substantially along an entire length of the mounting structure, and at least one of the rig transport systems may be connected to an end of the base. The portion of the rig transport system may be rotationally displaced about the end of the base in response to the rig platform being lowered.

At operation 5460, the entire mounting structure and/or rig may be transported on a mobile transportation system such as one or more semi-trucks, rail cars, barges, other transportation vehicles, or any combination thereof. The mounting structure may be transported to a storage facility, and in some examples the mounting structure may be transported to a new operational site or destination which may be located many miles away from the present location. The mounting structure may be transported in the partially collapsed or completely collapsed position.

At operation 5470, the support base of the mounting structure may be placed on the ground and/or on a support surface at the destination.

At operation 5480, the rig platform may be raised to an elevated position on the mounting structure. The rig platform may be raised while the base is in contact with the operating surface. The mounting connections of the one or more support struts may pivot to raise the rig platform to the elevated position. In some examples, the rig platform may be raised to the elevated position prior to performing an operation at the destination.

At operation 5490, at least a portion of the rig transport system may be repositioned by the connecting member in response to the rig platform being raised. The portion of the rig transport system may be repositioned and/or displaced by the connecting member while the base remains in contact with the operating surface. The connecting member may be configured to attach the portion of the rig transport system to one of the support struts that includes a pivoting mounting connection.

In some examples, the rig transport system may be configured to move the mounting structure between one or more drill sites at the destination with the rig platform in the raised position and with the portion of the rig transport system repositioned above a load bearing position of a corresponding transport device, such as a walker.

Some or all of the example structures discussed above with respect to FIGS. 22-35 may be configured to allow the rig platform to collapse down to the base during break-down or transportation of the rig to a drill site. In some examples, the examples may comprise connections that provide pivot points where they connect to one or more of the struts, braces, and/or legs.

A rig may be modified with one or more of the struts, legs, braces, connections, and/or structural features described with reference to FIGS. 22-35 to enable the placement of a draw-works on a rig and/or rig platform. The placement of the structural features, such as the struts, provides the ability to maintain a structural load path of the original rig design while drilling, after the rig has been modified.

Some examples have been described above, and in addition, some specific details are shown for purposes of illustrating the inventive principles. However, numerous other arrangements may be devised in accordance with the inventive principles of this patent disclosure. Further, well known processes have not been described in detail in order not to obscure the novel features. Thus, while examples are described in conjunction with the specific embodiments illustrated in the drawings, the examples are not limited to these embodiments or drawings.

The invention claimed is:

1. An apparatus configured to move a load bearing frame over a base surface, comprising:
   a support foot with a longitudinal axis in a substantially parallel alignment relative to a longitudinal axis of the load bearing frame;
   a lift mechanism during a step operation configured to raise the support foot off of the base surface to lower the load bearing frame onto the base surface, and configured to lower the support foot onto the base surface to lift the load bearing frame off the base surface;
   a travel mechanism coupled to the support foot and the lift mechanism, the travel mechanism configured to change a travel direction for moving the load bearing frame during the step operation; and
   a biasing device configured to maintain the substantially parallel alignment of the support foot relative to the load bearing frame independently of the travel direction for moving the load bearing frame.

2. The apparatus of claim 1, wherein the biasing device is further configured to:
   activate while the load bearing frame is lifted off the base surface and angularly displaced relative to the support foot; and
   return the longitudinal axis of the support foot to the substantially parallel alignment relative to the longitudinal axis of the load bearing frame when the support foot is raised off of the base surface.

3. The apparatus of claim 1, including a roller assembly coupled between the lift mechanism and the travel mechanism and configured to move the load bearing frame relative to the support foot.

4. The apparatus of claim 3, wherein the travel mechanism angularly displaces the load bearing frame relative to the support foot.

5. The apparatus of claim 1, wherein the biasing device comprises one or more elongated bars.

6. The apparatus of claim 5, wherein the one or more bars are coupled at opposite ends to opposite ends of the support foot.

7. The apparatus of claim 5, wherein the one or more elongated bars extend substantially in parallel with one or more sides of the support foot.

8. The apparatus of claim 1, wherein the biasing device includes at least one of a group including leaf springs, coil springs, chains, hydraulic cylinders, and motors.

9. The apparatus of claim 1, further comprising one or more linking devices operably coupled between the support foot and the load bearing frame.

10. An apparatus configured to move a load bearing frame over a base surface, comprising:
    a support foot having a longitudinal axis with a substantially parallel alignment with a longitudinal axis of the load bearing frame;
    a lift mechanism during a load-movement phase configured to lower the support foot onto the base surface and lift the load bearing frame off of the base surface, and during a recovery phase configured to lift the support foot off of the base surface and lower the load bearing frame onto the base surface; and
    a travel mechanism coupled to the support foot and the lift mechanism, the travel mechanism configured to steer the load bearing frame in selected travel directions; and
    an alignment restoration device operably coupled to the support foot and configured to maintain the support foot in the substantially parallel alignment with the load bearing frame independently of the steered travel directions of the load bearing frame.

11. The apparatus of claim 10, wherein the alignment restoration device is further configured to:
   activate when the support foot is angularly displaced by the travel mechanism relative to load bearing frame; and
   return the longitudinal axis of the support foot to the substantially parallel alignment with the longitudinal axis of load bearing frame when the support foot is lifted off of the base surface.

12. The apparatus of claim 10, wherein the alignment restoration device comprises at least one of a group including hydraulic cylinders and motors.

13. The apparatus of claim 10, wherein the alignment restoration device comprises one or more elongated bars.

14. The apparatus of claim 10, further comprising a linking device operably coupled between the alignment restoration device and the support foot.

15. The apparatus of claim 10, further comprising a roller assembly coupled to the travel mechanism, wherein:
   the travel mechanism is configured to move the roller assembly and create an angular displacement of the support foot relative to the load bearing frame; and
   the alignment restoration device is configured to move the longitudinal axis of the support foot back into the substantially parallel alignment with the longitudinal axis of the load bearing frame.

16. The apparatus of claim 15, wherein the alignment restoration device is configured to deflect in response to the angular displacement of the support foot.

17. An apparatus configured to move a load over a base surface, comprising:
   a support foot configured to contact the base surface;
   a lift mechanism configured to raise the support foot off of the base surface to lower a load-bearing frame supporting the load onto the base surface, and lower the support foot onto the base surface to lift the load-bearing frame off of the base surface;
   a roller assembly coupled to the lift mechanism;
   a travel mechanism configured to move the roller assembly and angularly displace the load bearing frame relative to the support foot; and
   an alignment restoration device configured to activate based on the angular displacement of the load bearing frame relative to the support foot and realign a centerline of the support foot to a substantially parallel alignment with a centerline of the load bearing frame.

18. The apparatus of claim 17, wherein the alignment restoration device comprises at least one of a leaf spring, coil spring, chain, hydraulic cylinder, or motor.

19. The apparatus of claim 17, wherein the alignment restoration device is configured to deform when the support foot is lowered to the surface, the load bearing frame is raised above the surface, and the travel mechanism angularly displaces the load bearing frame relative to the support foot.

20. The apparatus of claim 19, wherein the alignment restoration device is further configured to release a stored biasing force and move the centerline of the support foot to the substantially parallel alignment with the centerline load bearing frame in response to the lift mechanism raising the support foot off the base surface.

* * * * *